(12) United States Patent  
Murakami

(10) Patent No.: US 12,276,733 B2  
(45) Date of Patent: Apr. 15, 2025

(54) METHOD OF COMPUTING THREE-DIMENSIONAL DRIVE PARAMETER OF A THREE-DIMENSIONAL NUMERICAL DRIVE CONTROL DEVICE BY DRIVING MEASUREMENT OF A TRACKING LASER DISTANCE METER

(71) Applicant: Naoyuki Murakami, Fujisawa (JP)

(72) Inventor: Naoyuki Murakami, Fujisawa (JP)

(73) Assignee: Naoyuki Murakami, Kanagawa (JP)

( * ) Notice: Subject to any disclaimer, the term of this patent is extended or adjusted under 35 U.S.C. 154(b) by 1082 days.

(21) Appl. No.: 16/988,580

(22) Filed: Aug. 7, 2020

(65) Prior Publication Data

US 2020/0371244 A1  Nov. 26, 2020

Related U.S. Application Data

(63) Continuation of application No. PCT/JP2019/004491, filed on Feb. 7, 2019.

(30) Foreign Application Priority Data

Feb. 7, 2018 (JP) .................................. 2018-039078

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4814* (2013.01); *G01S 7/4817* (2013.01); *G01S 17/08* (2013.01);
(Continued)

(58) Field of Classification Search
None
See application file for complete search history.

(56) References Cited

U.S. PATENT DOCUMENTS

2009/0168045 A1* 7/2009 Lin ..................... G01S 7/4817  
356/4.01  
2010/0322477 A1* 12/2010 Schmitt ................. G06V 20/64  
348/222.1

(Continued)

FOREIGN PATENT DOCUMENTS

JP  62-006115  1/1987  
JP  02-129510  5/1990

(Continued)

OTHER PUBLICATIONS

WIPO, English Translation of International Search Report in corresponding PCT application PCT/JP2019/004491, Jun. 24, 2019.

(Continued)

*Primary Examiner* — Eric L Bolda

(57) ABSTRACT

The function of the three-dimensional television camera can be provided by attaching the distance to the two-dimensional position of the television camera by the distance meter side of the position of the image captured by the television camera. The high-speed tracking of the tracking mirror and the high image quality of the tracking television camera captured image enable a plurality of detailed image recognition and enable tracking image recognition of a three-dimensional space close to human status determination. The drive device for numerical control, which operates in the dimension space, is driven in that space by grasping and sharing the location of the working space. The position of the working space of the drive device for numerical control is measured.

18 Claims, 62 Drawing Sheets

(51) Int. Cl.
*G01S 17/08* (2006.01)
*G05B 19/402* (2006.01)
*G06T 7/521* (2017.01)
*H04N 23/695* (2023.01)

(52) U.S. Cl.
CPC ............ *G05B 19/402* (2013.01); *G06T 7/521* (2017.01); *H04N 23/695* (2023.01); *G05B 2219/39322* (2013.01)

(56) References Cited

U.S. PATENT DOCUMENTS

2012/0057021 A1 3/2012 Kumagai
2016/0313444 A1 10/2016 Kurata
2017/0336511 A1* 11/2017 Nerurkar ................... G06T 7/55

FOREIGN PATENT DOCUMENTS

| | | |
|---|---|---|
| JP | 04-155211 | 5/1992 |
| JP | 2001-280932 | 10/2001 |
| JP | 5008308 | 8/2006 |
| JP | 2007-064723 | 3/2007 |
| JP | 2009-175012 | 8/2009 |
| JP | 2012052946 A | 3/2012 |
| JP | 5547605 | 5/2012 |
| JP | 5547670 | 9/2012 |
| JP | 2013-207415 | 10/2013 |
| JP | 5508308 B2 | 5/2014 |
| WO | 2015097824 A1 | 7/2015 |
| WO | 2015097825 | 7/2015 |

OTHER PUBLICATIONS

WIPO, English Translation of Written Opinion in corresponding PCT application PCT/JP2019/004491, Jul. 2, 2019.

* cited by examiner

METHOD OF COMPUTING THREE-DIMENSIONAL DRIVE PARAMETER OF A THREE-DIMENSIONAL NUMERICAL DRIVE CONTROL DEVICE BY DRIVING MEASUREMENT OF A TRACKING LASER DISTANCE METER

RELATED APPLICATIONS

This application claims priority under 35 U.S.C. § 120 to, and is a continuation of, co-pending International Application PCT/JP2019/004491, filed Feb. 7, 2019, which claims priority to Japanese Application 2018-039078, filed Feb. 7, 2019, such Japanese Application also being claimed priority to under 35 U.S.C. § 119. These Japanese and International applications are incorporated by reference herein in their entireties.

BACKGROUND

Computer software, numerical control technology and image processing technology

Technique for numerical computation of numerical control, technique of operation of television camera, laser distance measuring device, and interpolation calculation

SUMMARY

In a three-dimensional space captured by a fixed television camera, a laser irradiation position for measurement of a tracking laser distance measurement device and a work position for operating the three-dimensional space by numerical control of a drive mechanism are matched on a monitor screen displaying the fixed television camera screen, and the work position thereof is measured by the tracking laser distance measuring device.

At all positions on the two-dimensional monitor screen shown in the fixed television camera, the laser irradiation position and the work position of the tracking laser distance measuring machine are matched using the respective drive values, thereby driving the drive numerical value of the tracking laser distance measuring machine that matches the drive value of the work position, so that the measurement at the work position is performed, and the work position thereof can be measured.

A numerical controller is driven to a three-dimensional space where the numerical controller is driven, and a position on the monitor screen of the television camera, a position on the monitor screen of the television camera, and a numerical value of the distance measurement of the place in advance, by interpolation and storage in an interpolation operation, so that a three-dimensional drive numerical value for driving the three-dimensional numerical control device is indicated, and the position is detected according to the position detection, the interpolated and stored values are used, to drive the numerical controller.

The tracking laser distance measuring instrument irradiates the measurement laser beam with the three-dimensional space taken by the fixed television camera, and the illuminated spot appears at a position on the monitor screen of the fixed television camera.

The tracking laser distance measuring machine is driven by a numerical control mechanism, and a drive position value thereof and a measured numerical value on the distance meter side are output and displayed.

The detected position of the fixed television camera monitor screen, or the position to be detected, of the fixed television camera monitor screen is output and displayed as a numerical value of the position on the fixed television camera scanning line.

BRIEF DESCRIPTION OF DRAWINGS

FIG. 15 illustrates the measurement distance of the tracking laser distance measuring device 3 and the drive value of the drive mechanism by performing an interpolation operation or the like in the direction in which the numerical control television camera 35 is rotated in the horizontal direction 47, C, and the like.

FIG. 16 illustrates the measurement distance of the tracking laser distance measuring device 3 and the drive value of the drive mechanism by performing an interpolation operation or the like in the direction in which the numerical control television camera 35 is rotated in the horizontal direction 48, D, and the like.

FIG. 17 is an explanatory view of a measurement distance of the tracking laser distance measuring machine 3 and a drive value of the drive mechanism in the direction in which the numerical control television camera 35 is rotated in the horizontal direction 49, E, and the like.

FIG. 21 illustrates the measurement distance of the tracking laser distance measuring device 3 and the drive value of the drive mechanism by performing an interpolation operation or the like in the direction in which the numerical control television camera 35 is rotated in the 62 vertical direction C, and the like.

FIG. 22 is a diagram illustrating a measurement distance of the tracking laser distance measuring device 3 and a drive value of the drive mechanism in a direction in which the numerical control television camera 35 is rotated in the vertical direction 63, D, and the like.

FIG. 23 is a diagram illustrating a measurement distance of the tracking laser distance measuring device 3 and a drive value of the drive mechanism in a direction in which the numerical control television camera 35 is rotated in the vertical direction 64, E, and the like.

DETAILED DESCRIPTION

A tracking laser distance measuring instrument according to an embodiment of the present invention is driven by a distance measuring instrument of a single laser beam, which is driven in the measurement direction using a drive parameter from outside by a drive mechanism, and outputs a measurement value within a minimum time and a numerical value of a measurement drive position The tracking television camera is driven by a driving mechanism from the outside by a driving mechanism. The driving mechanism is driven by a photographing mechanism such as a photographing direction, an angle of view, a zooming mechanism, a focus mechanism, and an iris mechanism. A numerical value of the driving position is output.

Figure 1:
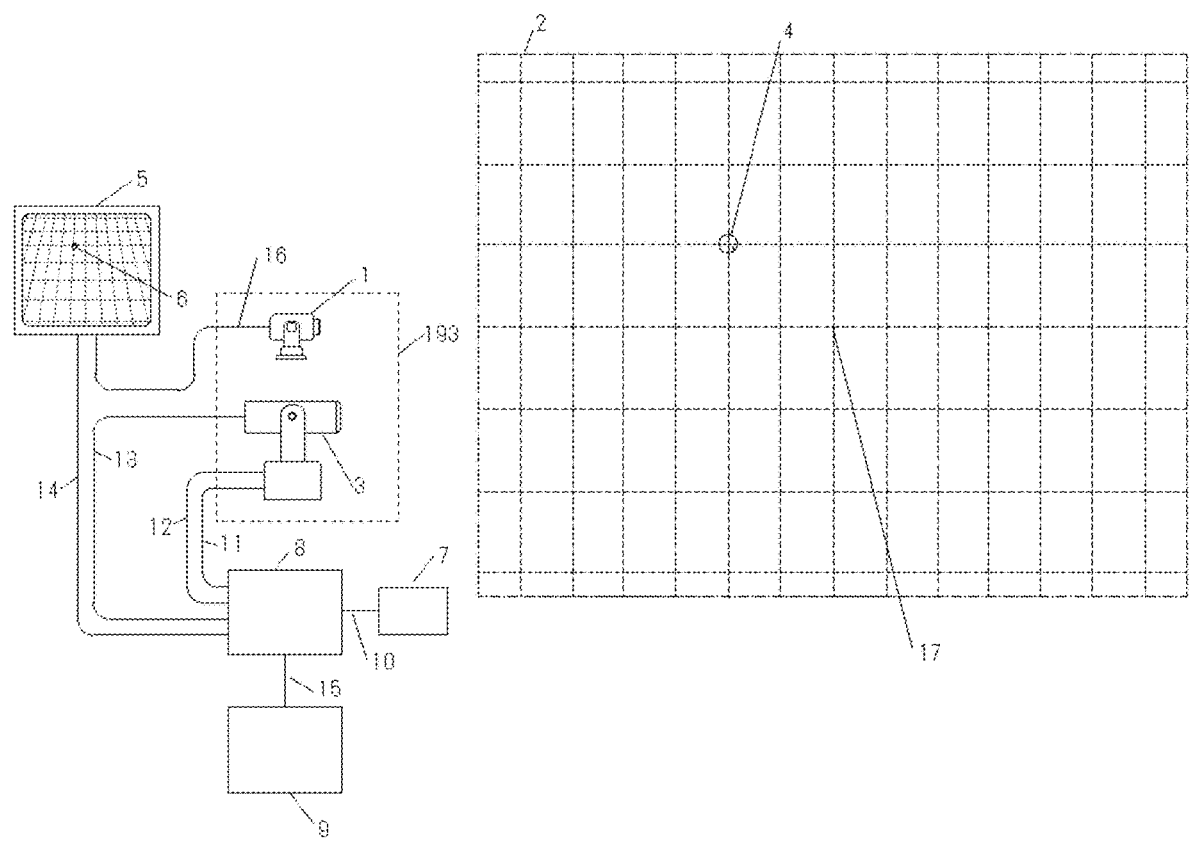
FIG. 1 is an explanatory diagram for acquiring a drive position value and a measured value thereof at all positions on the fixed television camera monitor screen at all positions on the fixed television camera monitor screen by calculation of an interpolation calculation using some of the positions on the fixed television camera monitor screen and the measured values thereof.

In FIG. 1, an irradiation place of the laser light 4 of the tracking laser distance measuring device 3, which is taken by a fixed television camera 1, is recognized, and the distance to the place can be measured.

The tracking laser distance measuring device 3 is driven by a numerical control value to the laser light irradiation position.

The tracking laser distance measuring machine 3 emits the laser beam of the distance measurement, and the irradiation position of the laser beams 6 is reflected on the screen and the position on the screen can be recognized on the fixed television camera monitor screen 5 captured by the fixed television camera 1.

The driving mechanism of the tracking laser distance measuring device 3 is driven so that the irradiation place of the laser beam for measuring the distance of the tracking laser distance measuring device 3 is shown at a corresponding position on the fixed television camera monitor screen 5 by operating the operator console 7 of the tracking laser distance measuring machine 3.

The drive value obtained by driving the drive mechanism of the tracking laser distance measurement device 3 and the distance measured by the tracking laser distance measurement device 3 are associated with the corresponding positions on the fixed television camera monitor screen 5, and are acquired to the computer 9.

The drive position value of the tracking laser distance measuring machine 3 at the irradiation position of the laser light 6 on the fixed television camera monitor screen 5 and the numerical value of the distance measured in the direction are associated with the horizontal and vertical positions of the position of the fixed television camera monitor screen 5, and are acquired to the computer 9.

As shown at different positions on the fixed television camera monitor screen 5, the drive position value obtained by driving the laser distance measuring machine 3 and the numerical value of the measured distance in the direction are acquired to the computer 9 in association with the horizontal and vertical positions of the position of the fixed television camera monitor screen 5.

Using numerical values of positions on several fixed television camera monitor screens 5 acquired in a manner shown at different locations on the fixed television camera monitor screen 5, a drive position value for driving the laser range finder 3 at all positions on the fixed television camera monitor screen 5, and a numerical value obtained by acquiring the distance measured in the irradiation direction in the associated computer 9, compute operations with interpolation operations and the like, the interpolation is performed.

Figure 2:
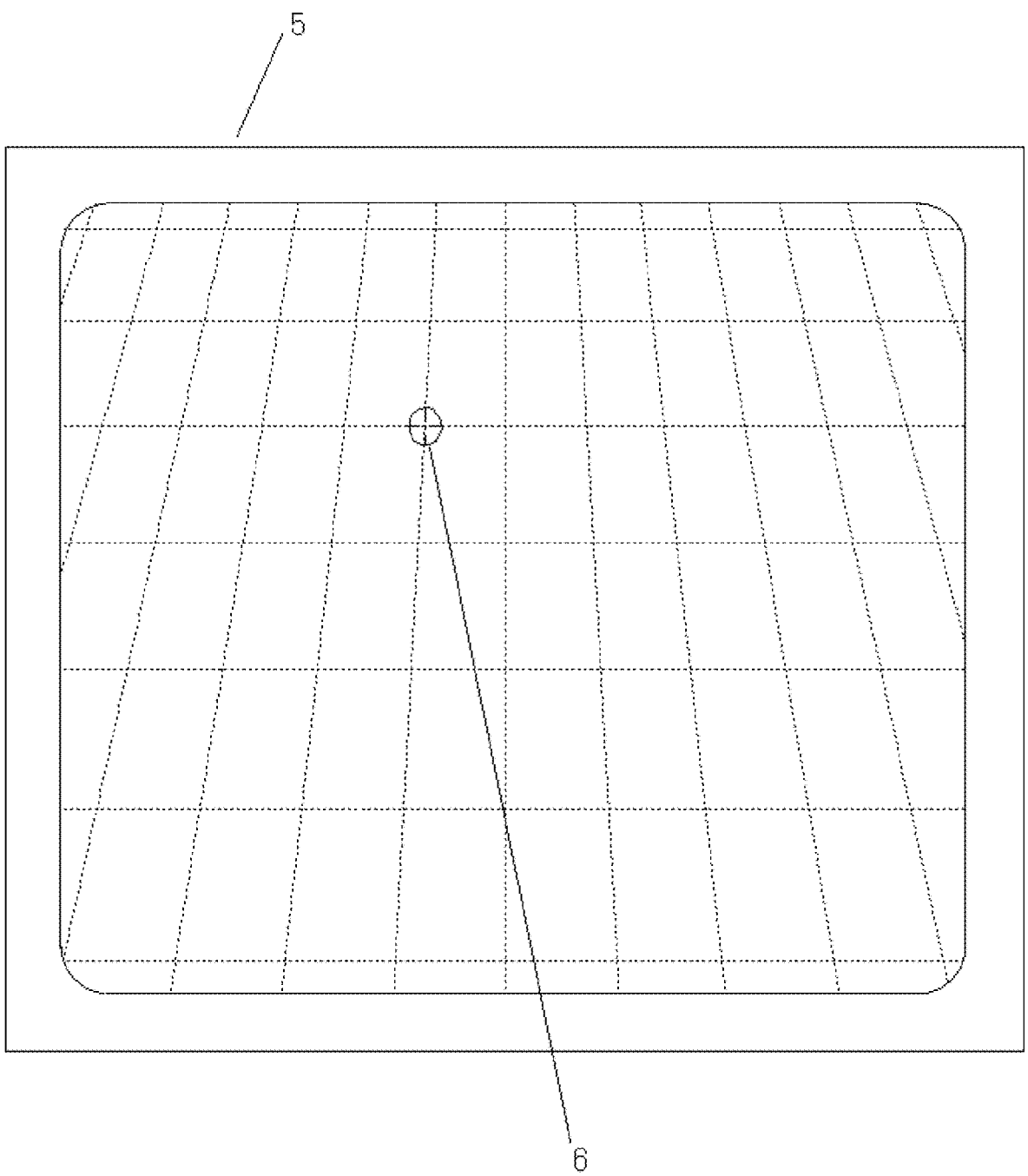
FIG. 2 is an explanatory diagram for acquiring the distance from the fixed television camera at several positions on the fixed television camera monitor screen by calculation such as interpolation calculation of the numerical values of positions on all the screens.

FIG. 2 shows an irradiation position of laser beams 6 on the fixed television camera monitor screen 5.

The fixed television camera monitor screen 5 is displayed in several sections as shown in the Figure, and the drive mechanism of the tracking laser distance measuring apparatus 3 is driven through the tracking controller 8 by operating the operator console 7 so as to show the position where the laser light for the distance meter side of the tracking laser distance measuring machine 3 is irradiated.

For each partition position, the drive position value obtained by driving the drive mechanism and the measured distance in the direction are acquired.

The drive position value and the measured distance are stored in the computer 9 via the tracking controller 8.

By using the numerical value stored for each partition position and using the numerical value, the drive position value and the measurement distance at all positions between the division positions are calculated and interpolated by a computer 9 interpolation operation or the like.

Since the interpolated value is acquired by the tracking controller 8, the drive position value of the tracking laser distance measuring machine 3 at that position and the distance to be measured are grasped at the positions on all the screens of the fixed television camera monitor screen 5 shown in FIG. 2.

By attaching the distance meter side value of the tracking laser distance measuring machine 3 to the position shown on the fixed television camera monitor screen 5 at the position measured by the laser light for the distance measuring instrument of the tracking laser distance measuring machine, it is possible to know the three-dimensional shape of the two-dimensional plane captured by the fixed television camera 1.

Figure 3:
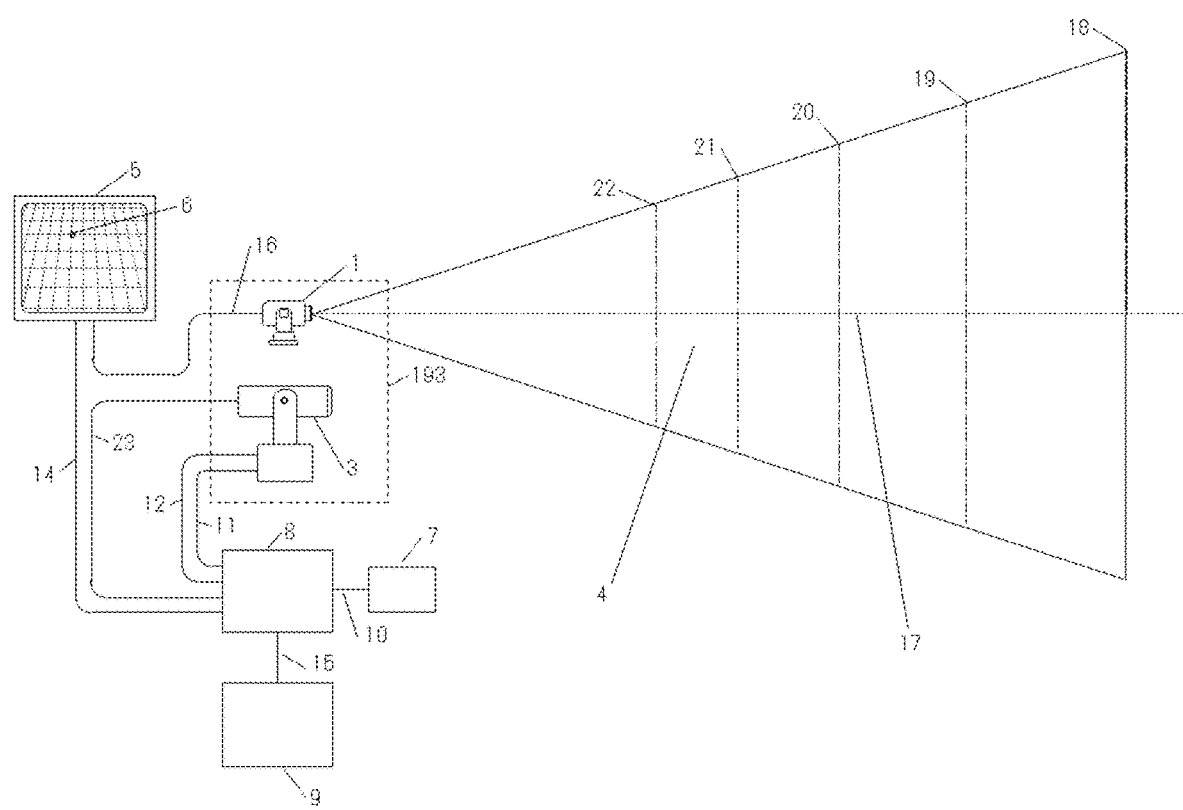
FIG. 3 is an explanatory diagram of a distance from a fixed television camera to a plane A, B, C, D, and E fixed television camera shooting range.

FIG. 3 is a description of a method of acquiring the drive position value obtained by driving the drive mechanism of the tracking laser distance measuring device 3 and the measured distance in the direction of the television camera in a plane in which the distance of the central axis taken by the fixed television camera is different.

The distance A to the fixed television camera shooting range 18, the distance B from the fixed television camera shooting range 19, the distance C from the fixed television camera shooting range 20, the distance D from the fixed television camera shooting range 21, and the distance E to the fixed television camera shooting range 22 indicate the distance of the center axis taken by the fixed television camera.

Figure 4:
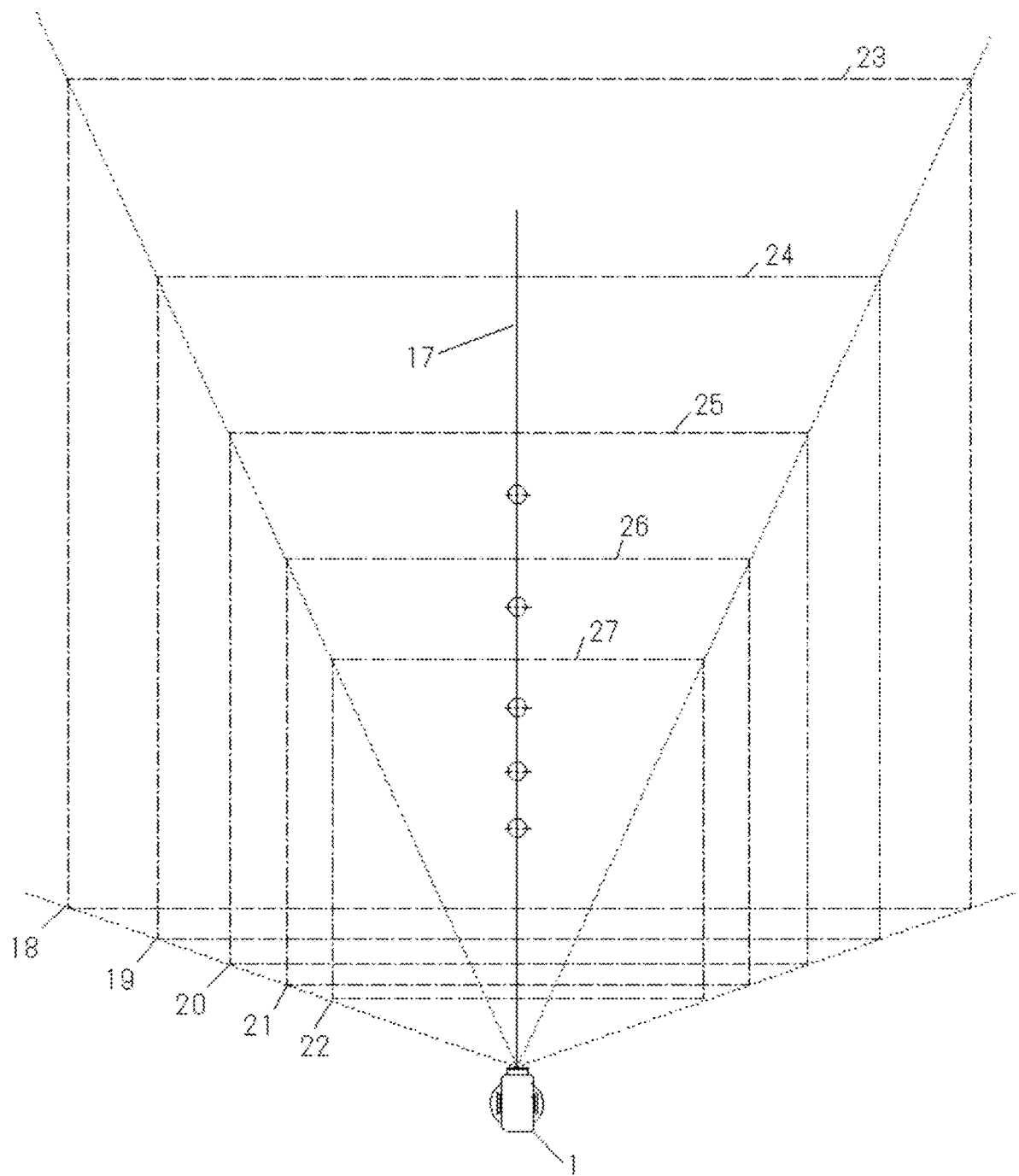
FIG. 4 is an illustration of a method of acquiring the drive position value and the measured distance in that direction, by fixed television camera 1 in imaging ranges of several different distances.

FIG. 4 does not change the angle of view and the direction of view of the fixed television camera, but for each location of fixed television camera imaging ranges 23 to 27, A to E captured by a fixed television camera 1 at several different distances, the tracking laser range finder 3 causes the irradiation place of the laser beams 4 to appear at a corresponding position on the fixed television camera monitor screen 5, a method of acquiring a drive position value obtained by driving the drive mechanism and a measured distance in the direction will be described.

Figure 5:
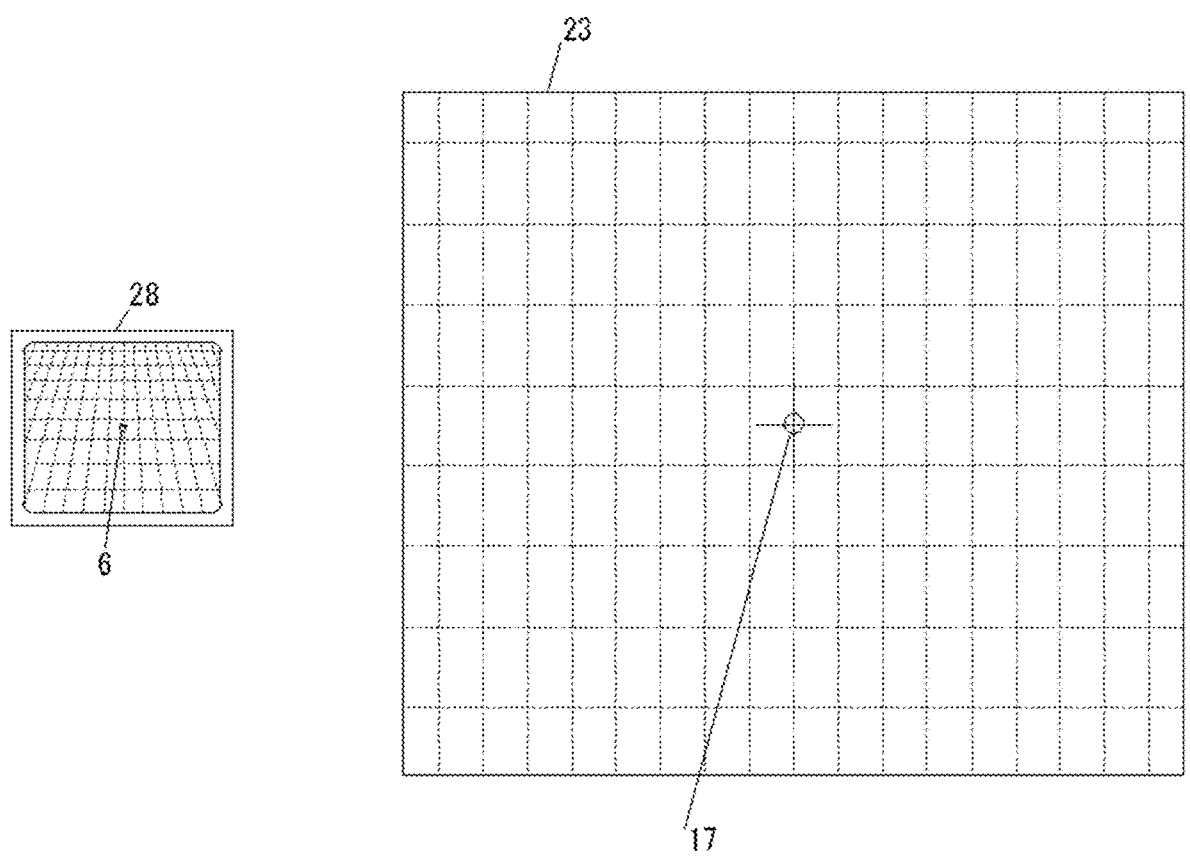
FIG. 5 is a description of a method of acquiring the distance A to the fixed television camera shooting range 18 and the drive position value obtained by driving the drive mechanism of the tracking laser distance measuring device 3 and the measured distance in the direction.

FIG. 5 is an explanatory diagram illustrating the distance measurement of the tracking laser distance measuring device 3 and the irradiation of laser light at a distance A from the fixed television camera 1 to the fixed television camera shooting range 18.

The fixed television camera shooting range 23, A does not change the angle of view and the shooting direction of the fixed television camera, and the image of the fixed television camera is captured at a position on the fixed television camera monitor screen 5. This is a description of a method of acquiring a drive position value obtained by driving the drive mechanism for measuring the distance of the tracking laser distance measuring device 3 and measuring the measured distance in the direction.

At a corresponding position on the fixed television camera monitor screen 5 shot by fixed television camera 1 at each distance, the drive position value and the measured distance at all positions on the screen at the distance are calculated and interpolated by the method described with reference to FIGS. 1 and 2.

This is an explanatory diagram for storing the calculated numerical values in computers 9.

Figure 6:
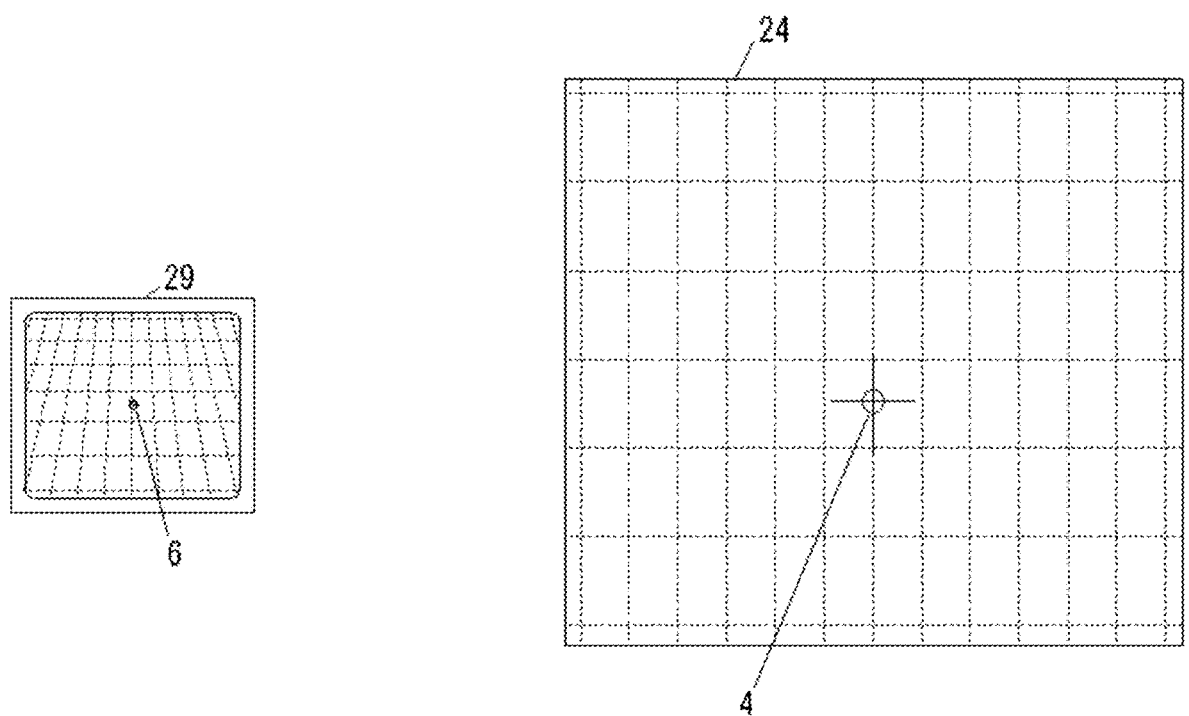
FIG. 6 is a description of a method of acquiring the distance B to the fixed television camera shooting range 19 and the drive position value obtained by driving the drive mechanism of the tracking laser distance measuring device 3 and the measured distance in the direction.

FIG. 6 is an explanatory diagram illustrating the distance measurement of the tracking laser distance measuring device 3 and the irradiation of laser light at a distance B from the fixed television camera 1 to the fixed television camera 19 imaging range.

Similarly, in the method described with reference to FIGS. 1 and 2, the drive position value and the measured distance at all positions on the screen at the distance B to the fixed television camera shooting range 19 are calculated and interpolated at all positions on the screen by the method described with reference to FIGS. 1 and 2.

The calculated numerical values are stored in computers 9.

Figure 7:
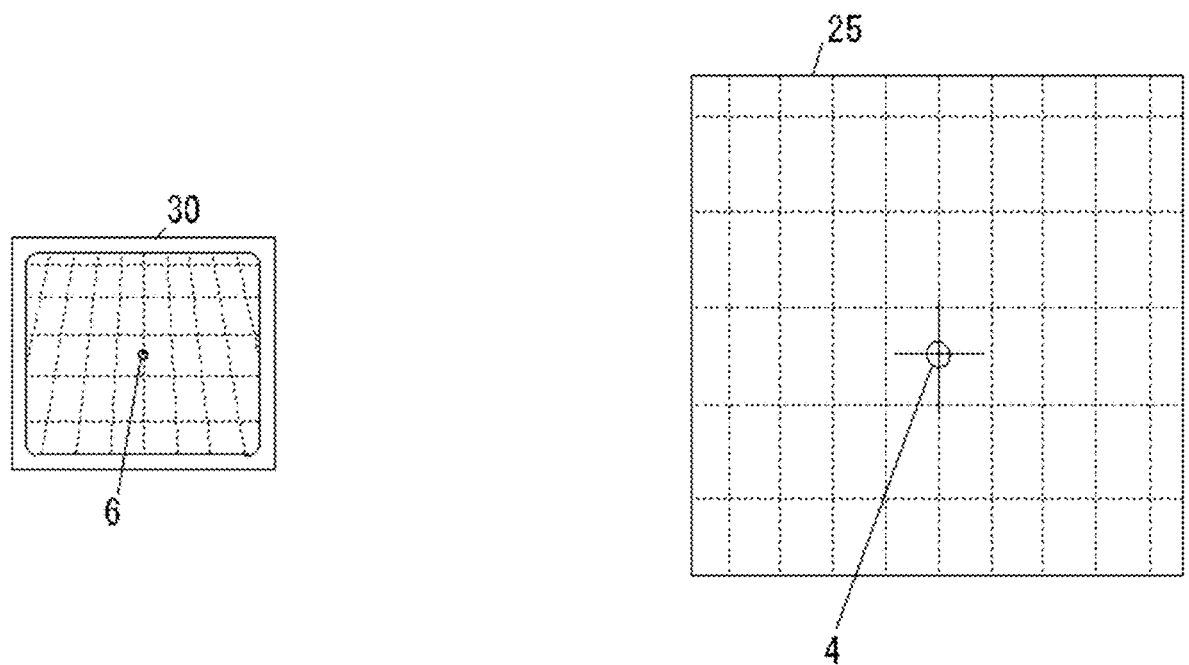
FIG. 7 is a description of a method of acquiring the distance C to the fixed television camera shooting range 20 and the method of acquiring the drive position value obtained by driving the drive mechanism of the tracking laser distance measuring device 3 and the measured distance in the direction.

FIG. 7 is an explanatory diagram for measuring the distance from the fixed television camera 1 to the fixed television camera shooting range 20 and irradiating laser light for measuring the distance of the tracking laser distance measuring device 3.

Similarly, in the method described in FIGS. 1 and 2, the drive position value and the measurement distance at all positions on the screen in the monitor screen of the fixed television camera imaging range 30, C are calculated and interpolated at all positions on the screen by the method described in FIGS. 1 and 2. The calculated numerical values are stored in computers 9.

Figure 8:
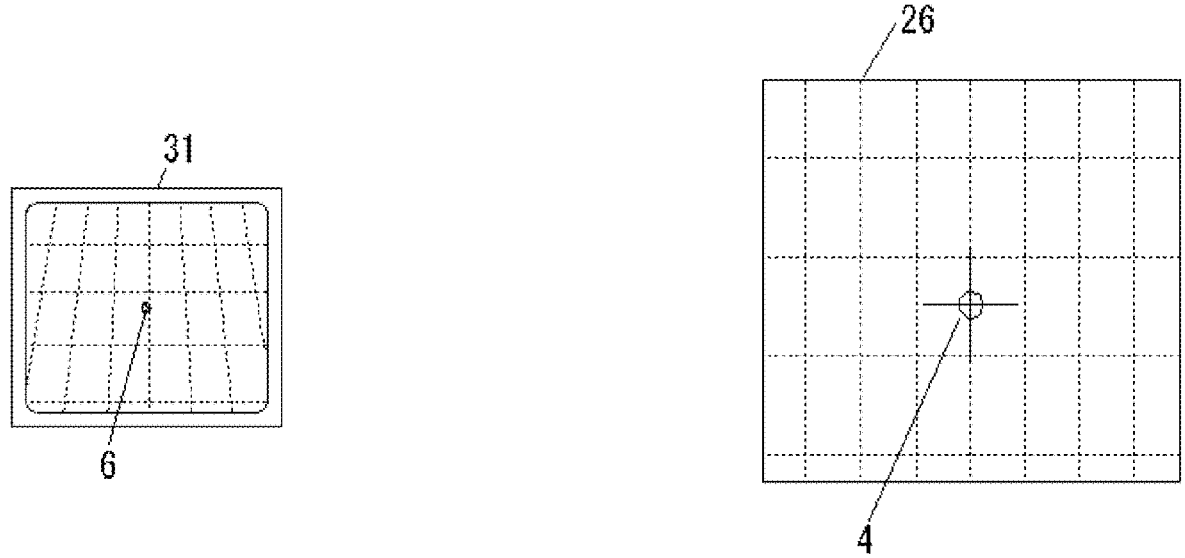
FIG. 8 is a description of a method of acquiring the distance D to the fixed television camera shooting range 21 and the drive position value obtained by driving the drive mechanism of the tracking laser distance measuring device 3 and the measured distance in the direction.

FIG. 8 is an explanatory diagram for measuring the distance D from the fixed television camera 1 to the fixed television camera shooting range 21 and irradiating the laser light for measuring the distance of the tracking laser distance measuring device 3.

Similarly, in the method described in FIGS. 1 and 2, the drive position value and the measurement distance at all positions on the screen in the monitor screen of the fixed television camera shooting range 31, D are calculated and interpolated by the method described with reference to FIGS. 1 and 2. The calculated numerical values are stored in computers 9.

Figure 9:
FIG. 9 is a description of a method of acquiring the distance E to the fixed television camera shooting range 22 and the drive position value obtained by driving the drive mechanism of the tracking laser distance measuring device 3 and the measured distance in the direction.

FIG. 9 is an explanatory diagram for measuring the distance from the fixed television camera 1 to the fixed television camera shooting range 22 and irradiating the laser light for measuring the distance of the tracking laser distance measuring device 3.

Similarly, in the method described in FIGS. 1 and 2, the drive position value and the measurement distance at all positions on the screen in the monitor screen of the fixed television camera imaging range 32, E are calculated and interpolated at all positions on the screen by the method described in FIGS. 1 and 2. The calculated numerical values are stored in computers 9.

Figure 10:
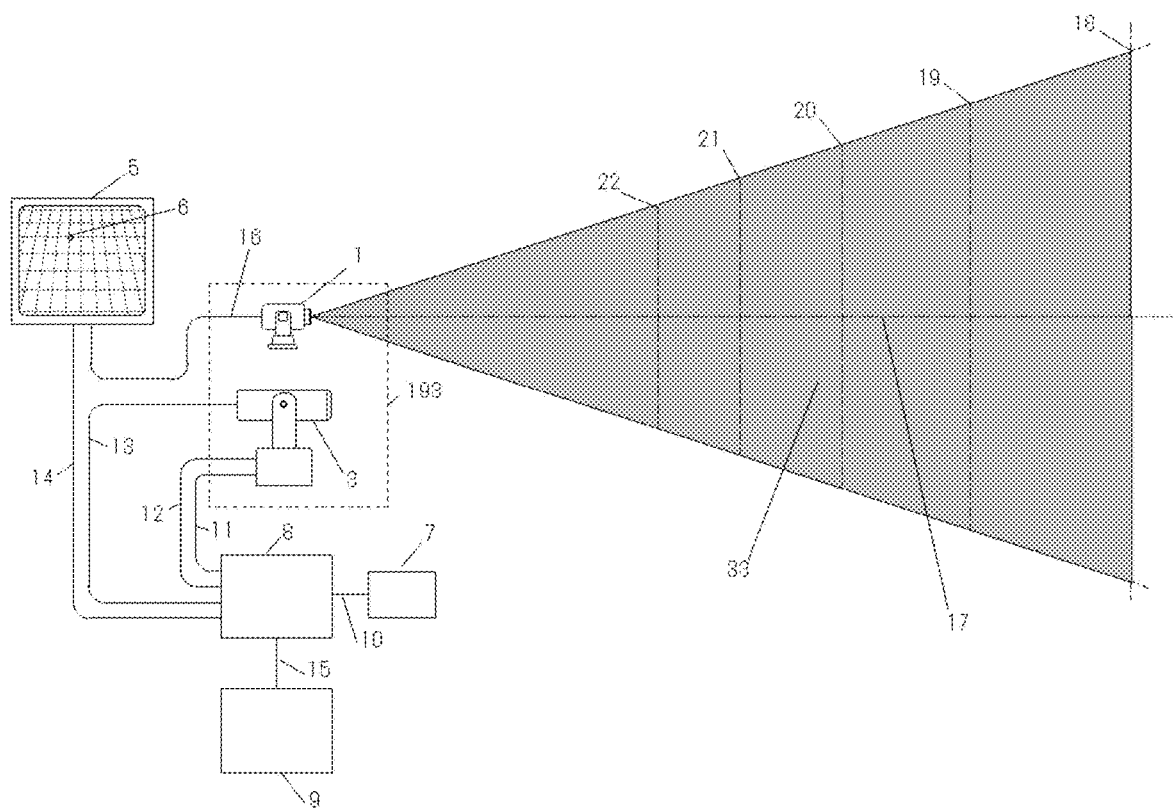
FIG. 10 is a description of a method of acquiring all the drive position values in the vertical direction at distances A to E ranging from fixed television camera imaging ranges 18 to 22, using numerical values of the drive position values measured in the direction and distances A to E measured in the direction to fixed television camera imaging ranges 18 to 22.

FIG. 10 shows, for each distance of the central axis of the fixed television camera, described above, at a location corresponding to that of the fixed television camera imaging range 2 corresponding to all positions shown on the fixed television camera monitor screen 5, such as interpolation calculation in a two-dimensional plane to be displayed on the fixed television camera monitor screen 5, the tracking laser distance measuring machine 3 calculates and stores a drive position value for irradiating the distance meter side laser beam by an interpolation operation or the like.

Next, for each distance of the central axis of the fixed television camera described above, the drive value of the three-dimensional tracking laser distance measuring machine 3 at all positions shown on the fixed television camera monitor screen 5 and the measured distance of the tracking laser distance measuring machine 3 at the drive numerical value are calculated and stored in an interpolation operation or the like.

For each distance of the central axis of the fixed television camera, the calculated numerical values at all positions on the monitor screen of the range A to E of the fixed television camera shooting range A to E of the fixed television camera to the fixed television camera shooting range 18 to 22, A to E are stored in computer 9.

For each distance of the central axis of a fixed television camera 1, values stored for each distance of distances A to E from the fixed television camera to the fixed television camera imaging range 18 to 22 are used, the drive position value of the tracking laser distance meter 3 and its measurement distance at all distances between the numerical values of the several distances are stored in a computer 9 and the calculated values thereof are used, interpolation is performed by interpolation calculation or the like at all positions on the fixed television camera monitor screen 5.

The instruction of the fixed television camera monitor screen 5 is a two-dimensional display, but the drive position value of the tracking laser distance measuring device 3 is guided by setting the distance, and the tracking laser distance measuring device 3 is driven.

When the drive position value of the tracking laser distance measuring machine 3 is set, the distance is specified, the direction is irradiated, and if there is reflected light of the tracking laser distance measuring machine 3, the distance can also be measured.

By specifying the distance in the direction of the two-dimensional plane to be displayed on the fixed television camera monitor screen 5, it is possible to specify the drive value of the tracking laser distance measuring machine 3 and measure the three-dimensional location of the imaging range of the fixed television camera 1 in the three-dimensional space.

By specifying the drive value of the tracking laser distance measuring machine 3 in the position to be displayed on the fixed television camera monitor screen 5 and the direction of the two-dimensional plane, it is possible to specify the three-dimensional location of the imaging range of the fixed television camera in the three-dimensional space, and to specify the vertical distance in the two-dimensional plane direction.

Figure 11:
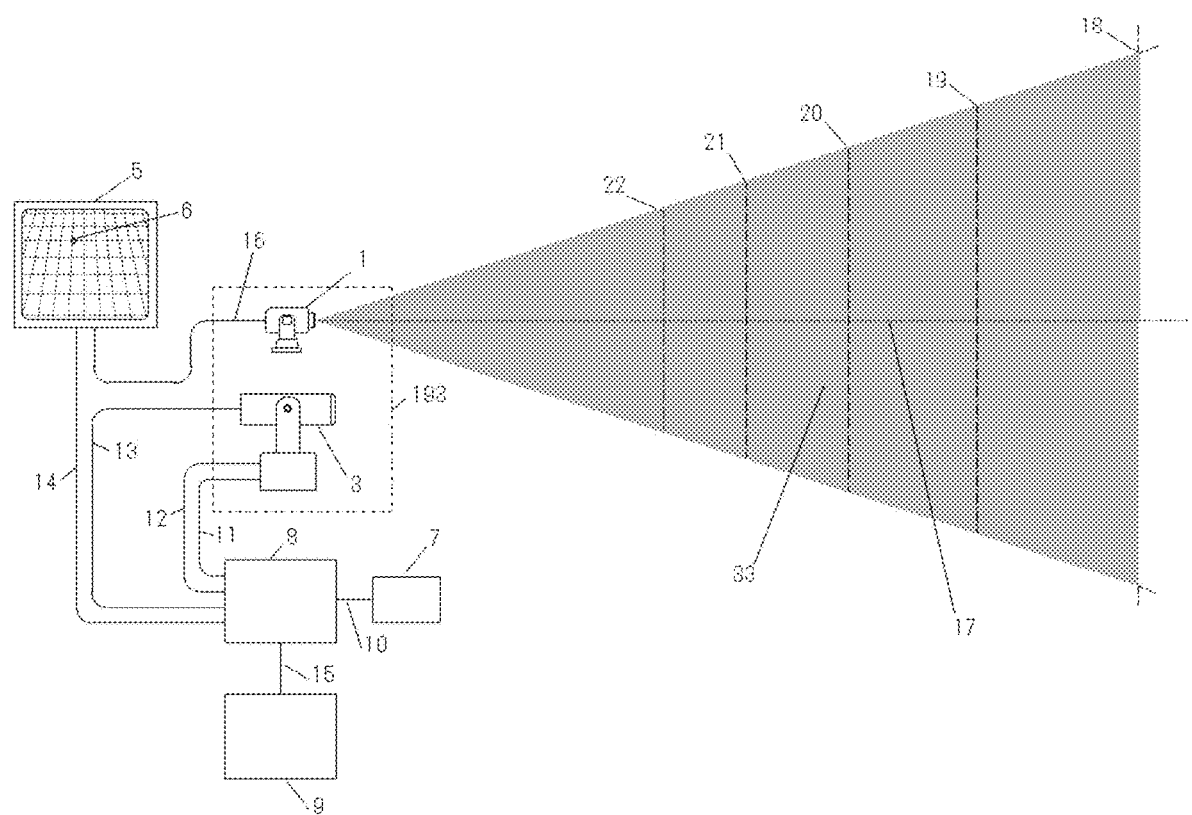
FIG. 11 is a description of a method of acquiring all the drive position values in the horizontal direction at distances A to E ranging from fixed television camera imaging ranges 18 to 22, using numerical values of the drive position values measured in the direction and distances A to E measured in the direction to fixed television camera imaging ranges 18 to 22.

FIG. 11 illustrates the three-dimensional vertical plane described above in a three-dimensional horizontal direction.

The position on the fixed television camera monitor screen 5 in which the fixed television camera imaging range 2 of the fixed television camera 1 is captured can be measured by the tracking laser distance measuring machine 3 at a horizontal distance from fixed television camera 1 to all positions.

Alternatively, when a distance between all positions is specified from a fixed television camera at a position on a fixed television camera monitor screen 5 in which a fixed television camera shooting range 2 of a fixed television camera is captured, irradiation light of a tracking laser distance measuring apparatus 3 can also be taken.

Figure 12:
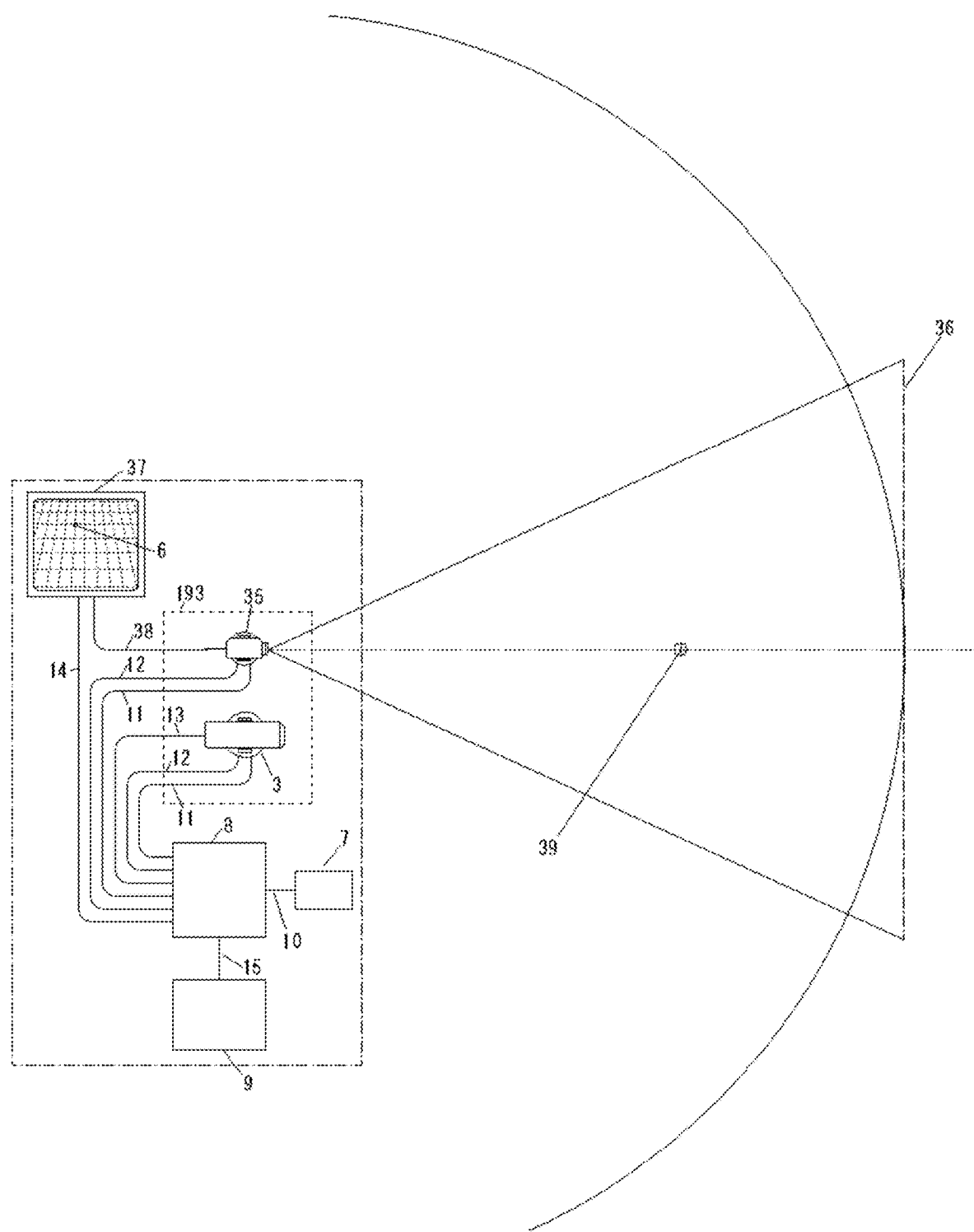
FIG. 12 is a description of a method of acquiring a distance to a numerical control television camera shooting range, a drive position value obtained by driving a drive mechanism of the numerical control television camera in the direction, and a measured distance in the direction.

FIG. 12 is an explanatory diagram for calculating an interpolation operation to be acquired by changing the imaging in the horizontal direction.

FIG. 12 is obtained by calculating the driving value and the measured distance of the tracking laser distance measuring machine 3 at all positions on the fixed television camera monitor screen 5 of the fixed television camera 1 and the tracking laser distance measuring machine 3 described above by an interpolation calculation or the like from several numerical values A description will be given of shooting a space in all three dimensions in three dimensions by fixing the angle of view of the numerical control television camera 35 and changing the imaging direction in the horizontal direction.

Figure 13:
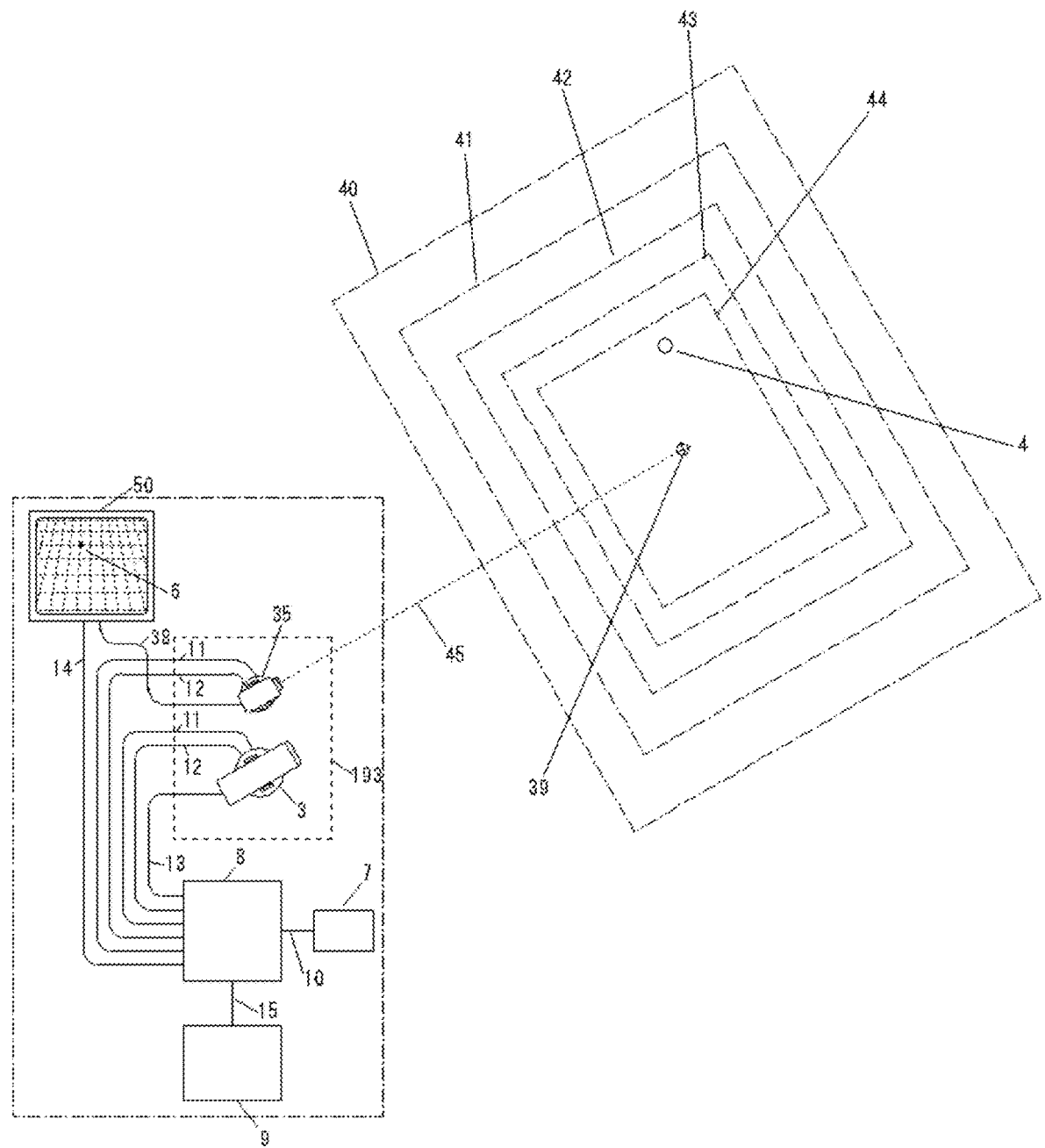
FIG. 13 illustrates the measurement distance of the tracking laser distance measuring device 3 and the drive value of the drive mechanism by performing an interpolation operation or the like in the direction in which the numerical control television camera 35 is rotated in the horizontal direction 45, A.

FIG. 13 shows the distance value of the interpolation calculation and the drive value of the interpolation calculation by rotating the numerical control television camera 35 in the horizontal direction 45, A.

At all distances from the numerical control television camera 35, the distance value of the interpolation calculation and the drive numerical value of the interpolation operation of the tracking laser distance measuring machine 3 described above are calculated and acquired at all positions on the numerical control television camera monitor screen 50, A in which the numerical control television camera horizontal imaging range 40, A is projected.

The numerical control television camera is rotated in the horizontal direction 45, A, and the numerical value thereof is stored in computer 9 in the drive value of the drive mechanism.

Figure 14:
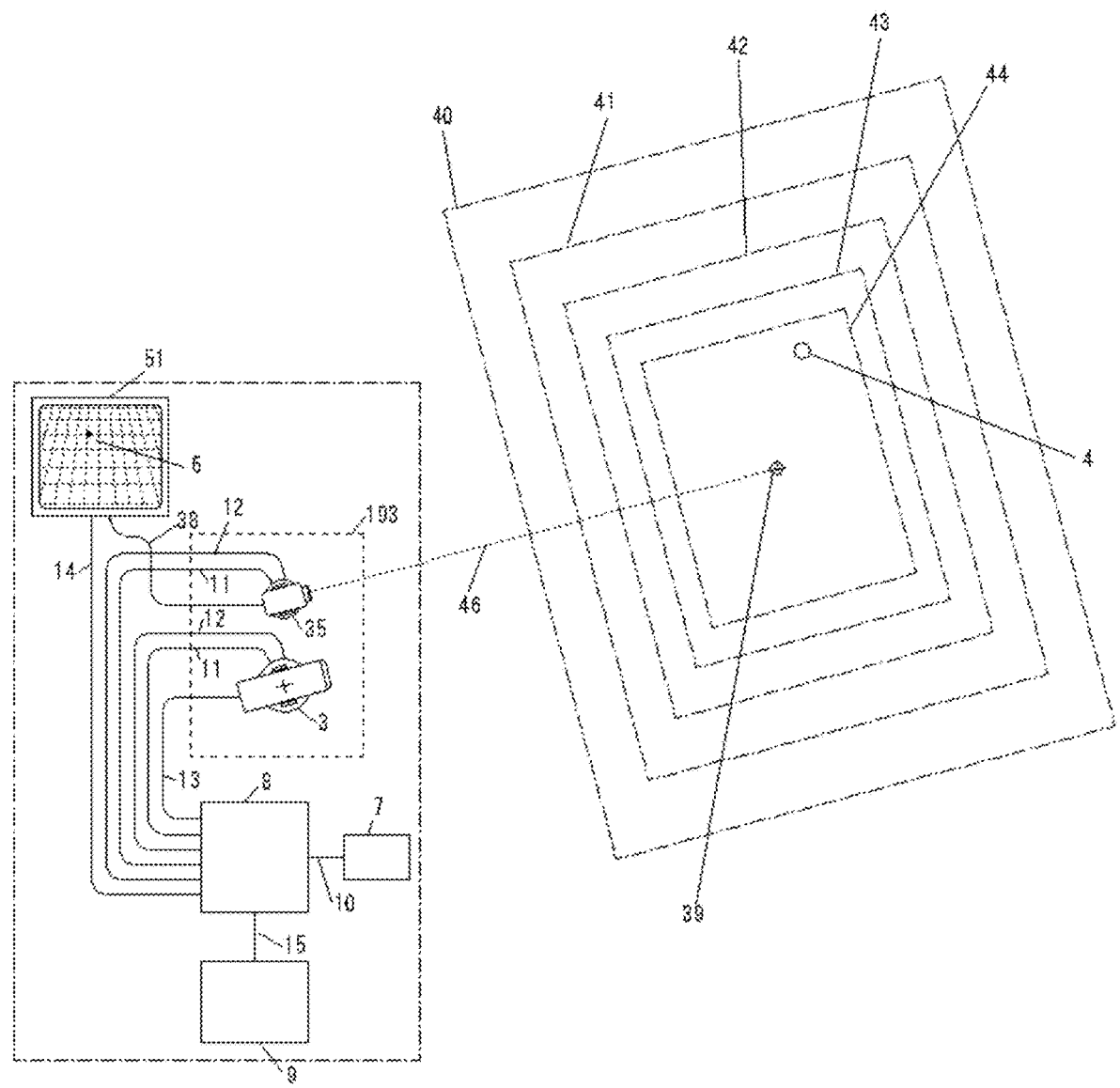
FIG. 14 is a diagram illustrating a measurement distance of the tracking laser distance measuring device 3 and a drive value of the drive mechanism in a direction in which the numerical control television camera 35 is rotated in the horizontal direction 46, B.

FIG. 14 shows the distance value of the interpolation calculation and the drive value of the interpolation calculation obtained by rotating the numerical control television camera 35 in the horizontal direction 46, B.

At all distances from the numerical control television camera 35, the distance value of the interpolation operation and the drive value of the interpolation operation of the tracking laser distance measuring machine 3 described above are calculated and acquired at all positions on the numerical control television camera monitor screen 51, B.

The numerical control television camera is rotated in the horizontal direction 46, B and the numerical value thereof is stored in computer 9.

Figure 15:
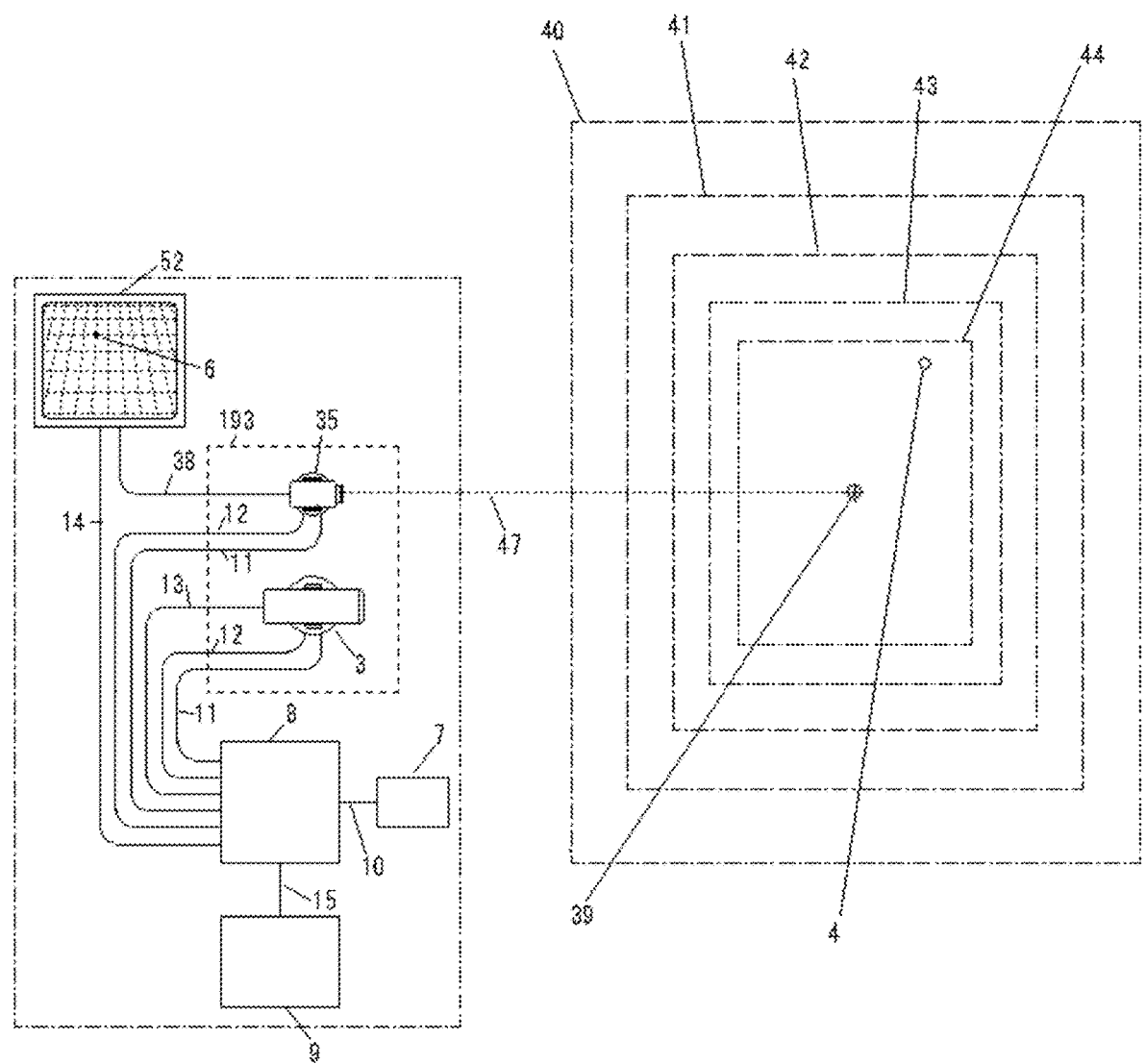

FIG. 15 is obtained by rotating the numerical control television camera 35 in the horizontal direction 47, C to calculate the distance value of the interpolation calculation and the drive value of the interpolation calculation.

At all distances from the numerical control television camera 35, the distance value of the interpolation operation and the drive value of the interpolation operation of the tracking laser distance measuring machine 3 described above are calculated and acquired at all positions on the numerical control television camera monitor screen 52, C so as to project the numerical control television camera 42 horizontal shooting range C described above.

The numerical control television camera is rotated in the horizontal direction 47, C and the numerical value thereof is stored in computer 9 in the drive value of the drive mechanism.

Figure 16:
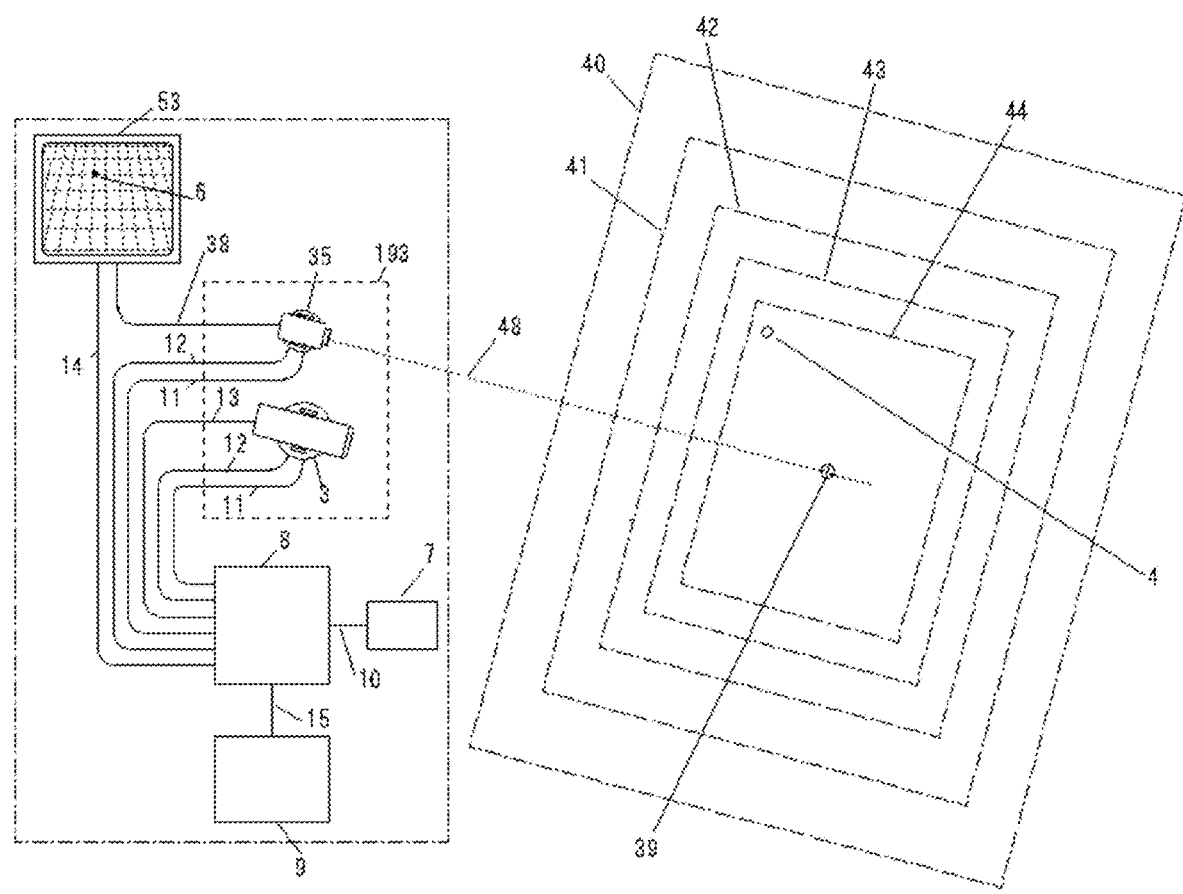

In FIG. 16, a numerical control television camera 35 is rotated in the horizontal direction 48, D, and the distance value of the interpolation calculation and the drive value of the interpolation calculation are calculated and acquired.

At all distances from the numerical control television camera 35, the distance value of the interpolation operation of the tracking laser distance measuring machine 3 and the drive value of the interpolation operation of all positions on the numerical control television camera monitor screen 53, D are calculated and acquired.

The numerical control television camera is rotated in the horizontal direction 48, D, and the numerical value thereof is stored in computer 9 in the drive value of the drive mechanism.

Figure 17:
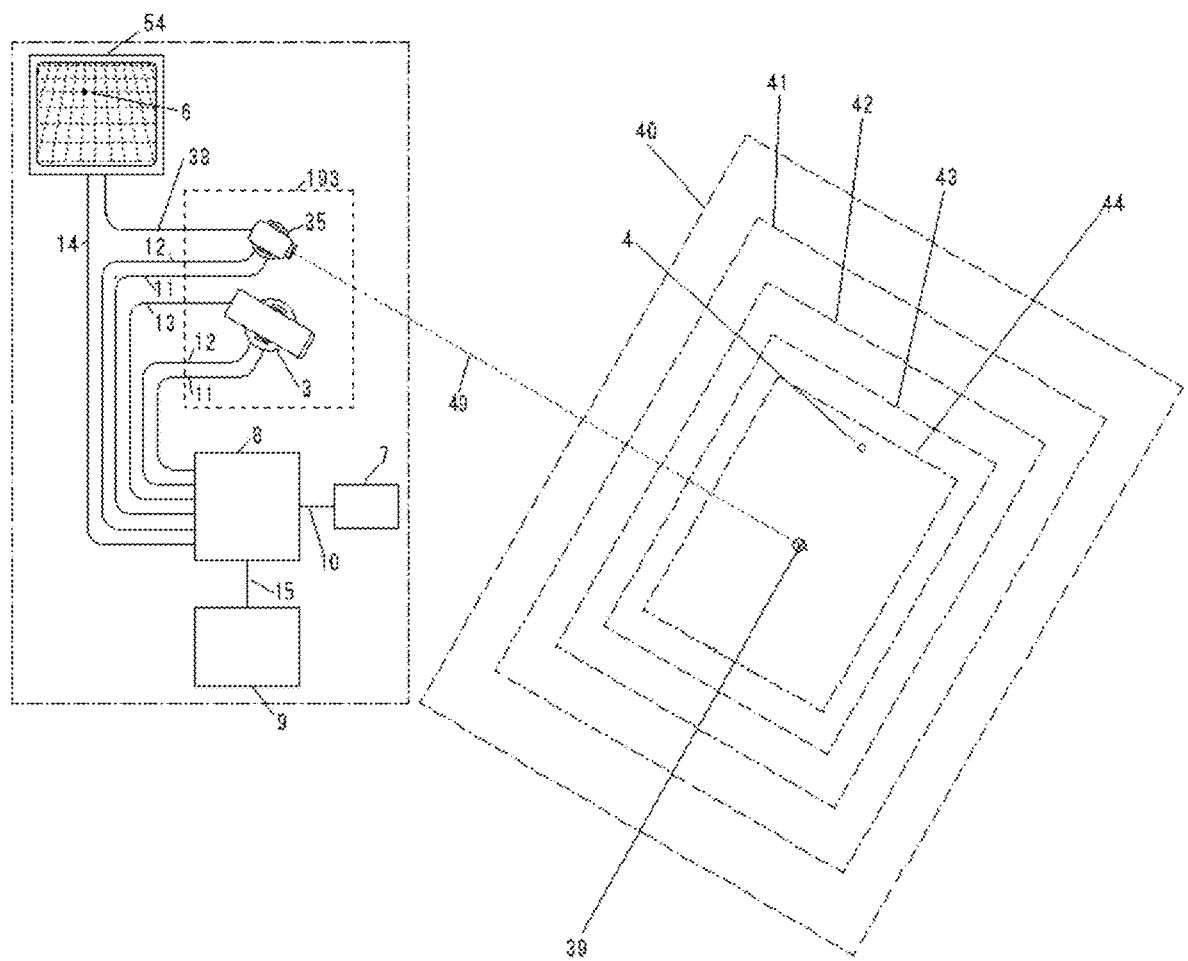

FIG. 17 is obtained by rotating the numerical control television camera 35 in the horizontal direction 49, E to calculate the distance value of the interpolation calculation and the drive value of the interpolation calculation.

At all distances from the numerical control television camera 35, the distance value of the interpolation operation of the tracking laser distance measuring machine 3 and the drive value of the interpolation operation of all positions on the numerical control television camera monitor screen 54, E are calculated and acquired.

The numerical control television camera is rotated in the horizontal direction 49, E, and the numerical value thereof is stored in computer 9.

Figure 18:
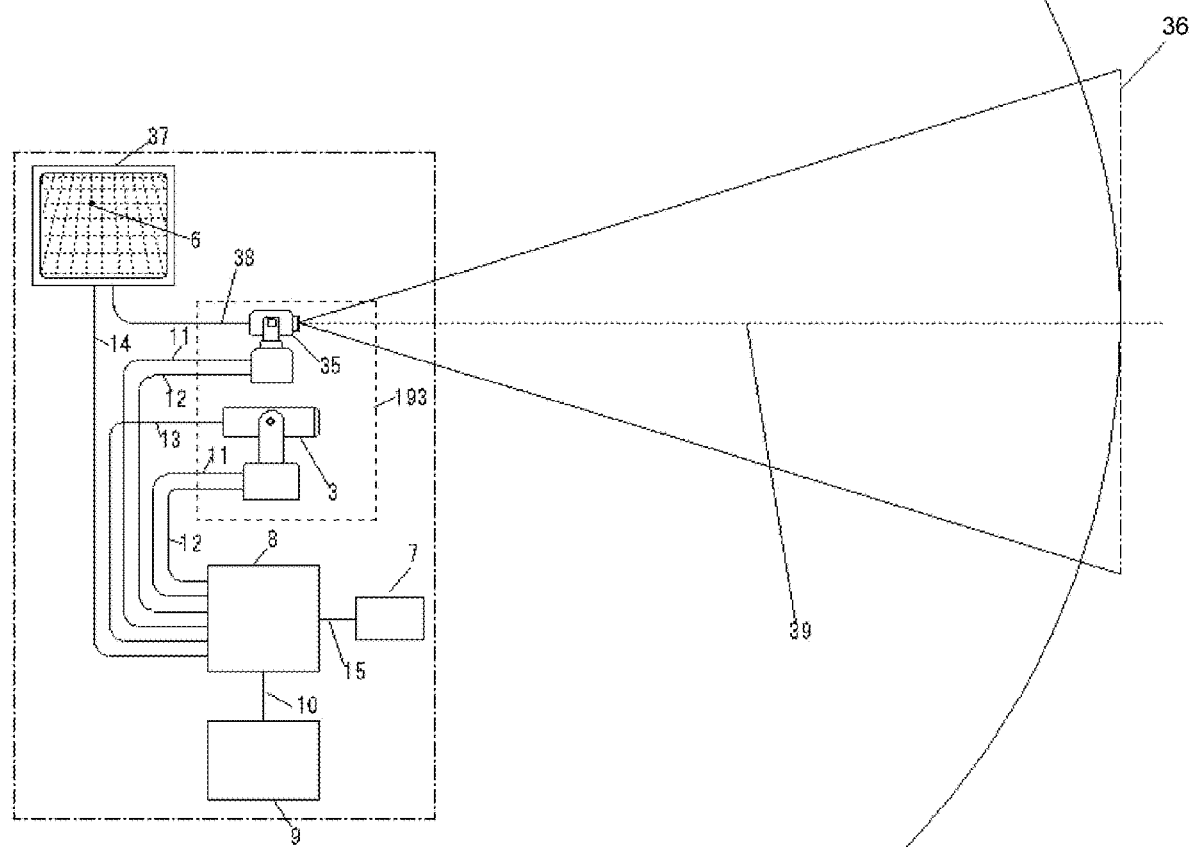
FIG. 18 is a description of a method of acquiring a distance to a numerical control television camera shooting range, a drive position value obtained by driving a drive mechanism of the numerical control television camera in the direction, and a measured distance in the direction.

FIG. 18 is an explanatory diagram for calculating an interpolation operation that is acquired by changing the imaging in the vertical direction.

FIG. 18 is obtained by calculating the driving value and the measured distance of the tracking laser distance measuring machine 3 at all positions on the fixed television camera monitor screen 5 of the fixed television camera 1 and the tracking laser distance measuring machine 3 described above by interpolation calculation or the like from several numerical values A description will be given of a drive numerical value that fixes the angle of view of the numerical control television camera 35 and captures the space of all three dimensions in three dimensions by changing the imaging direction in the vertical direction.

Figure 19:
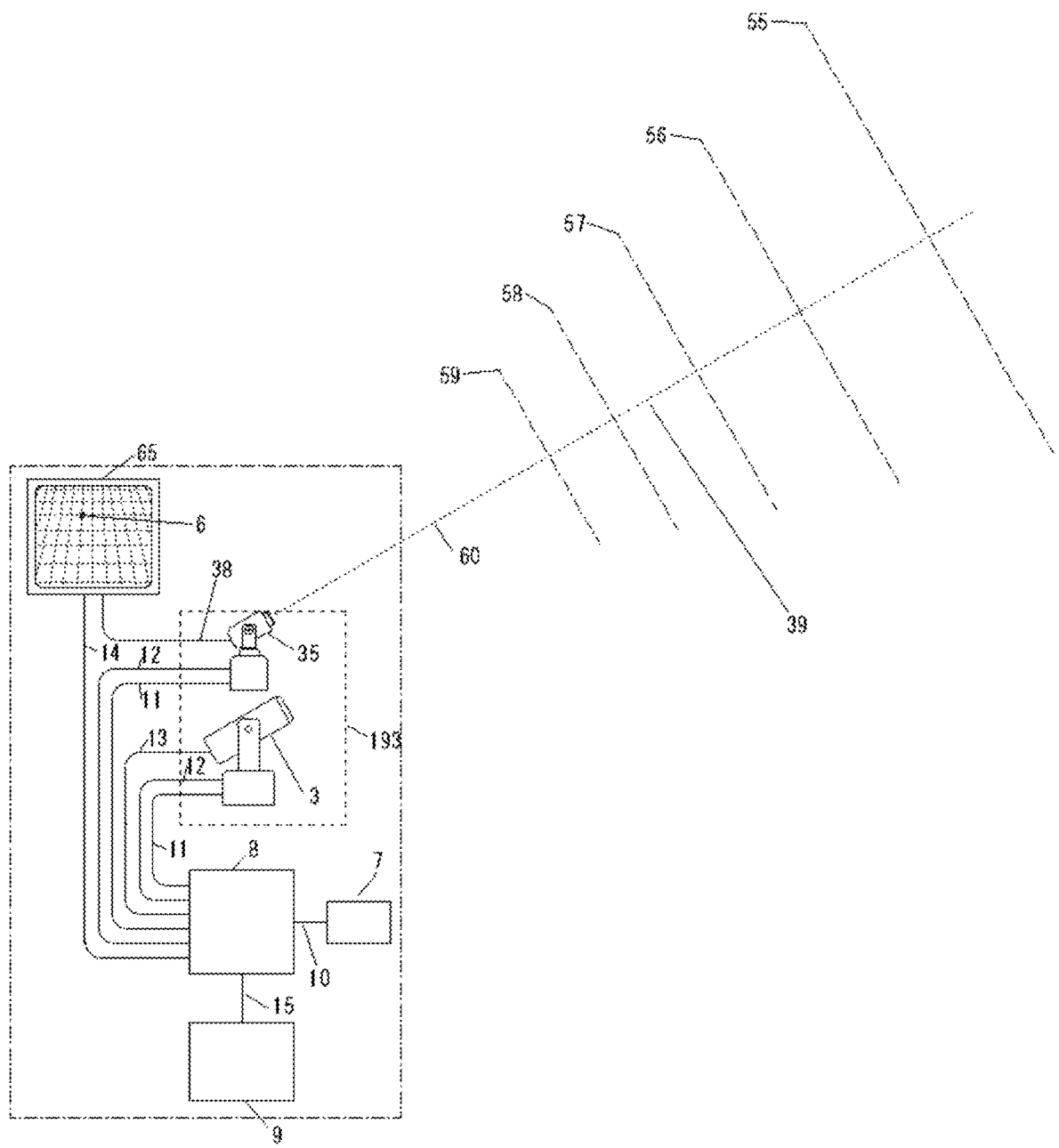
FIG. 19 is a diagram illustrating a measurement distance of the tracking laser distance measuring device 3 and a drive value of the drive mechanism in a direction in which the numerical control television camera 35 is rotated in the vertical direction 60, A.

FIG. 19 shows the distance value of the interpolation calculation and the drive value of the interpolation calculation obtained by rotating the numerical control television camera 35 in the vertical direction 60, A.

At all distances from the numerical control television camera 35, the distance value of the interpolation calculation and the drive numerical value of the interpolation operation of the tracking laser distance measuring machine 3 described above are calculated and acquired at all positions on the numerical control television camera monitor screen 65, A.

The numerical control television camera is rotated in the vertical direction 60, A, and the numerical value thereof is stored in computer 9.

Figure 20:
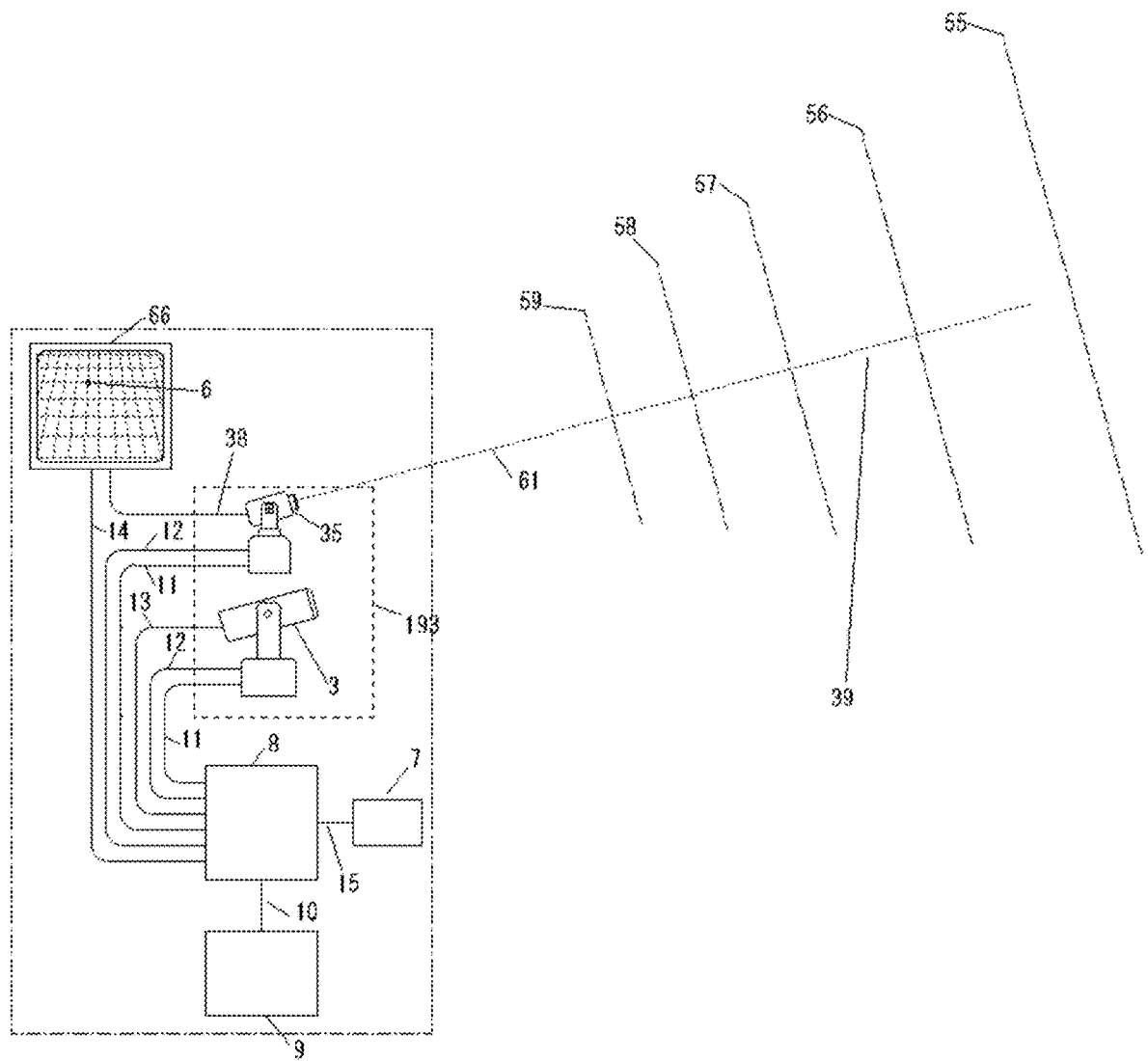
FIG. 20 illustrates the measurement distance of the tracking laser distance measuring device 3 and the drive value of the drive mechanism by performing an interpolation operation or the like in the direction in which the numerical control television camera 35 is rotated in the vertical direction 61, B.

FIG. 20 shows the distance value of the interpolation calculation and the drive value of the interpolation calculation obtained by rotating the numerical control television camera 35 in the vertical direction 61, B.

At all distances from the numerical control television camera 35, the distance value of the interpolation operation of the tracking laser distance measuring machine 3 and the drive value of the interpolation operation of all positions on the numerical control television camera monitor screen 66-B are calculated and acquired.

The numerical control television camera is rotated in the vertical direction 61, B, and the calculated numerical value of the drive mechanism is stored in computer 9.

Figure 21:
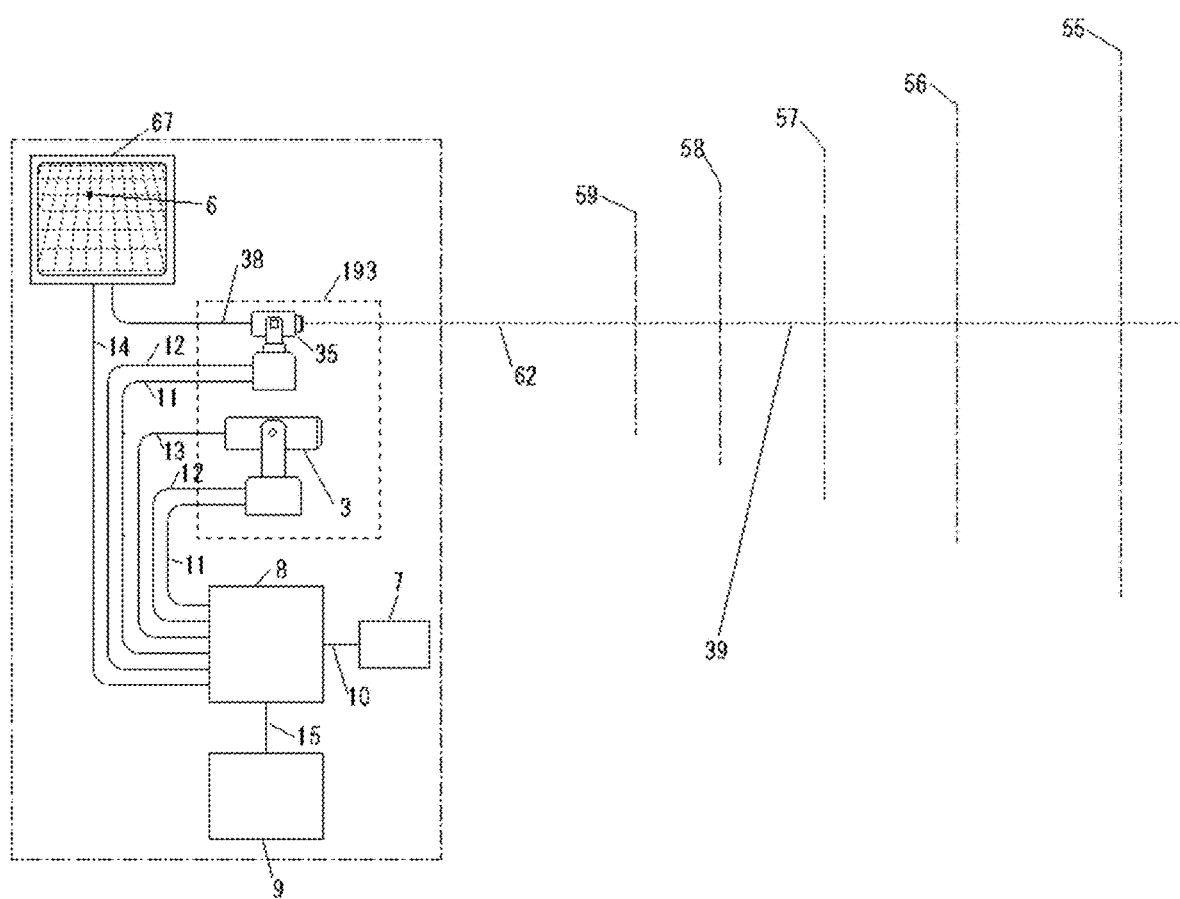

FIG. 21 shows the distance value of the interpolation calculation and the drive value of the interpolation calculation obtained by rotating the numerical control television camera 35 in the 62nd vertical direction C and calculating the distance value of the interpolation calculation.

At all distances from the numerical control television camera 35, the distance value of the interpolation operation of the tracking laser distance measuring machine 3 and the drive value of the interpolation operation of all positions on the numerical control television camera monitor screen 67, C are calculated and acquired at all positions on the numerical control television camera monitor screen 67, C, as described above.

The numerical control television camera is rotated in the 62 vertical direction C, and the calculated numerical value of the drive mechanism is stored in computer 9.

Figure 22:
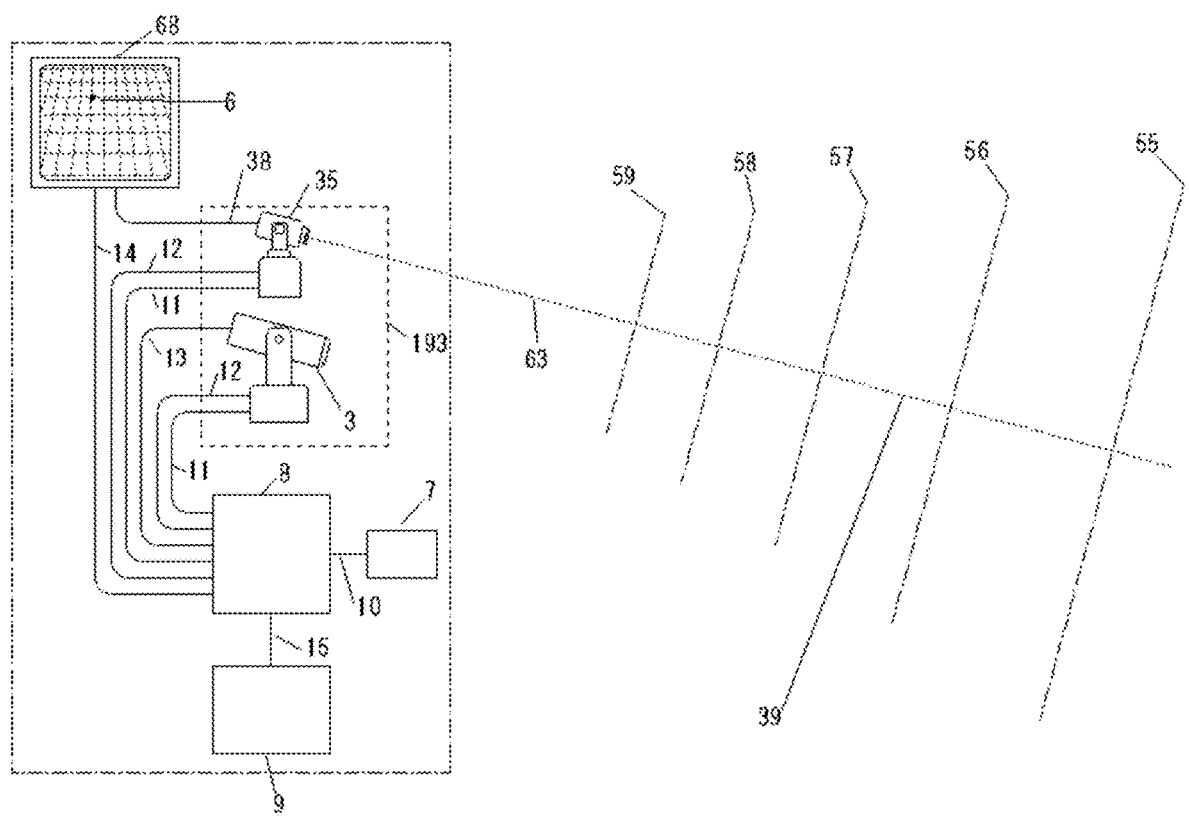

FIG. 22 is obtained by rotating the numerical control television camera 35 in the vertical direction 63, D to calculate the distance value of the interpolation calculation and the drive value of the interpolation calculation.

At all the distances from the numerical control television camera 35, the distance value of the interpolation operation of the tracking laser distance measuring machine 3 and the drive value of the interpolation operation of all positions on the numerical control television camera monitor screen 68-D are calculated and acquired.

The numerical control television camera is rotated in the vertical direction 63, D, and the calculated numerical value of the drive mechanism is stored in computer 9.

Figure 23:
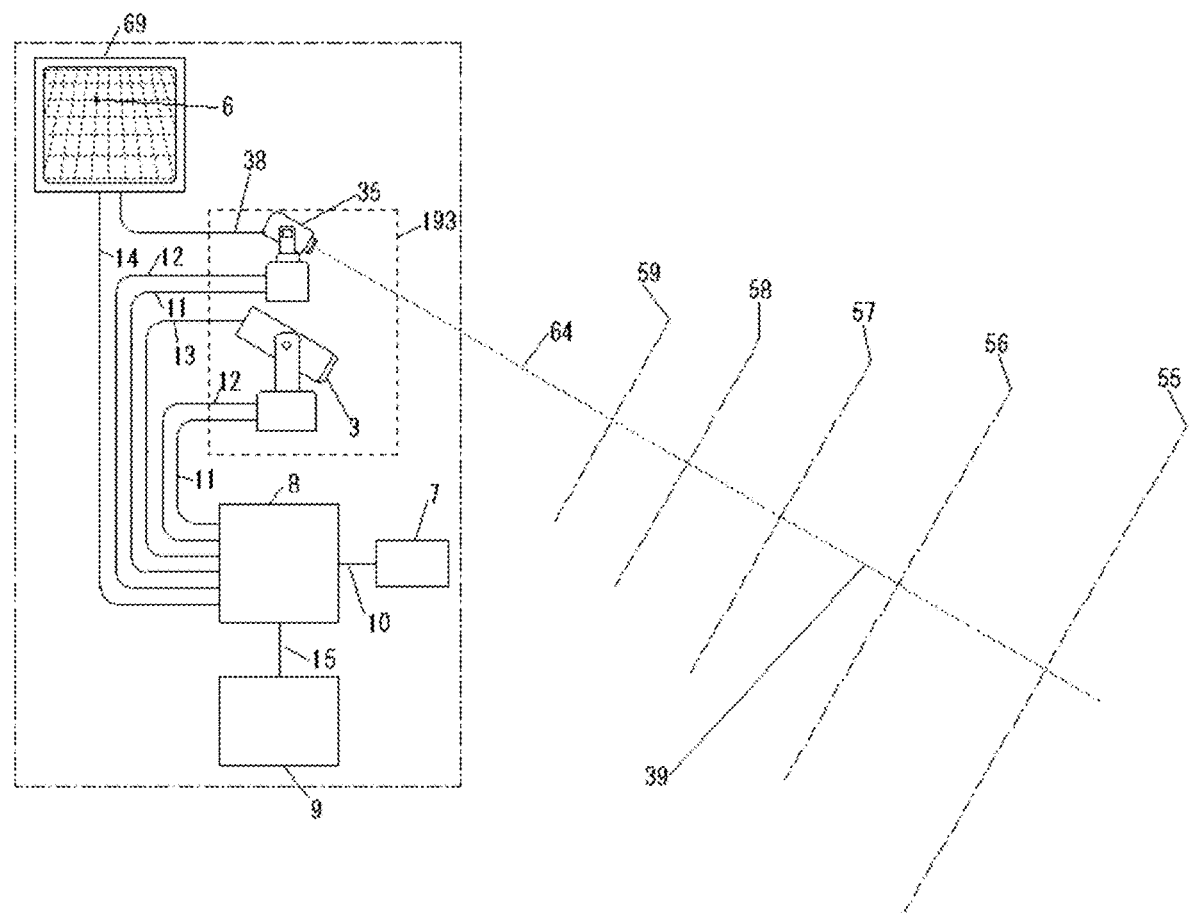

In FIG. 23, the numerical control television camera 35 is rotated in the vertical direction 64, E, and the distance value of the interpolation calculation and the drive value of the interpolation operation are calculated and acquired.

At all distances from the numerical control television camera 35, the distance value of the interpolation operation of the tracking laser distance measuring machine 3 and the drive value of the interpolation operation of all positions on the numerical control television camera monitor screen 69-E are calculated and acquired.

The numerical control television camera is rotated in the vertical direction 64, E, and the calculated numerical value of the drive mechanism is stored in computer 9.

Horizontal direction A to 49 horizontal directions 45-49, A to E are changed for each drive value of the numerical control television camera 35 whose imaging direction is changed, a numerical control television camera monitor screen 37 is used to calculate and obtain an interpolation operation of the tracking laser distance measuring machine 3 at all positions on the numerical control television camera monitor screen, 45 in all positions on the numerical control television camera monitor screen 37 in all directions in which the shooting direction is changed between the horizontal directions A to E, the interpolation operation of the tracking laser distance measuring machine 3 is calculated and acquired.

For each drive value of the numerical control television camera 35 whose imaging direction is changed between the vertical directions 60-64, A-E, a numerical control television camera monitor screen 37 is used to calculate and obtain an interpolation operation of the tracking laser distance measuring machine 3 at all positions on the numerical control television camera monitor screen, 60 in all positions on the numerical control television camera monitor screen 37 in all directions in which the shooting direction is changed between the vertical directions A to E, the interpolation operation of the tracking laser distance measuring machine 3 is calculated and acquired.

Figure 24:
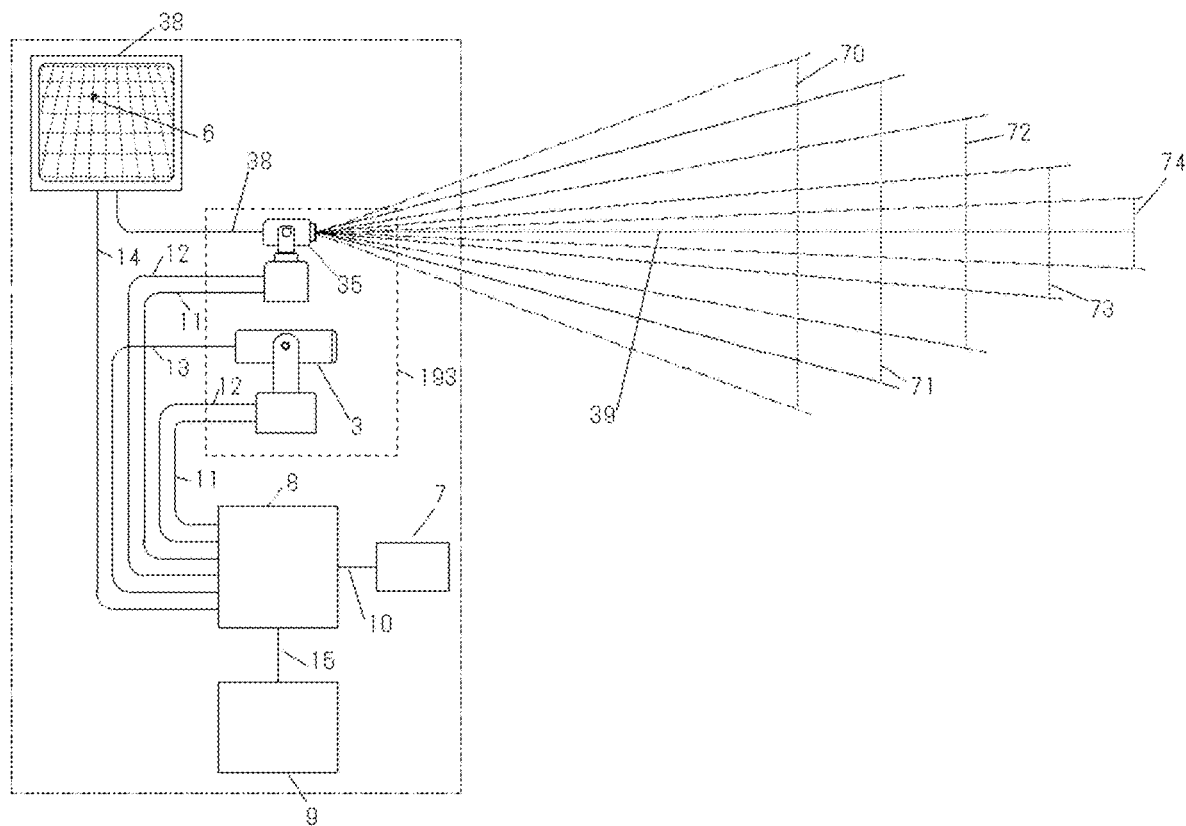
FIG. 24 is an explanatory diagram illustrating an interpolation operation performed by changing the angle of view of a numerical control television camera 35.

FIG. 24 is an explanatory diagram for acquiring the drive value of the tracking laser distance measuring machine 3 at all positions on the numerical control television camera monitor screen 37 and the distance from the numerical control television camera 35 at all positions on the numerical control television camera monitor screen 37 at all positions on the numerical control television camera monitor screen 37 at all positions on the numerical control television camera monitor screen 37.

FIG. 24 is an explanatory diagram showing a numerical control television camera shooting range of angle of view 70 to 74, A to E in which the angle of view of the angle of view of the view angle drive mechanism of the numerical control television camera 35 is changed to A-E.

Figure 25:
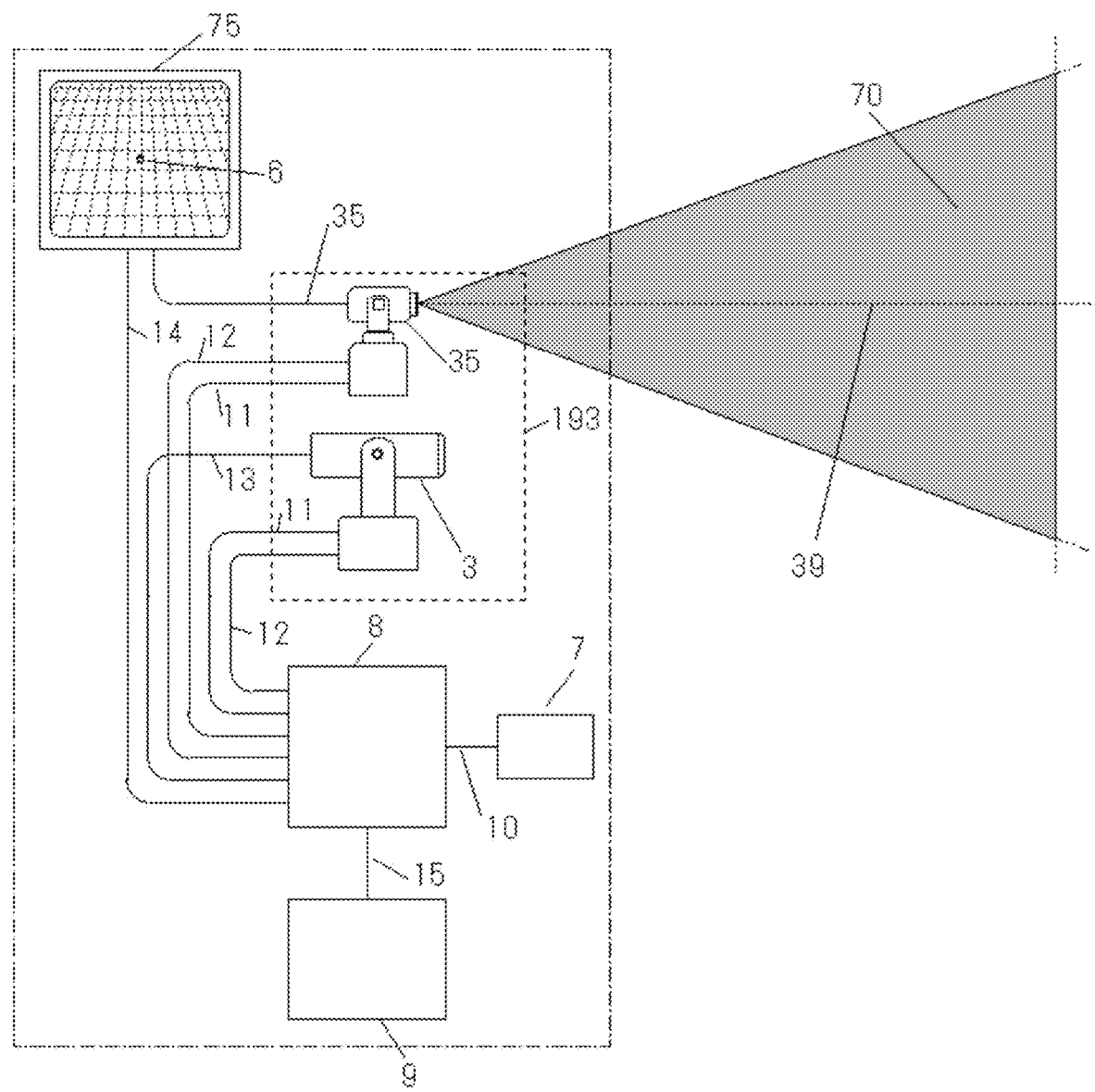
FIG. 25 is an explanatory diagram for calculating an interpolation operation to be performed by changing the numerical control television camera shooting range of the angle of view 70, A of the numerical control television camera 35.

FIG. 25 is an explanatory diagram for computing an interpolation operation based on all distances from the numerical control television camera to the imaging range of the numerical control television camera imaging range of the view angle 70, A of the numerical control television camera 35.

In the method described above, the drive value of the tracking laser distance measuring machine 3 and the measured distance of the tracking laser distance measuring machine 3 at the driven position are acquired at all positions on the monitor screen of the numerical control television camera imaging range of the field angle 75, A taken by the numerical control television camera 35.

In the method described above, the drive numerical value of the tracking laser distance measuring machine 3 at all distances from the numerical control television camera 35 and the distance from the numerical control television camera 35 at the driven location are acquired from the numerical control television camera imaging range drive values of the numerical control television camera 35.

The calculated numerical values are stored in computers 9.

Figure 26:
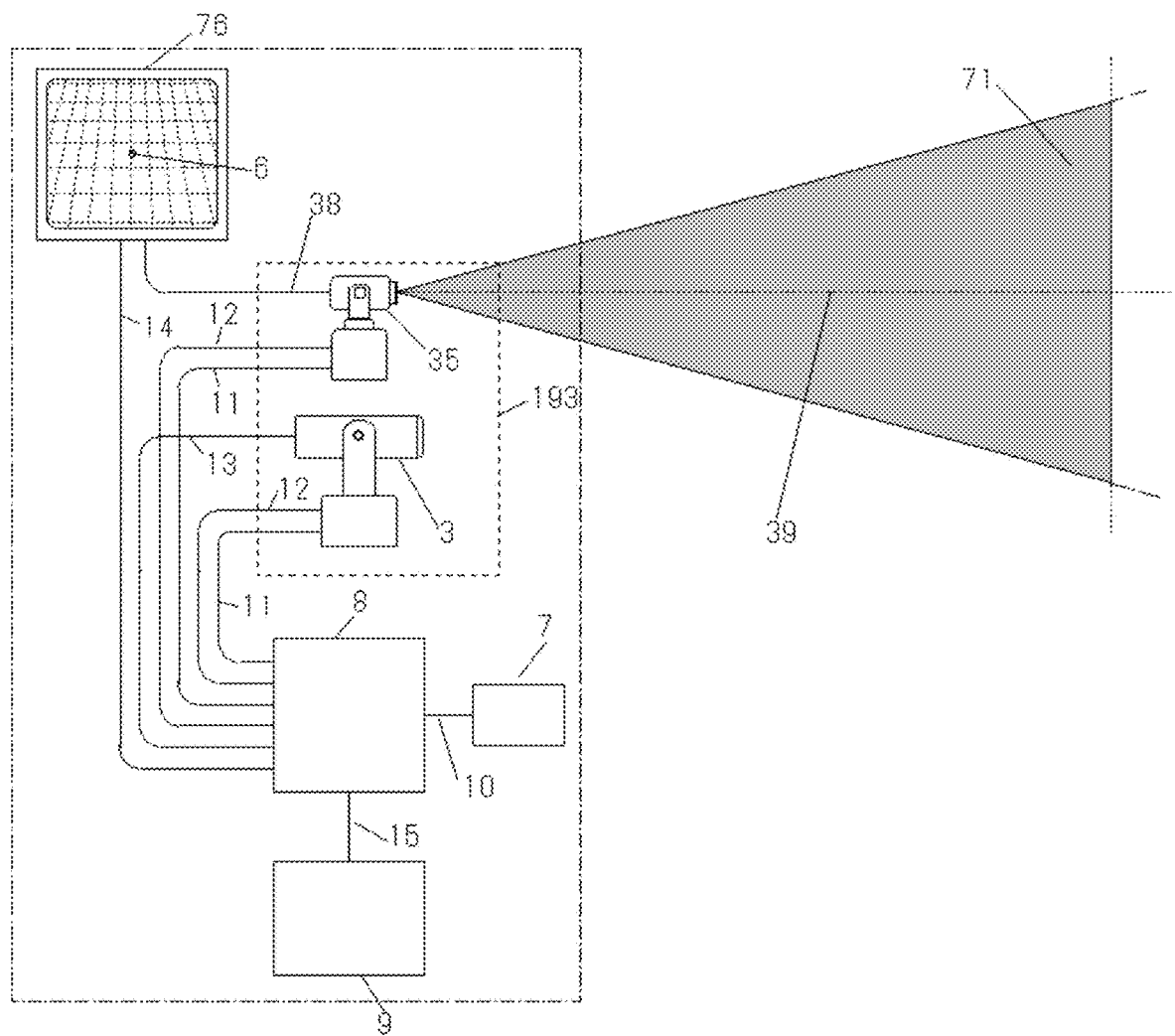
FIG. 26 is an explanatory diagram illustrating an interpolation operation performed by changing the numerical control television camera imaging range of the angle of view 71-B of the numerical control television camera 35.

FIG. 26 is an explanatory diagram illustrating an interpolation operation of shooting a numerical control television camera shooting range of the angle of view 71-B of the numerical control television camera 35.

FIG. 26 is an explanatory diagram for calculating an interpolation operation based on all the distances from the numerical control television camera to the imaging range of the numerical control television camera 35, which are taken at the angle of view 71-B of the numerical control television camera 35.

In the method described above, the drive value of the tracking laser distance measuring machine 3 at all positions on the monitor screen of the field angle 76-B of the numerical control television camera 35 and the measured distance from the tracking laser distance measuring machine 3 at the driven place are acquired.

In the method described above, the drive numerical value of the tracking laser distance measuring machine 3 at all distances from the numerical control television camera 35 and the distance from the numerical control television camera 35 at the driven position are acquired from the numerical control television camera imaging range drive values of the numerical control television camera 35.

The calculated numerical values are stored in computers 9.

Figure 27:
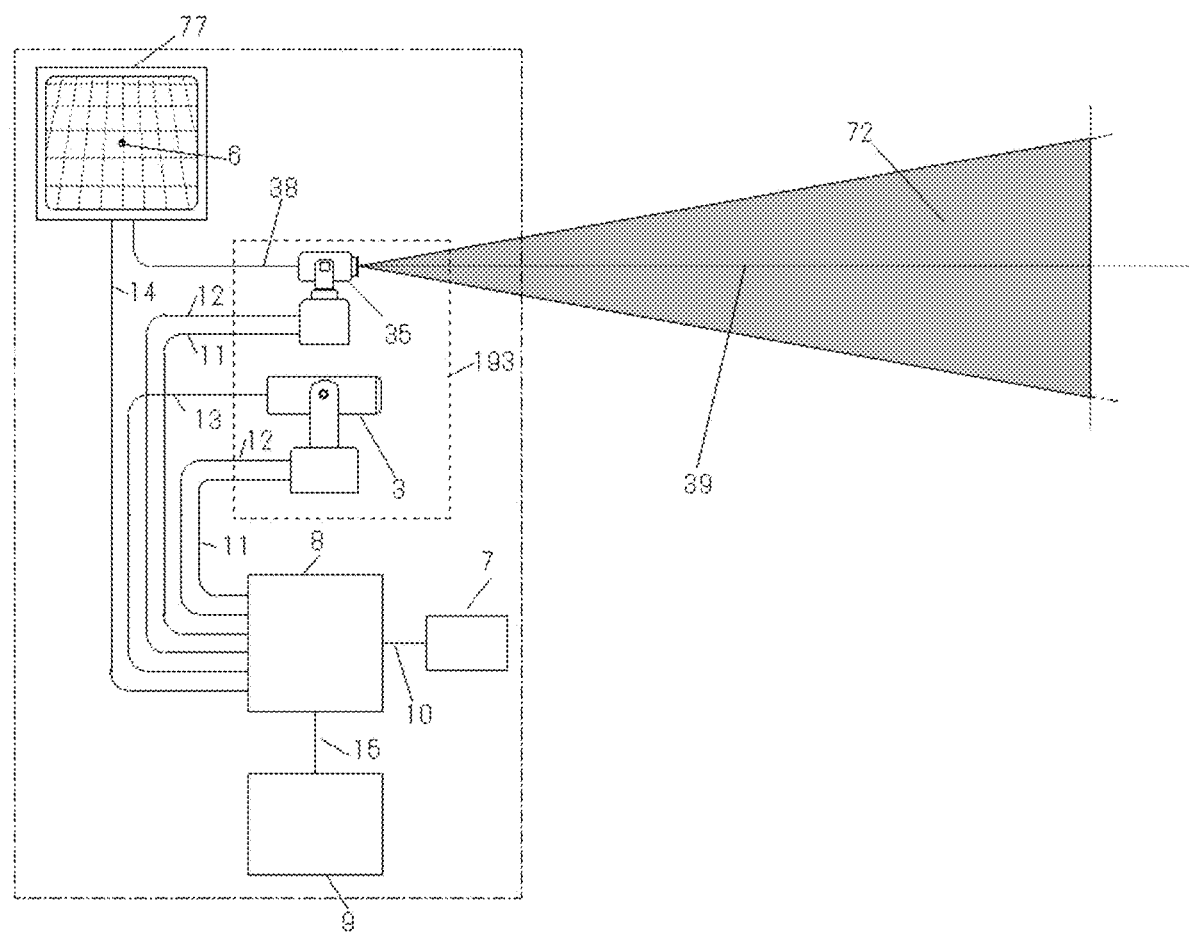
FIG. 27 is an explanatory diagram illustrating an interpolation operation performed by changing the numerical control television camera shooting range of the angle of view 72, C of the numerical control television camera 35.

FIG. 27 is an explanatory diagram for calculating an interpolation operation of shooting a numerical control television camera shooting range of picture angle 72, C of a numerical control television camera 35.

FIG. 27 is an explanatory diagram for calculating an interpolation operation based on all the distances from the numerical control television camera to the imaging range of the numerical control television camera 35, which are taken at the angle of view 72-C of the numerical control television camera 35.

In the method described above, the drive numerical value of the tracking laser distance measuring machine 3 at all positions on the monitor screen of the view angle 77, C of the numerical control television camera 35 and the measured distance from the tracking laser distance measuring machine 3 at the driven place are acquired.

In the method described above, the drive numerical value of the tracking laser distance measuring machine 3 at all distances from the numerical control television camera 35 and the distance from the numerical control television camera 35 at the driven location are acquired from the numerical control television camera imaging range drive values of the numerical control television camera 35.

The calculated numerical values are stored in computers 9.

Figure 28:
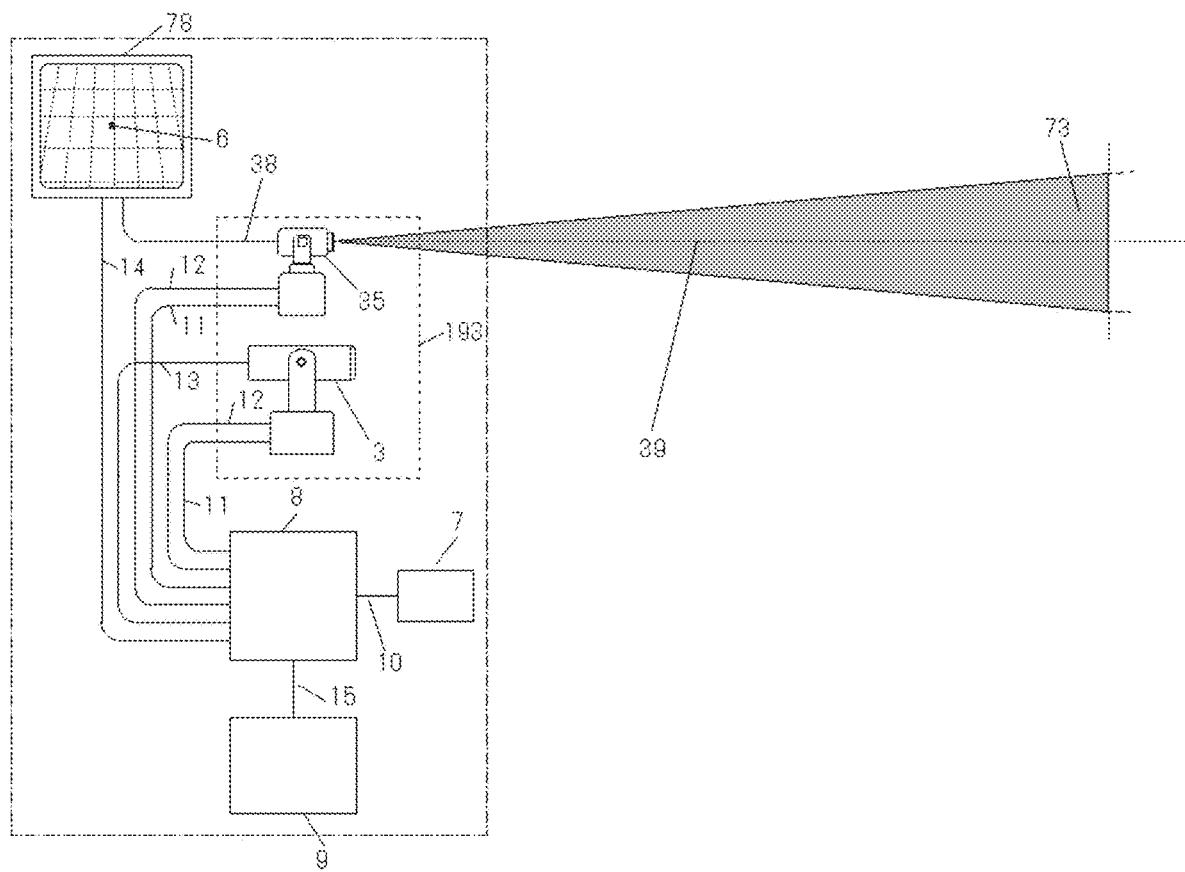
FIG. 28 is an explanatory diagram illustrating an interpolation operation performed by changing the numerical control television camera shooting range of the field angle 73, D of the numerical control television camera 35.

FIG. 28 is an explanatory diagram for calculating an interpolation operation of shooting a numerical control television camera shooting range of the field angle 73, D of the numerical control television camera 35.

FIG. 28 is an explanatory diagram for calculating an interpolation operation based on the numerical control television camera shooting range of the field angle 73, D of the numerical control television camera 35 and all distances from the numerical control television camera to the imaging range of the numerical control television camera.

In the method described above, the drive value of the tracking laser distance measuring machine 3 at all positions on the monitor screen of the view angle 78-D of the numerical control television camera 35 and the measured distance from the tracking laser distance measuring machine 3 at the driven place are acquired.

In the method described above, the drive numerical value of the tracking laser distance measuring machine 3 at all distances from the numerical control television camera 35 at the angle of view 73, D of the numerical control television camera 35 and the distance from the numerical control television camera 35 at the driven position are acquired.

The calculated numerical values are stored in computers 9.

Figure 29:
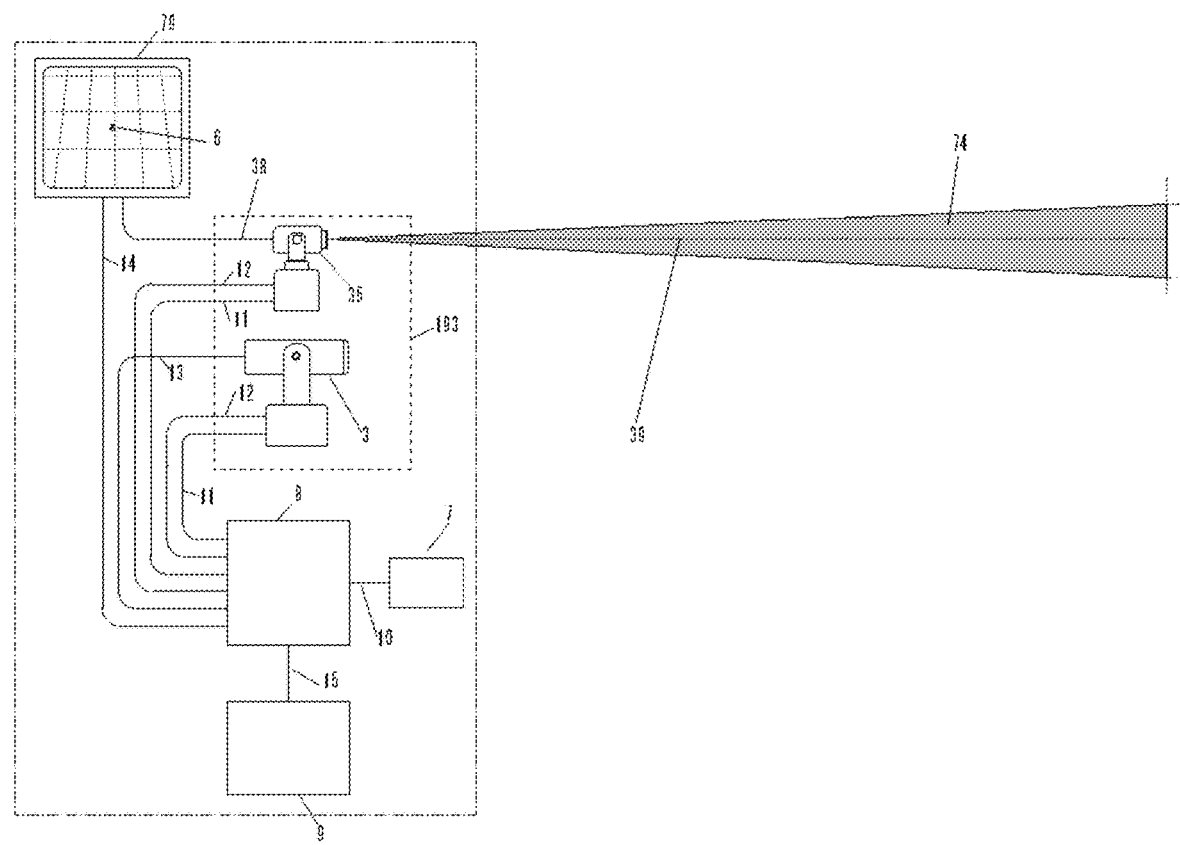
FIG. 29 is an explanatory diagram illustrating an interpolation operation performed by changing the numerical control television camera imaging range of the 74-field angle E of the numerical control television camera 35.

FIG. 29 is an explanatory diagram illustrating an interpolation operation of shooting a numerical control television camera shooting range of the field angle 74-E of the numerical control television camera 35.

FIG. 29 is an explanatory diagram for computing an interpolation operation based on the numerical control television camera imaging range of the field angle 74-E of the numerical control television camera 35 and all the distances to the imaging range of the numerical control television camera.

In the method described above, the drive value of the tracking laser distance measuring machine 3 at all positions on the monitor screen of the view angle 79-E of the numerical control television camera 35 and the measured distance from the tracking laser distance measuring machine 3 at the driven place are acquired.

In the method described above, the drive value of the tracking laser distance measuring machine 3 at all the distances from the numerical control television camera 35 to the numerical control television camera imaging range of the numerical control television camera 35 is acquired, and the distance from the numerical control television camera 35 at the driven position is acquired.

The calculated numerical values are stored in computers 9.

The angle of view 70 of the numerical control television camera 35 for capturing the numerical control television camera shooting range of the angle 74 of view A to E is changed for each driving numerical value, the drive value of the tracking laser range finder 3 at all positions on the numerical control television camera monitor screen 37 obtained by calculating the interpolation operation from all the distances to the imaging range of the numerical control television camera, and the measured distance thereof is used, all field angles between the angle of view of the range of view angles 70 to 74 of the numerical control television cameras 35 and the angle of view of the range of view angles A to E of the numerical control television camera are obtained by calculating the distance from the numerical control television camera horizontal imaging range to the numerical control television camera horizontal imaging range by interpolation or the like.

Figure 30:
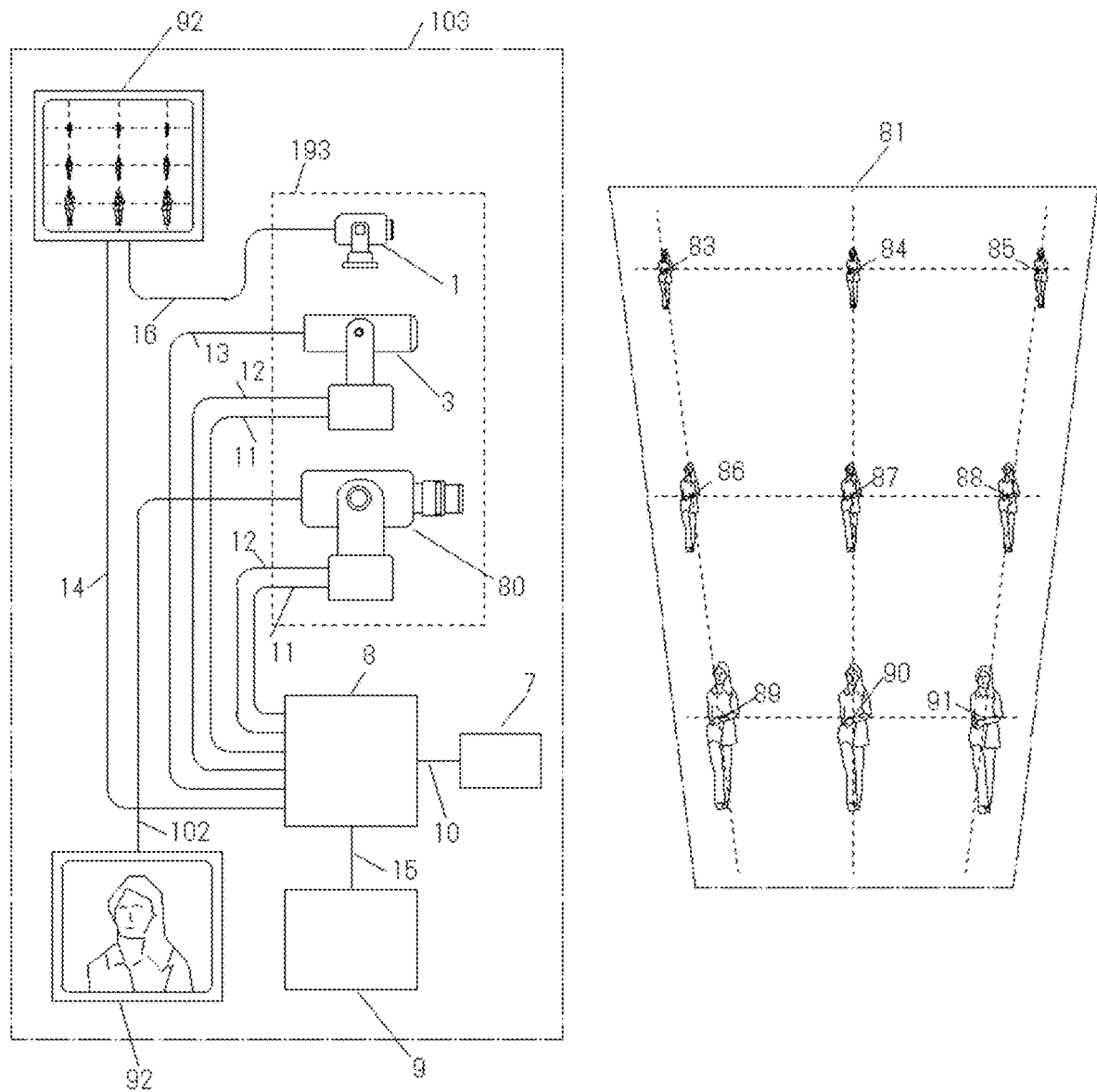
FIG. 30 is an explanatory diagram of the fixed television camera 1 that captures subjects 83-91 in the fixed television camera shooting range 2, the tracking television camera that captures each of the 93-107 subjects shown in the position on the fixed television camera monitor screen as in the tracking television camera monitor screen 92, and the tracking laser distance measuring machine 3 that measures the distance 93 to 107 between subjects.

FIG. 30 is driven in conjunction with the tracking laser distance measuring machine 3 at all positions on the fixed television camera monitor screen 5 in which the screen captured by the fixed television camera is projected, a description will be given of a method in which the tracking television camera 80 captures an object in a tracking television camera monitor screen 92 and displays the subject images of the objects A84, B85, C86, D87, E88, F89, G90, and H91 of the fixed television camera imaging range 2.

In FIG. 30 and subsequent figures, for the sake of clarity of description, it is assumed that the laser optical axis irradiated by the tracking laser distance measuring device 3 and the optical axis taken by the tracking television camera 80 are collinear with each other in the range imaged by the fixed television camera 1.

In the implementation, since they are not on the same line, they are corrected or ignored, respectively.

In the method described above, the tracking laser distance measuring machine 3 newly measures the distance in the driven direction at all positions on the fixed television camera monitor screen 5 and acquires the distance value.

Figure 31:
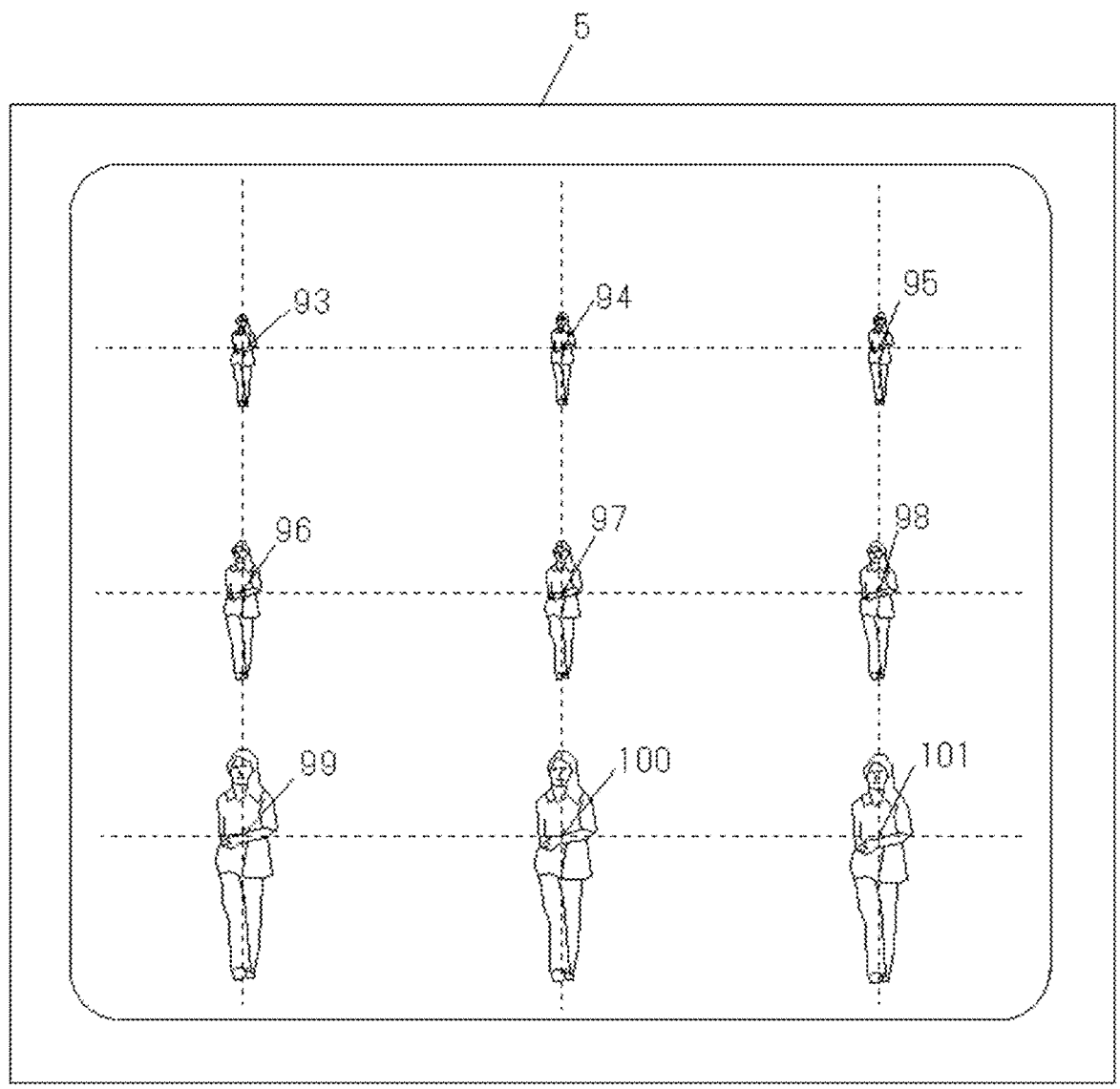
FIG. 31 is an explanatory diagram of the positions of 93 to 107 subjects A to I in the fixed television camera monitor screen 5 in which the fixed television camera 1 captures subjects 83-91 in the fixed television camera shooting range 2 and appears on the fixed television camera monitor screen 5.

FIG. 31 shows the 83 subjects A, 84 subjects B, 85 subjects C, 86 subjects D, 87 subjects E, 88 subjects F, 89 subjects G, 90 subjects H, and 91 subject I in the fixed television camera shooting range 2, 5 the positions of the 93 subjects A, 94, and 95 of the fixed television camera monitor screen, the position of the 95 subject B, the position of the object C, the position of the subject D, the position of the subject G, the position of the subject H, the position of the subject H, and the position of the object I are displayed at corresponding positions.

The position of the 93 subject A on the fixed television camera monitor screen 5 indicates the position on the screen, and the tracking laser distance measuring machine 3 is driven by the numerical value acquired by the calculation such as the interpolation calculation, and the distance of the position of the subject 83, A in the fixed television camera imaging range 2 is measured.

The tracking television camera 80 is operated via an tracking controller 8 on an operation console 7, and the 83-object A in the fixed television camera imaging range 2 is driven by the driving mechanisms such as horizontal rotation, vertical rotation, zoom, whey, and iris of the tracking television camera 80 to perform an operation shown on a tracking television camera monitor screen 92.

In relation to the position of the 93 subject A on the fixed television camera monitor screen 5, the measured distance and the drive numerical value obtained by driving the respective drive mechanisms such as horizontal rotation, vertical rotation, zoom, whey, and iris of the tracking television camera 80 are stored in the computer 9.

In a similar manner, subjects 84-91, B to I in the fixed television camera shooting range 2 are operated via an 8-tracking controller on a 7-operating console, and an operation shown on a tracking television camera monitor screen 92 is performed.

In relation to the positions 94 to 101 of subjects B to I on the fixed television camera monitor screen 5, the measured distance and the drive numerical value obtained by driving the respective drive mechanisms such as horizontal rotation, vertical rotation, zoom, whey, and iris of the tracking television camera 80 are stored in the computer 9.

In relation to the positions 93 of the object A to the object A to I, each distance and each drive value at the position between the positions 93-101 of the subjects A to I at the position between the positions 93-101 of the subjects A to I are interpolated by an interpolation operation or the like at a position between the positions 93-101 of the subjects A to I.

By pointing all the positions on the fixed television camera monitor screen 5 in which the fixed television camera 2 captures and displays the fixed television camera shooting range, it is possible to display the image like a tracking television camera monitor screen 92 using numerical values interpolated by calculation such as interpolation calculation.

Figure 32:
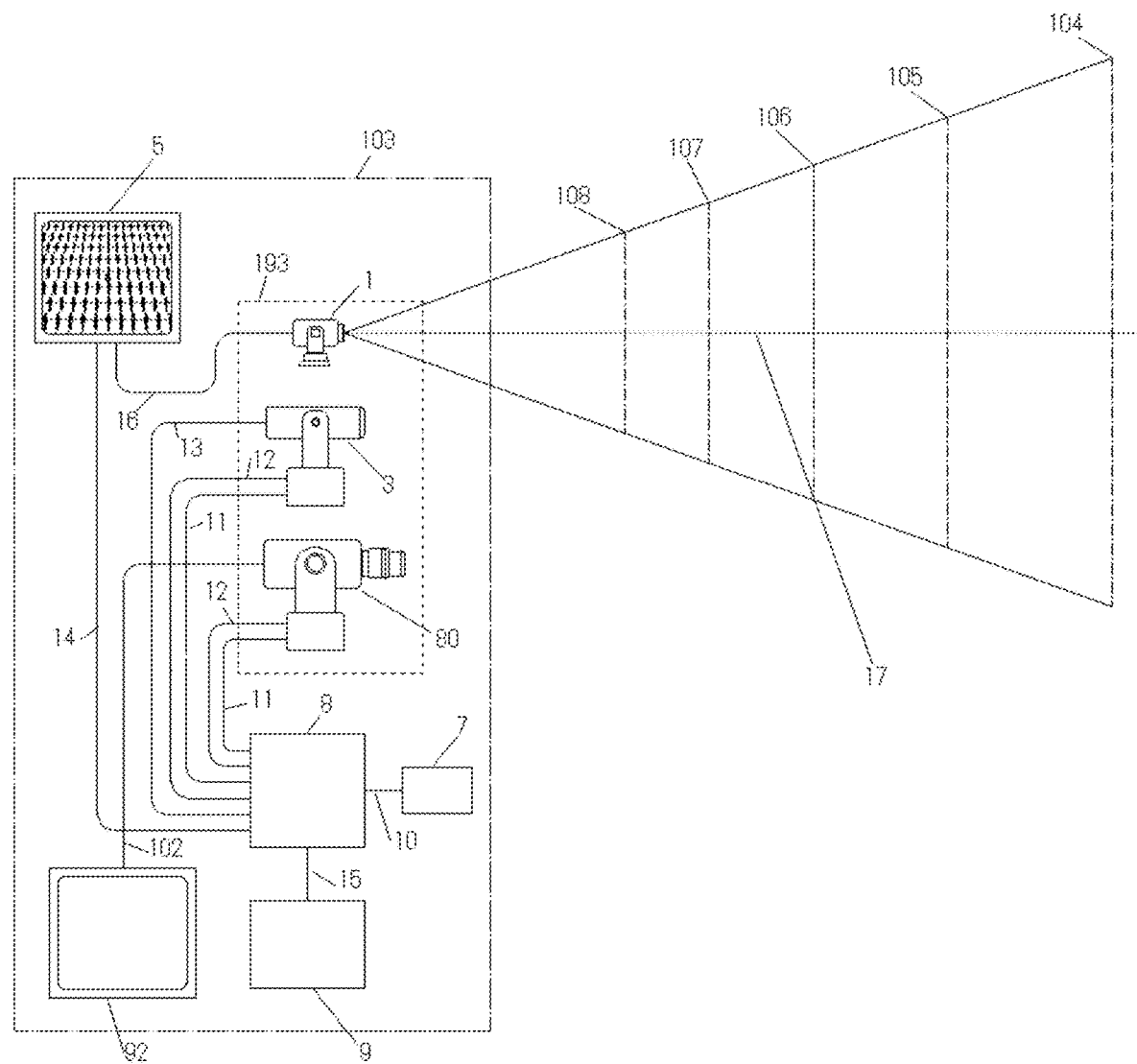
FIG. 32 is an explanatory diagram for interpolating each distance and each drive value of positions between positions 93 to 101 of subjects A to I on a plane in which the fixed television camera 1 captures subjects 83 to 91 by an interpolation calculation or the like, and interpolates each drive value by an operation such as interpolation calculation.

FIG. 32 shows the subject at each distance of the object distance A, 115 fixed television camera subject distance B, 116 fixed television camera subject distance D, 117 fixed television camera subject distance D, 118 fixed television camera subject distance D, 118 fixed television camera subject distance D, and 118 fixed television camera subject distance E via the 8 tracking controller, the operation is performed like a tracking television camera monitor screen 92.

Figure 33:
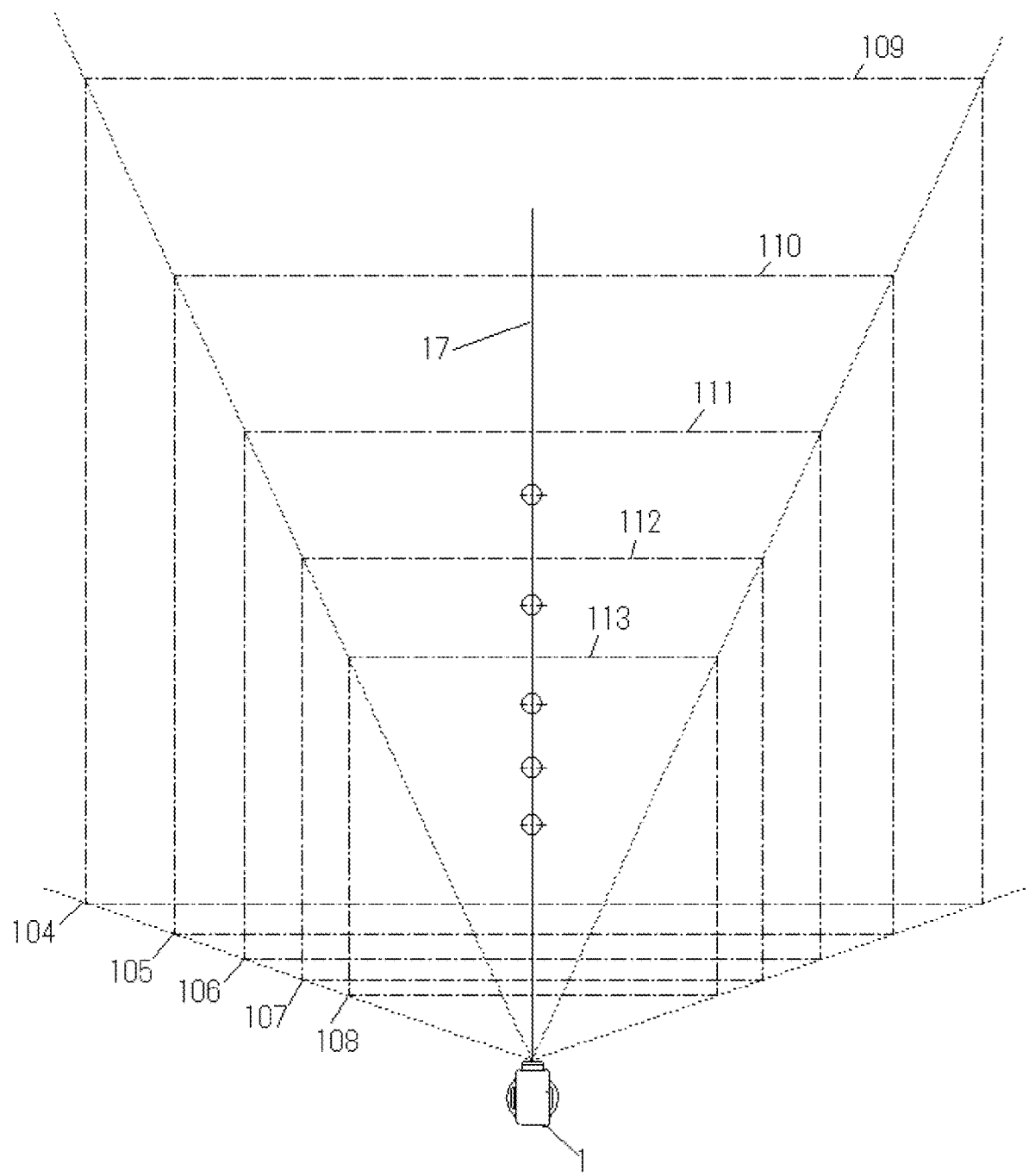
FIG. 33 shows the distance of the object from the fixed television camera described with reference to FIG. 32 and is a description of a space for acquiring each distance and each drive value in a three-dimensional space from a fixed television camera.

FIG. 33 illustrates a case where the fixed television camera captures the same direction and captures images at the same angle of view, and the fixed television camera imaging ranges 2 are different from each other.

The distance A shooting range 114 of the fixed television camera, the range B shooting range of the 115 fixed television camera, the distance D shooting range of the fixed television camera, the distance D shooting range of the fixed television camera, the distance D shooting range of the fixed television camera, and the distance D shooting range of the 118 fixed television camera, and the tracking television camera 80 is operated via the 8 tracking controller on a 7 console, the operation is performed like a tracking television camera monitor screen 92.

Figure 34:
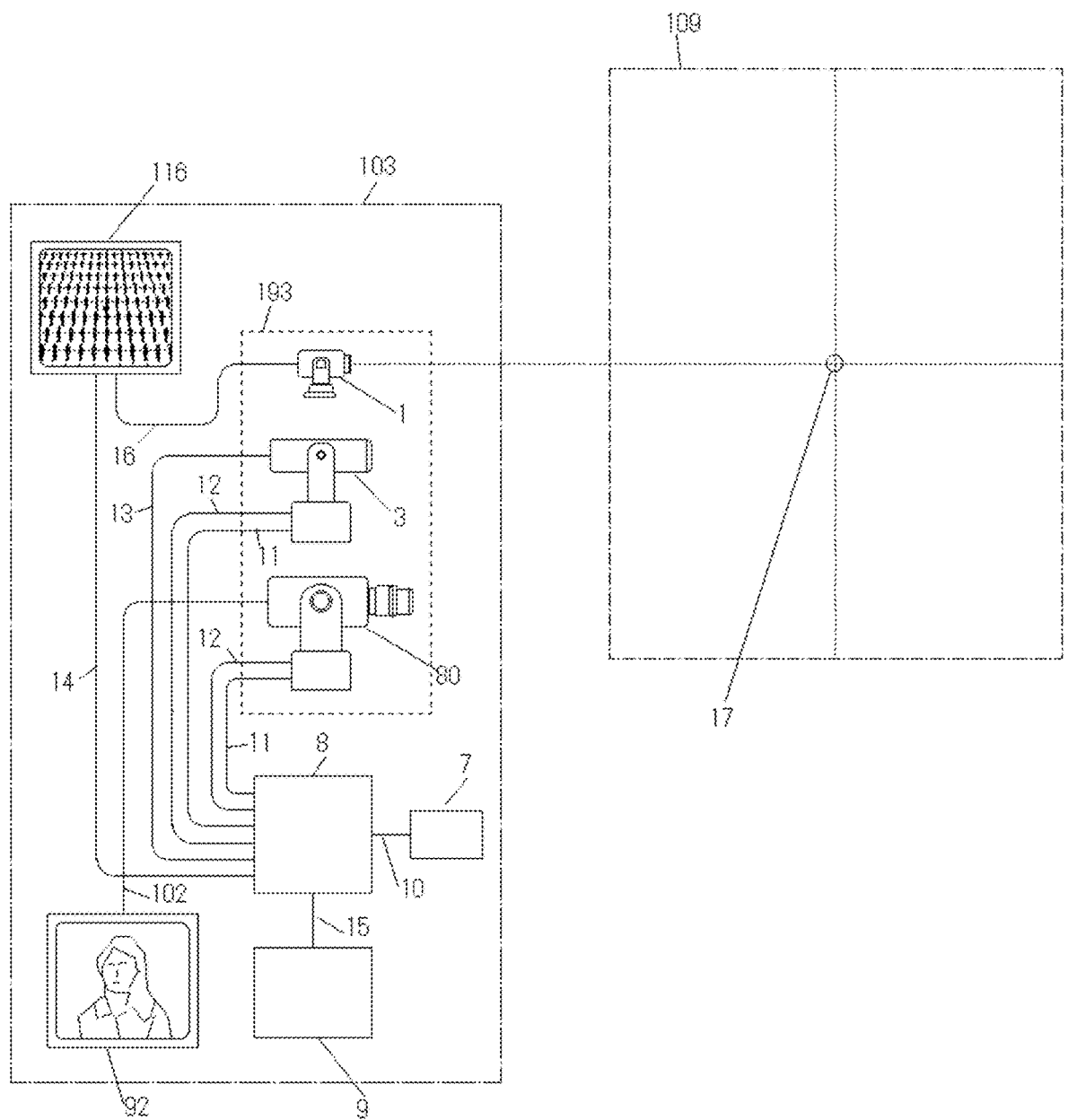
FIG. 34 is a description of a space in which a subject shown in a distance A from the 104 fixed television camera is photographed, and each distance and each drive value thereof on the imaging plane are acquired.

FIG. 34 is an explanatory diagram of imaging the fixed TV camera imaging range 109, A of the distance A to the subject imaging range of the 104 fixed television camera.

The subject shown at the place corresponding to the position on the fixed television camera 1 monitor screen 5 shot by the fixed television camera is related to the position of the subject on the fixed television camera monitor screen 5, a drive value obtained by driving each drive mechanism such as a horizontal rotation, a vertical rotation, a zoom, a whey, an iris, and the like of the tracking television camera 80, which has been operated to appear like a tracking television camera monitor screen 92, is associated with the distance of the object distance A of the fixed television camera 114, the data is stored in the computer 9.

Figure 35:
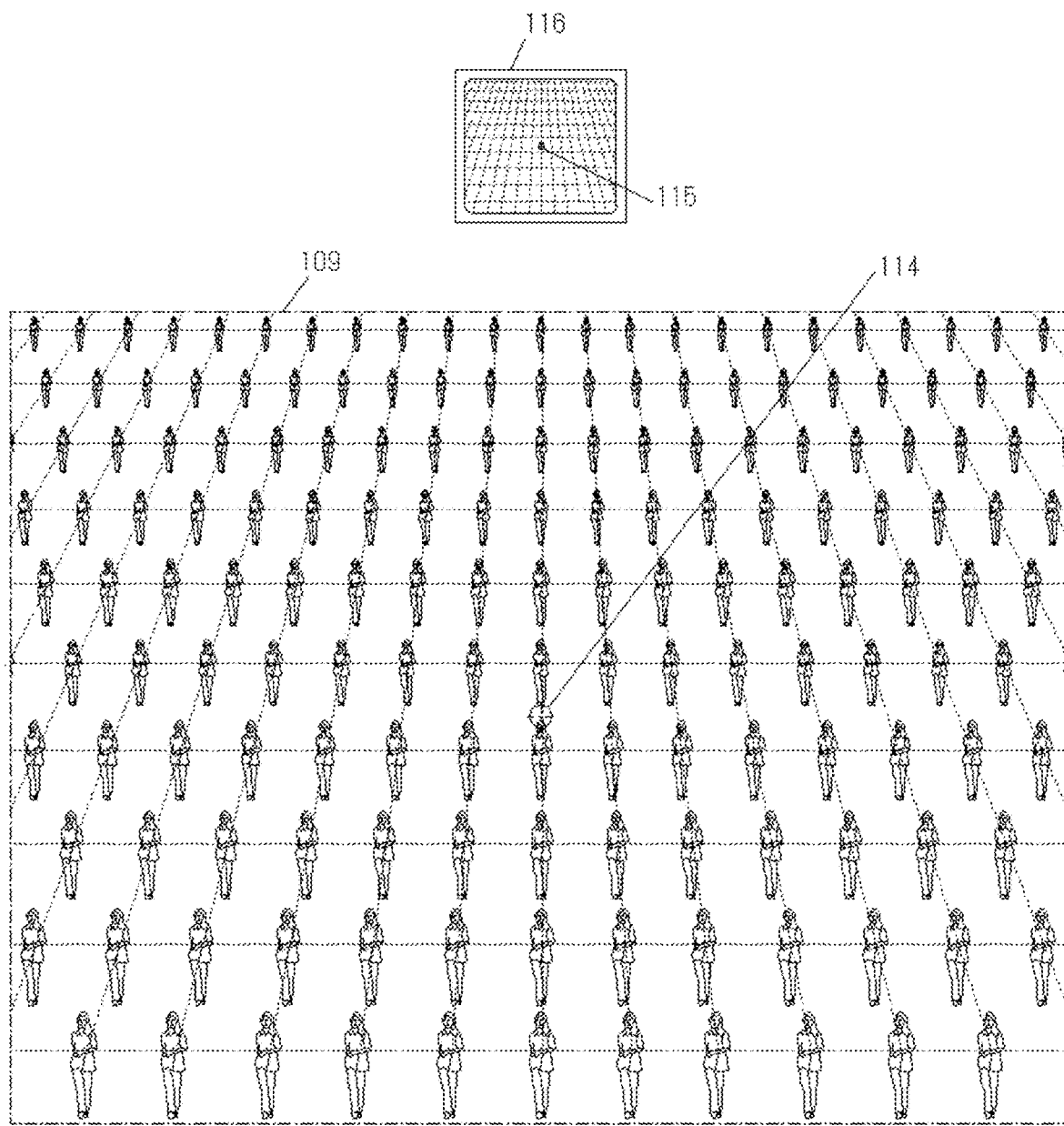
FIG. 35 is a description of each position of the subject on the fixed television camera monitor screen and the subject in which the subject shown in the distance A from the 104 fixed television camera is captured and the distances and their respective drive values are acquired on the imaging plane.

FIG. 35 is an explanatory diagram of the fixed television camera imaging range A of the distance A to the subject imaging range of the fixed television camera and the fixed television camera monitor screen displaying the captured screen.

In relation to the position of the subject on the fixed television camera monitor screen, each distance and each drive value at all positions between the positions of the subject are interpolated by an operation such as interpolation calculation from each measurement distance and each drive value stored in the computer 9.

The calculated numerical values are stored in computers 9.

Figure 36:
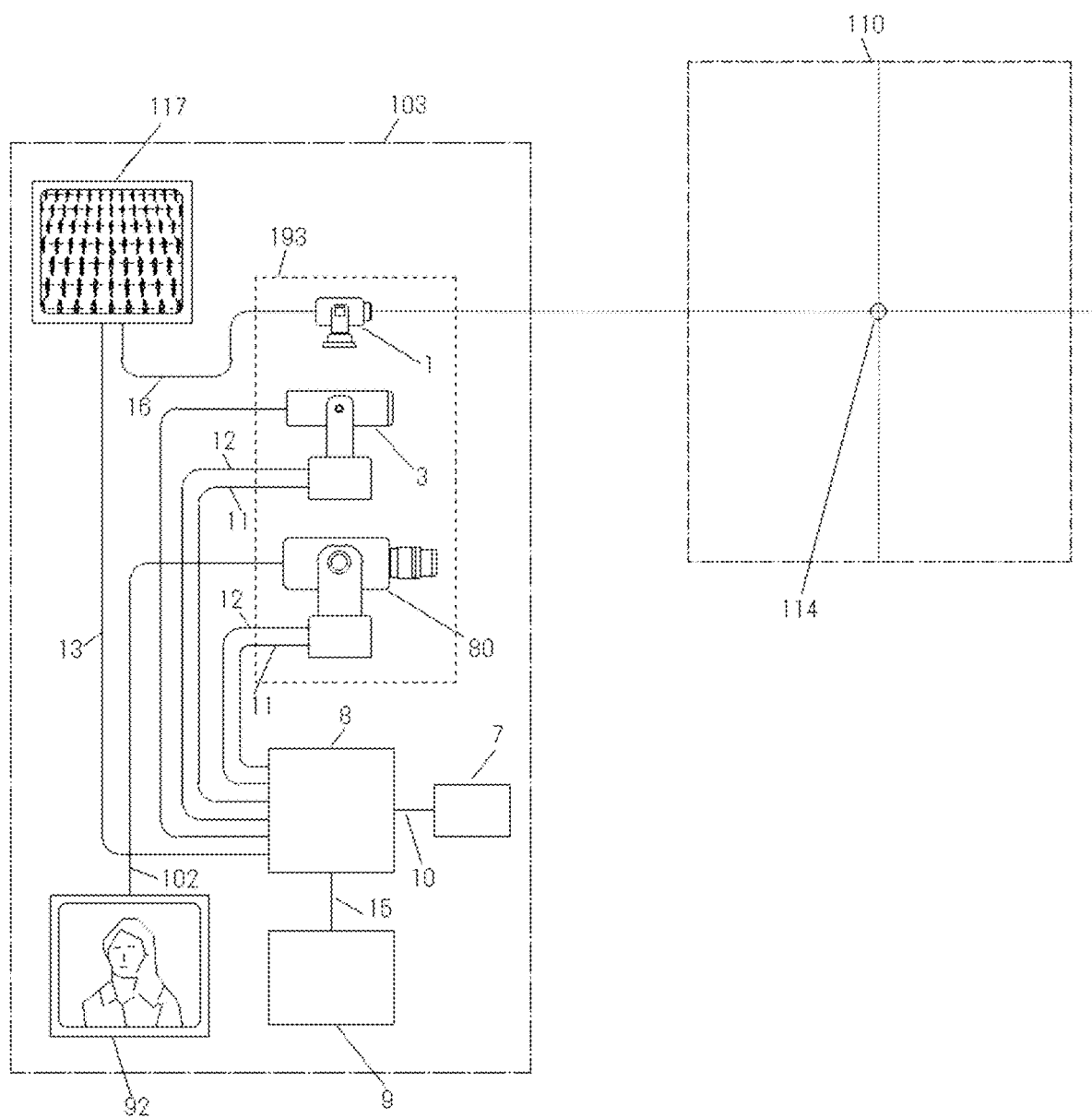
FIG. 36 is a description of a space in which a subject shown in a distance B from the 105 fixed television camera is photographed, and each distance and each drive value thereof on the imaging plane are acquired.

FIG. 36 is an explanatory diagram for capturing the fixed TV camera imaging range 110, B of the distance B to the subject imaging range of the 105 fixed television camera.

The subject shown at the location of the fixed television camera 1 imaging range 110, B corresponding to the position on the fixed television camera monitor screen 5 shot by the fixed television camera is related to the position of the subject on the fixed television camera monitor screen 5, a drive value obtained by driving each drive mechanism such as a horizontal rotation, a vertical rotation, a zoom, a whey, an iris, and the like of the tracking television camera 80, which has been operated to appear like a tracking television camera monitor screen 92, is associated with the distance between the object distance B and the object of the fixed television camera 114, the data is stored in the computer 9.

Figure 37:
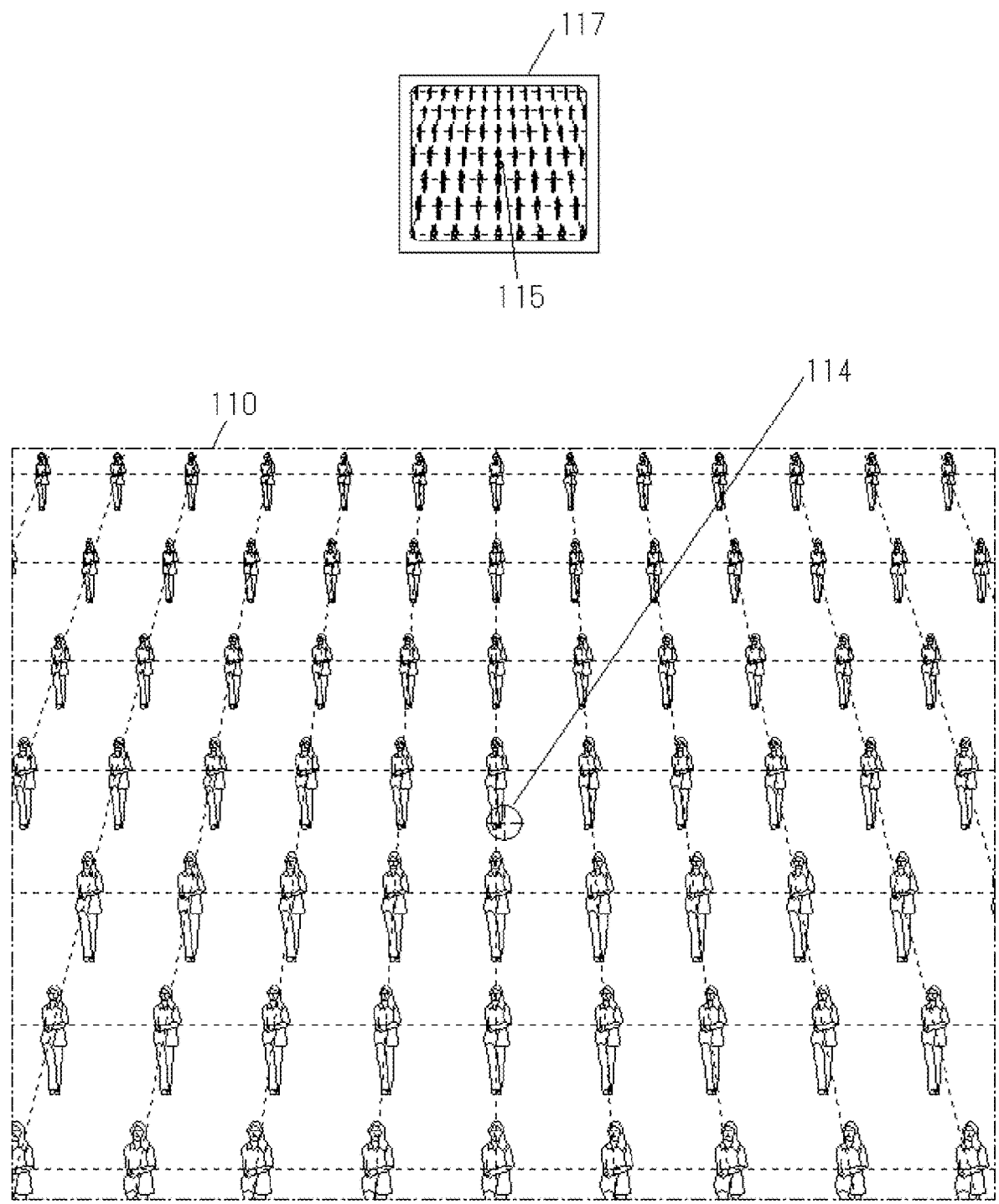
FIG. 37 is a description of each position of the subject on the fixed television camera monitor screen and the subject in which the subject shown in the distance B from the 105 fixed television camera is captured and the distances and their respective drive values are acquired on the imaging plane.

FIG. 37 is an explanatory diagram of the fixed TV camera imaging range B of the distance 110, B to the subject imaging range of the 105 fixed television camera and the fixed television camera monitor screen displaying the captured screen.

In relation to the position of the subject on the fixed television camera monitor screen, each distance and each drive value at all positions between the positions of the subject are interpolated by an operation such as interpolation calculation from each measurement distance and each drive value stored in the computer 9.

The calculated numerical values are stored in computers 9.

Figure 38:
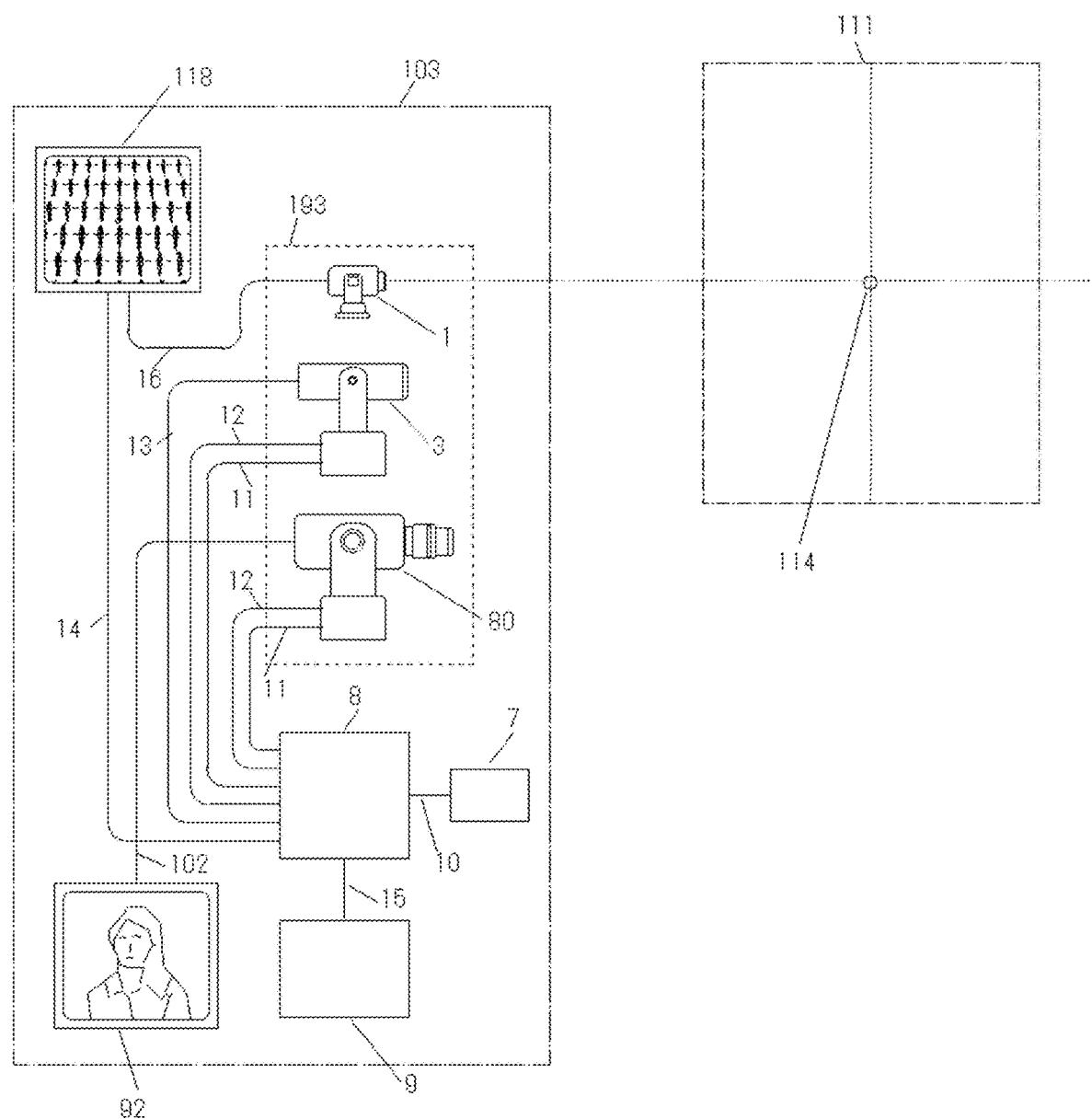
FIG. 38 is a description of a space in which a subject shown in a distance C from the 106 fixed television camera is photographed, and each distance and each drive value thereof on the imaging plane are acquired.

FIG. 38 is an explanatory diagram for capturing the fixed TV camera imaging range 111, C of the distance C to the subject imaging range of the 106 fixed television camera.

The subject shown at the location of the fixed television camera imaging range 106, C corresponding to the position on the fixed television camera monitor screen 5 shot by the fixed television camera 1 is related to the position of the subject on the fixed television camera monitor screen 5, a drive value obtained by driving each drive mechanism such as a horizontal rotation, a vertical rotation, a zoom, a whey, an iris, and the like of the tracking television camera 80, which has been operated to appear like a tracking television camera monitor screen 92, is associated with the distance between the object distance C and the object of the fixed television camera 114, the data is stored in the computer 9.

Figure 39:
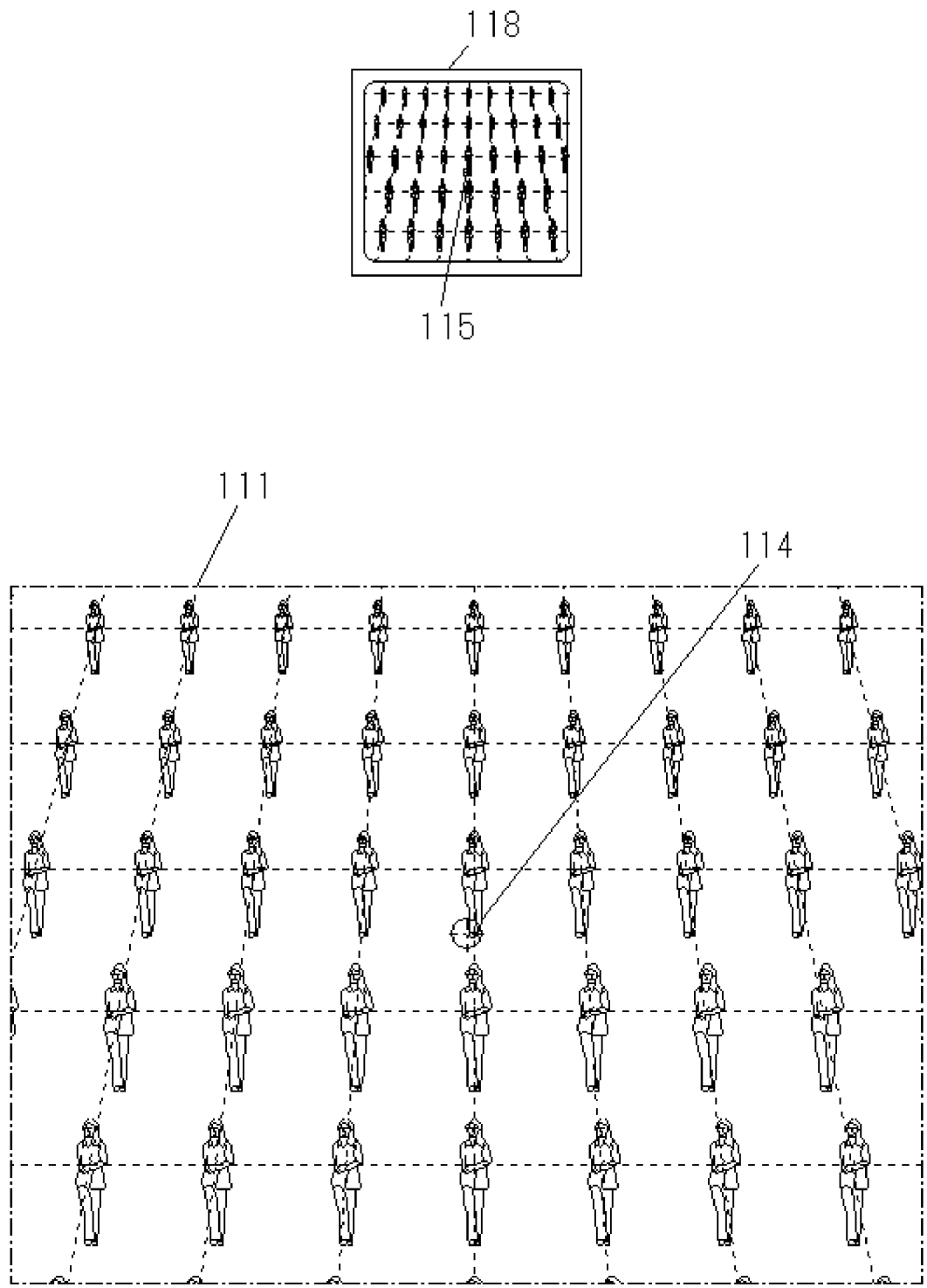
FIG. 39 is a description of each position of the subject on the fixed television camera monitor screen and the subject in which the subject shown in the distance C from the 106 fixed television camera is captured and the distances and their respective drive values are acquired on the imaging plane.

FIG. 39 is an explanatory diagram of the fixed TV camera imaging range C of the distance 111, C to the subject imaging range of the 106 fixed television camera and the fixed television camera monitor screen displaying the captured screen.

In relation to the position of the subject on the fixed television camera monitor screen, each distance and each drive value at all positions between the positions of the subject are interpolated by an operation such as interpolation calculation from each measurement distance and each drive value stored in the computer 9.

The calculated numerical values are stored in computers 9.

Figure 40:
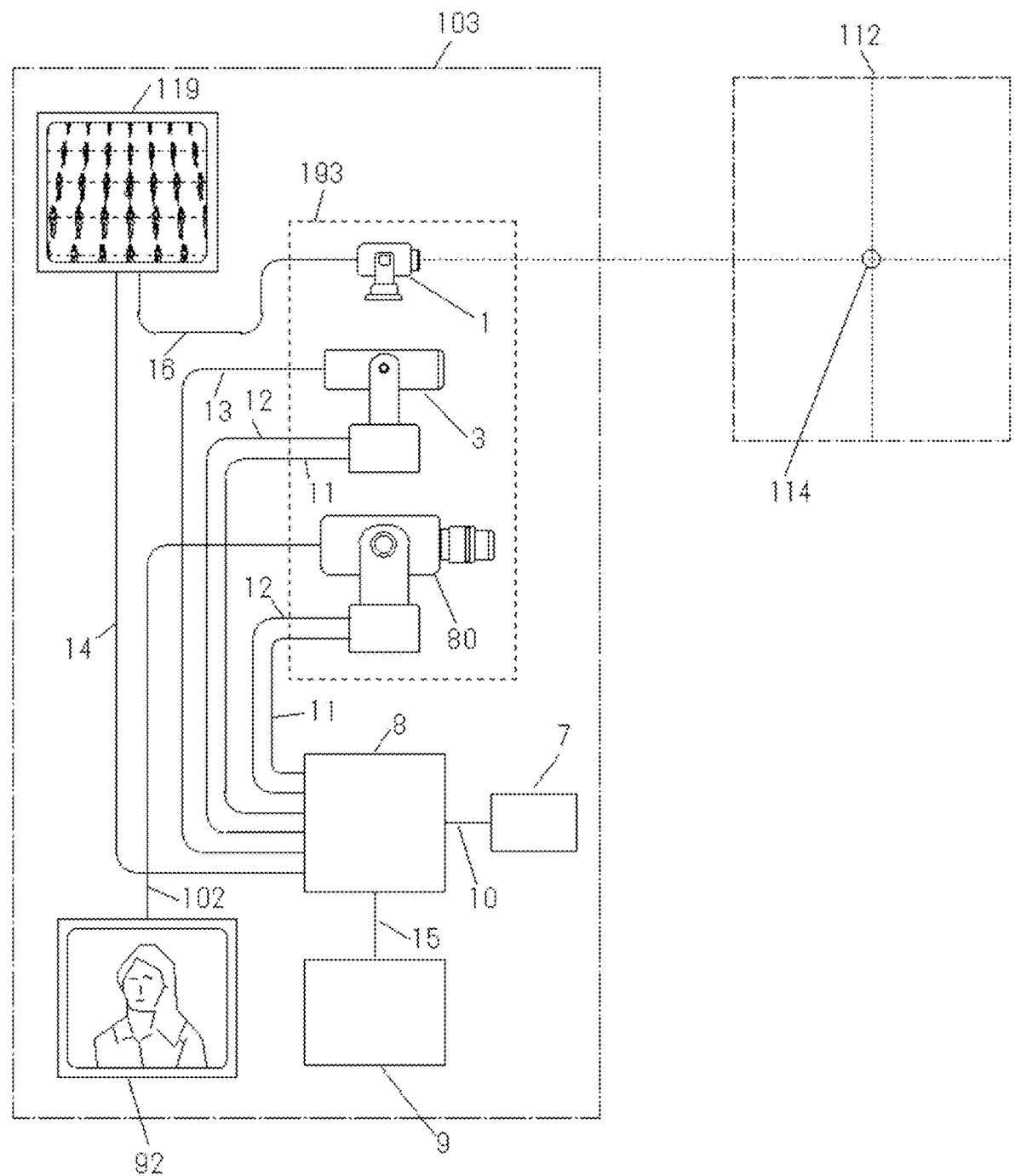
FIG. 40 is a description of a space in which a subject shown in a distance D from the 107 fixed television camera is photographed, and each distance and each drive value thereof on the imaging plane are acquired.

FIG. 40 is an explanatory diagram of photographing the fixed TV camera photographing range 112, D of the distance 107, D to the object photographing range of the fixed TV camera.

The subject shown at the location of the fixed television camera 1 imaging range 112, D corresponding to the position on the fixed television camera monitor screen 5 shot by the fixed television camera is related to the position of the subject on the fixed television camera monitor screen 5, a drive value obtained by driving each drive mechanism such as a horizontal rotation, a vertical rotation, a zoom, a whey, an iris, and the like of the tracking television camera 80, which has been operated to appear like a tracking television camera monitor screen 92, is associated with the distance between the object distance D and the object of the fixed television camera 114, the data is stored in the computer 9.

Figure 41:
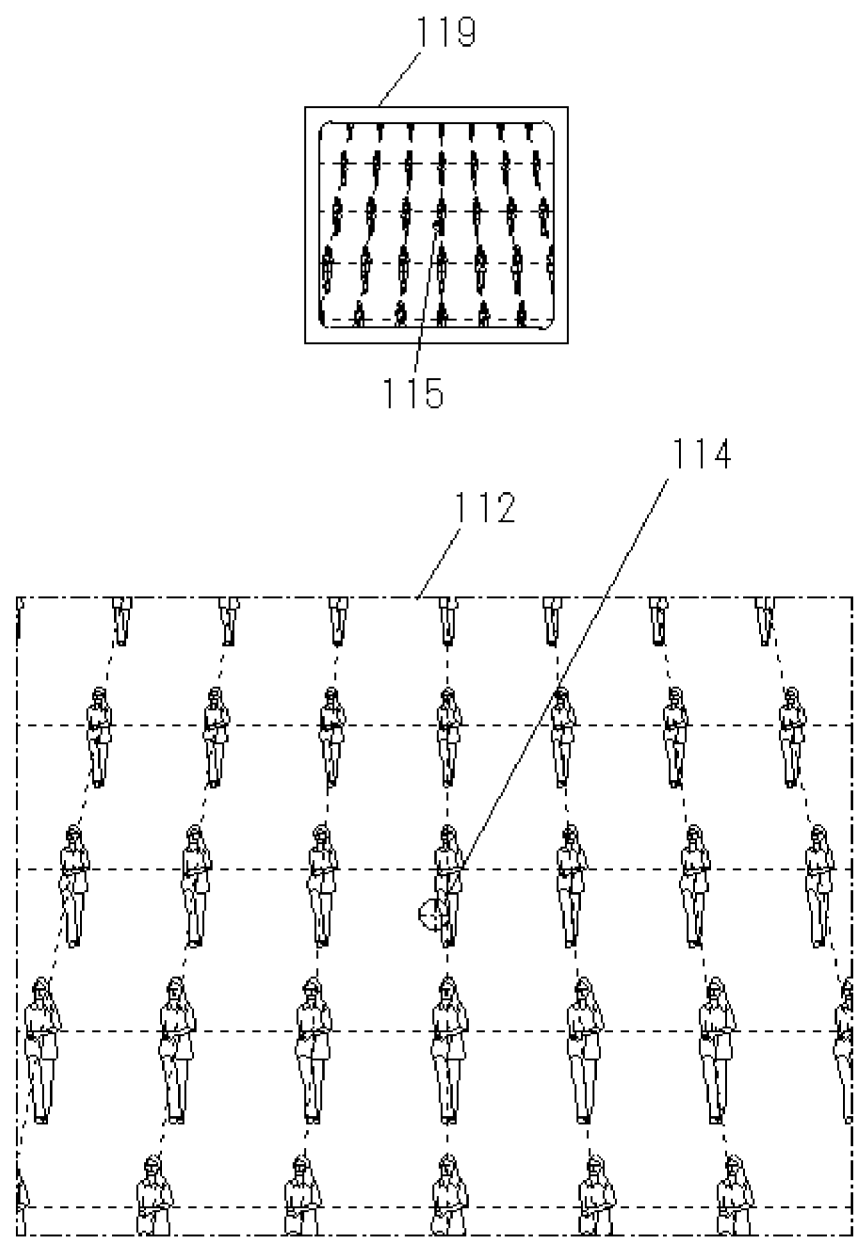
FIG. 41 is a description of a space in which a subject shown in a distance D from a fixed television camera is captured, and each distance and each drive value thereof on the imaging plane are acquired.

FIG. 41 is an explanatory diagram of the fixed television camera imaging range 112, D of the distance 107, D to the subject imaging range of the fixed television camera and the fixed television camera monitor screen displaying the captured screen.

In relation to the position of the subject on the fixed television camera monitor screen, each distance and each drive value at all positions between the positions of the subject are interpolated by an operation such as interpolation calculation from each measurement distance and each drive value stored in the computer 9.

The calculated numerical values are stored in computers 9.

Figure 42:
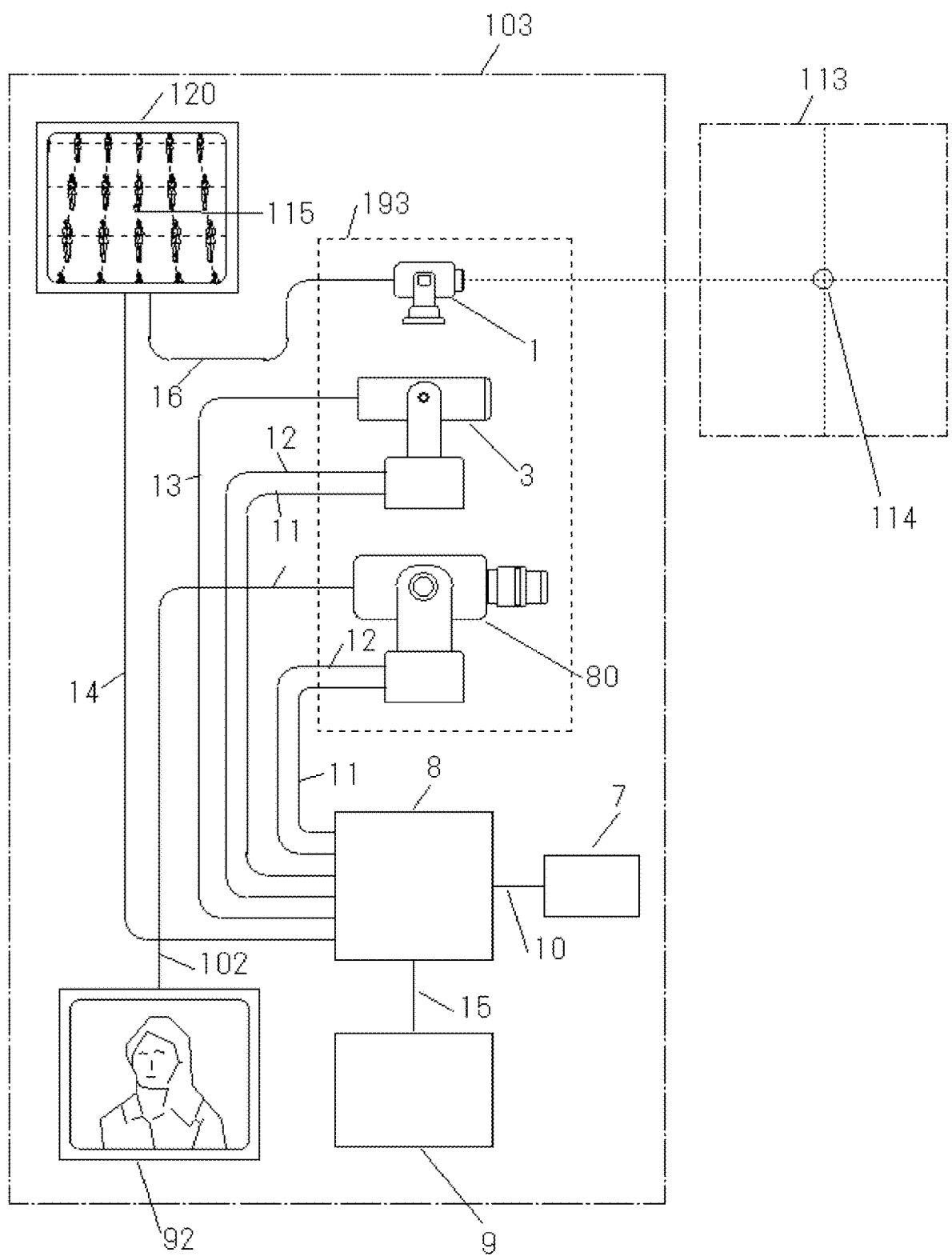
FIG. 42 is a description of a space in which a subject shown in a distance 108, E from the fixed television camera is photographed, and each distance and each drive value thereof on the imaging plane are acquired.

FIG. 42 is an explanatory diagram of photographing the fixed TV camera photographing range 113, E of the distance 108, E to the object photographing range of the fixed TV camera.

The subject shown at the location of the fixed television camera imaging range 108, E corresponding to the position on the fixed television camera monitor screen 5 shot by the fixed television camera 1 is related to the position of the subject on the fixed television camera monitor screen 5, a drive value obtained by driving each drive mechanism such as a horizontal rotation, a vertical rotation, a zoom, a whey, an iris, and the like of the tracking television camera 80, which has been operated to appear like a tracking television camera monitor screen 92, is associated with the distance between the object distance E and the object of the fixed television camera 114, the data is stored in the computer 9.

Figure 43:
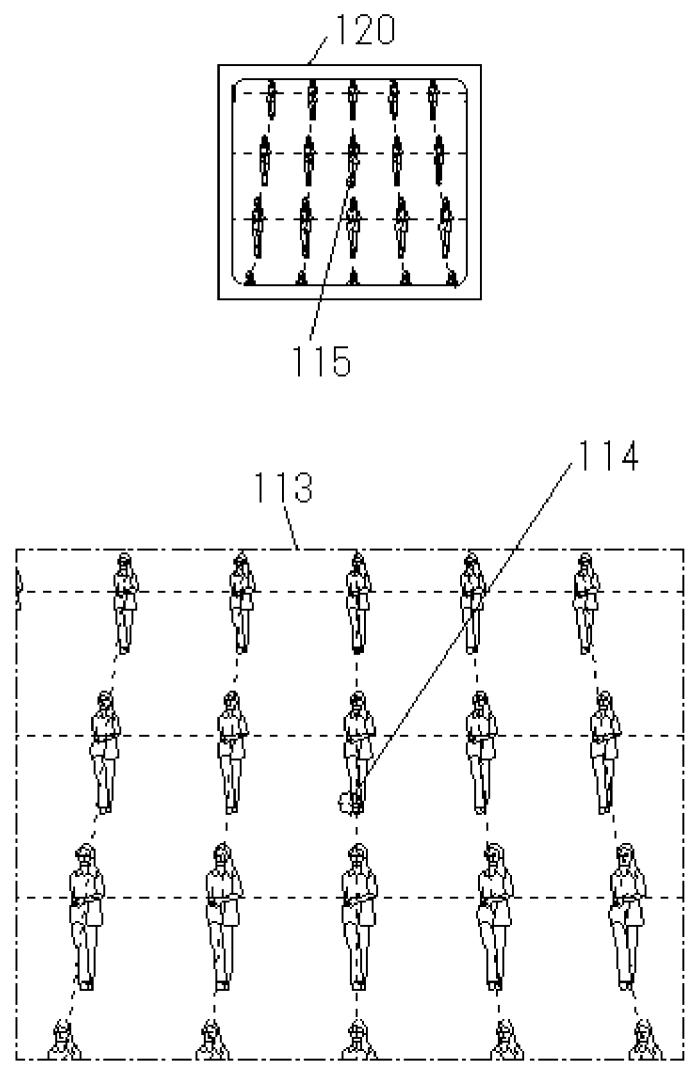
FIG. 43 is a description of each position of the subject on the fixed television camera monitor screen and the subject in which the subject shown in the distance 108, E from the fixed television camera is captured and the distances and their respective drive values are acquired on the imaging plane.

FIG. 43 is an explanatory diagram of the fixed television camera imaging range 113, E of the distance 108, E to the subject imaging range of the fixed television camera and the fixed television camera monitor screen displaying the captured screen.

In relation to the position of the subject on the fixed television camera monitor screen, each distance and each drive value at all positions between the positions of the subject are interpolated by an operation such as interpolation calculation from each measurement distance and each drive value stored in the computer 9.

The calculated numerical values are stored in computers 9.

For each position on each 5-fixed television camera monitor screen, 9 from each of the drive values stored in the computer, the distance measurement and the drive value thereof at all positions on the fixed television camera monitor screen 5 are interpolated by an arithmetic operation such as interpolation calculation at all positions on the fixed television camera monitor screen 5.

From each drive value stored in the computer 9 at several distances from the fixed television camera, the distance and its drive values at all positions on the fixed television camera monitor screen 5 can be interpolated at all positions on the fixed television camera monitor screen 5 at all positions on the fixed television camera monitor screen 5 at all positions on the 5-fixed television camera monitor screen, and operated like the tracking television camera monitor screen 92 at all positions on the 5-fixed television camera monitor screen.

Next, it will be described, 5 using the respective numerical values that can be manipulated like the tracking television camera monitor screen 92 at all locations on the fixed television camera monitor screen 5, some of the distances of the fixed television camera, 5 at all positions on the fixed television camera monitor screen 5 at all positions on the fixed television camera, a numerical value that can be displayed like the tracking television camera monitor screen 92 is interpolated by an arithmetic operation such as interpolation calculation at the computer 9.

By measuring the distance between all the distances in the fixed television camera imaging range, it is possible to project an image like a tracking television camera monitor screen 92 by an arbitrary instruction on the fixed television camera monitor screen 5 shot by the fixed television camera 1.

Figure 44:
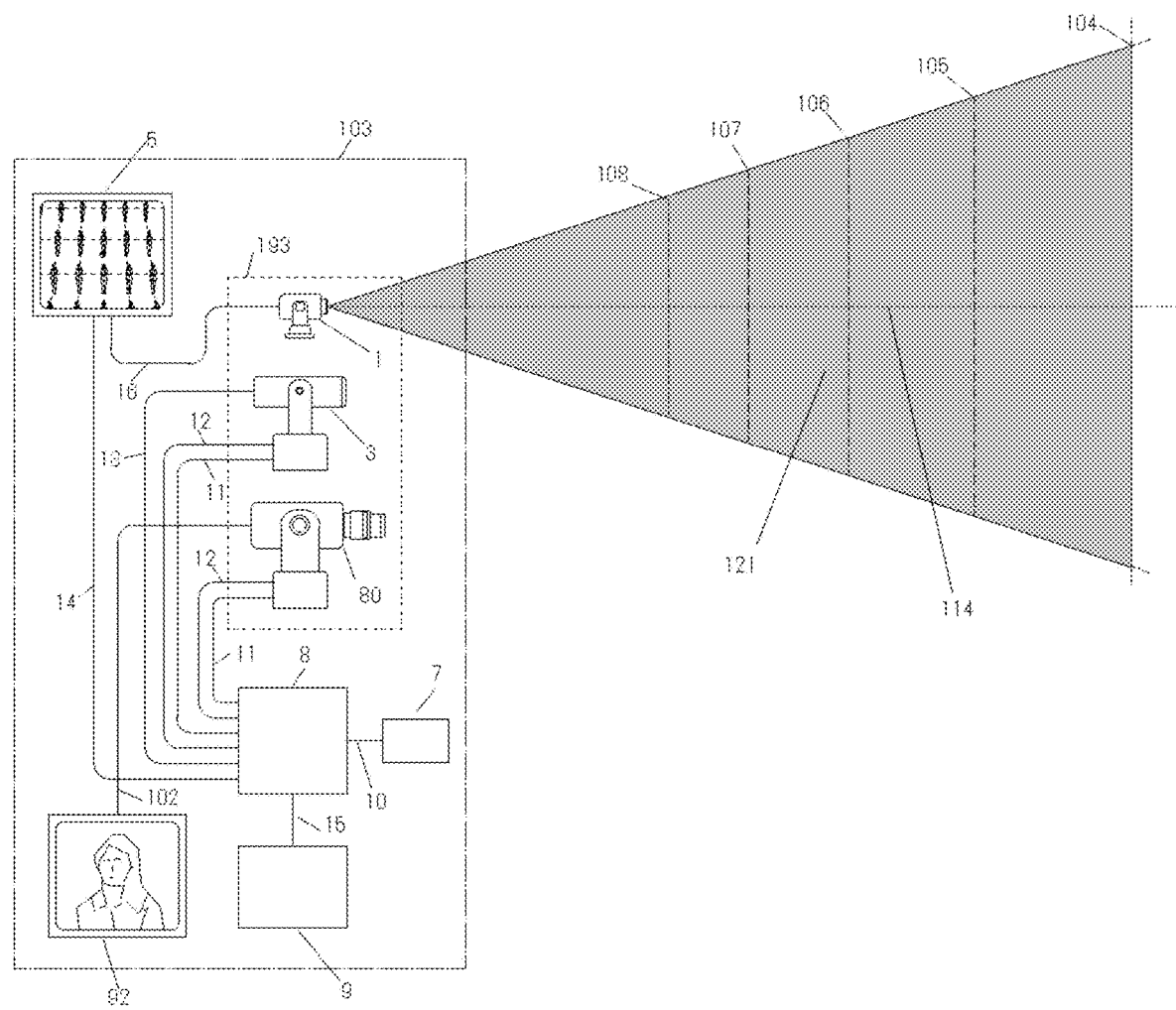
FIG. 44 shows a vertical direction in which each distance and each drive value thereof are acquired at all distances 104 to 108, A-E of objects of fixed television cameras from fixed television cameras in the vertical direction.

FIG. 44 is an explanatory diagram of a vertical direction in which the tracking television camera captures an object in all ranges in which the fixed television camera is photographed by tracking the tracking laser rangefinder side of the tracking television camera.

Figure 45:
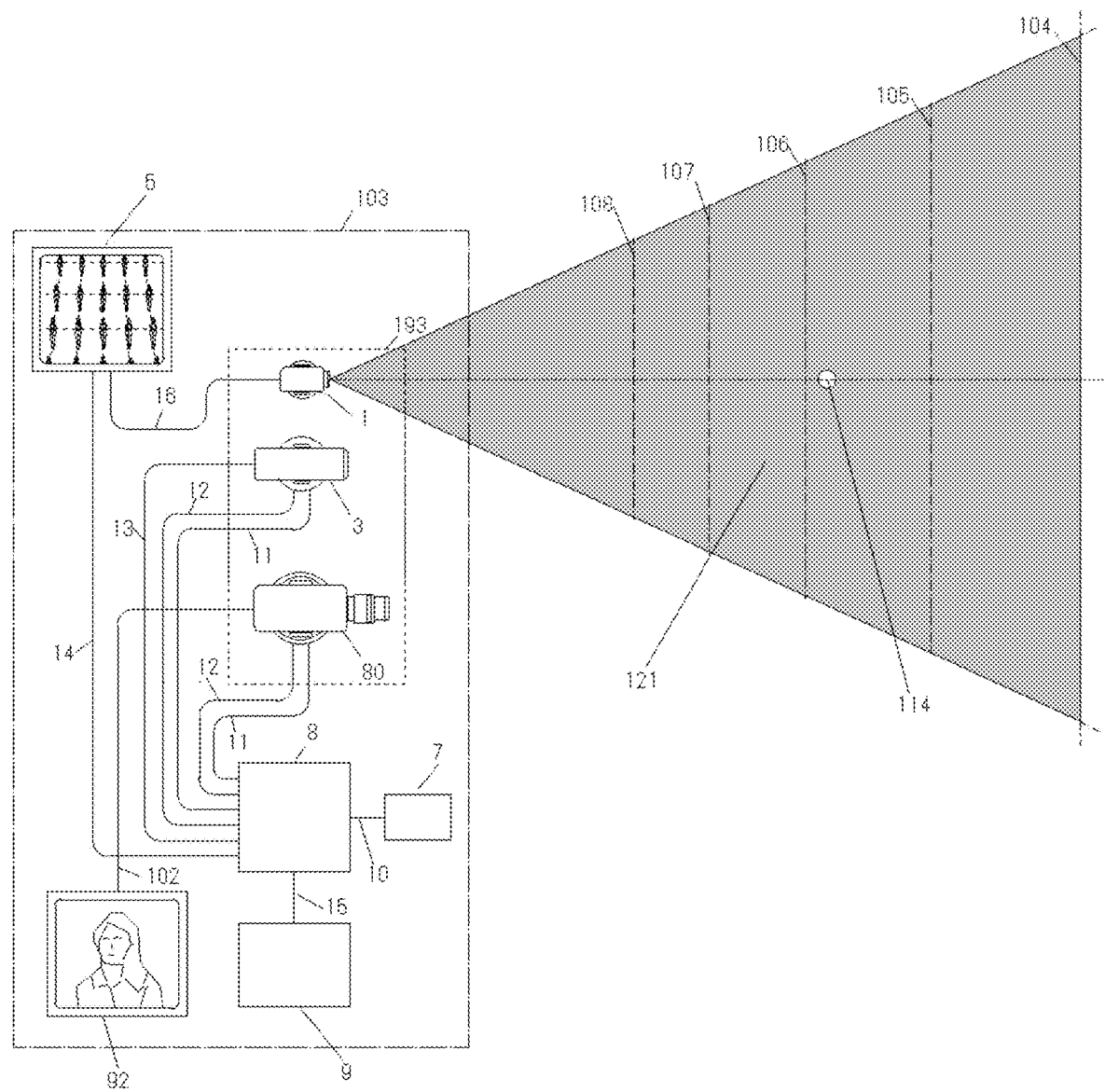
FIG. 45 shows a horizontal explanatory diagram for acquiring each distance and each drive value at all distances 104 to 108, A to E of objects of fixed television cameras from fixed television cameras in the horizontal direction.

FIG. 45 is an explanatory diagram of a horizontal direction in which a tracking television camera captures an object in a range to be photographed by the fixed television camera by tracking the tracking laser rangefinder side of the tracking television camera.

Figure 46:
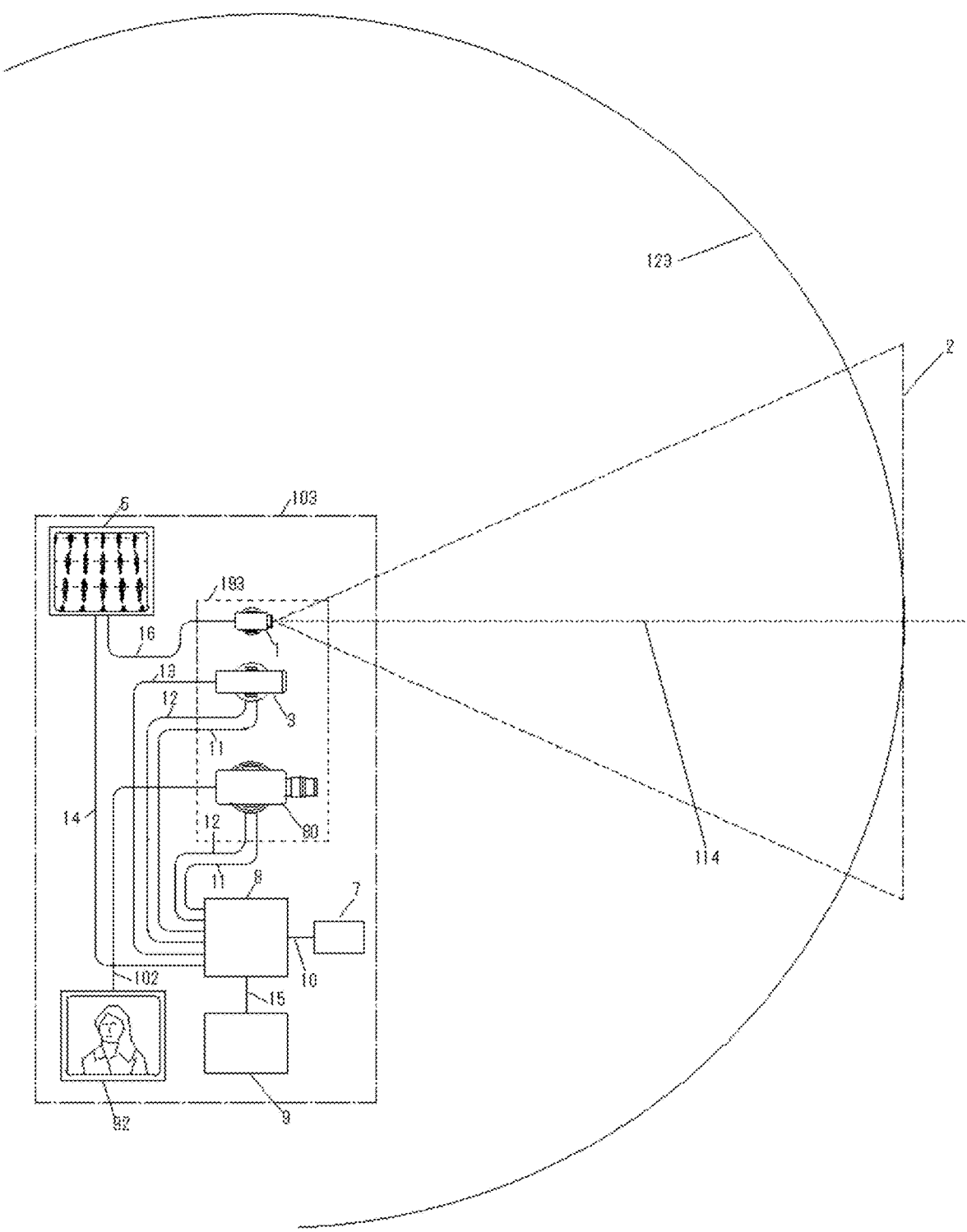
FIG. 46 is an explanatory diagram for acquiring each distance and each drive value by changing the shooting direction of the 117 numerical control television camera in the horizontal direction at all distances in the shooting range of 118 to 122 numerical control revision camera horizontal rotation A to E from the 117 numerical control television camera.

FIG. 46 is an explanatory diagram in which an tracking television camera 80 performs tracking shooting using a numerical value of a distance to be measured of a subject in a range captured by the numerical control television camera by tracking the tracking laser rangefinder side of the numerical control television camera.

A horizontal rotation function of numerical control is attached to the fixed television camera described above, and the drive numerical value of the tracking photography of the tracking television camera 80 is acquired by the method described above for each horizontal rotation drive value obtained by horizontal rotation driving.

Figure 47:
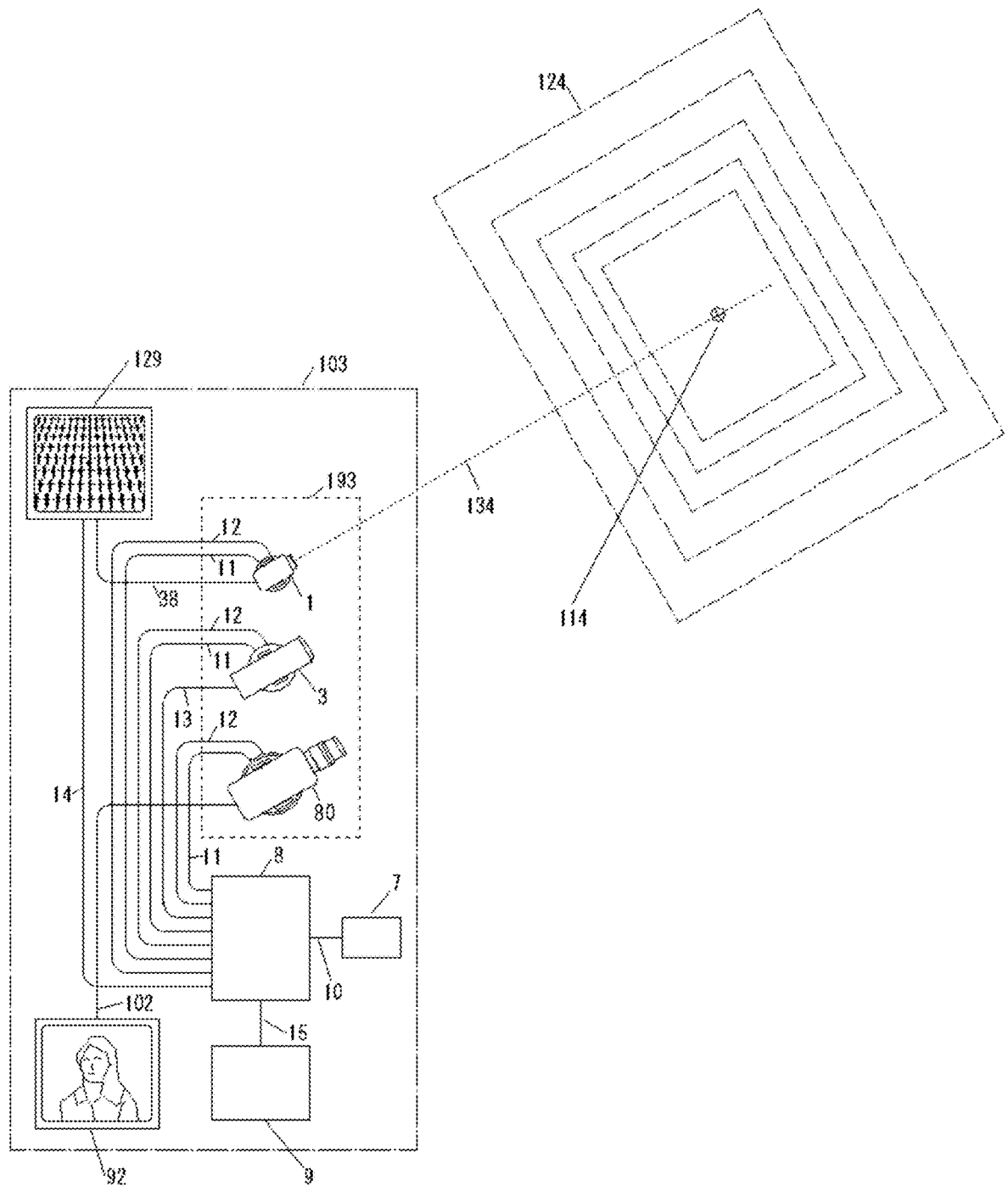
FIG. 47 is an explanatory diagram for acquiring each distance and each drive value by changing the shooting direction of the fixed television camera in the horizontal direction A at all distances from the five-value control television camera to the subject.

In FIG. 47, in the same manner as described above, in the horizontal rotation A of the numerical control television camera 35, the distance and the drive numerical value of the tracking photographing of the tracking television camera 80 are acquired, and each distance and each drive value are interpolated by an operation such as interpolation calculation.

The calculated numerical values are stored in computers 9.

The numerical control television camera 35 is stored in the computer 9 in association with the rotational drive value of the horizontal rotation A.

Figure 48:
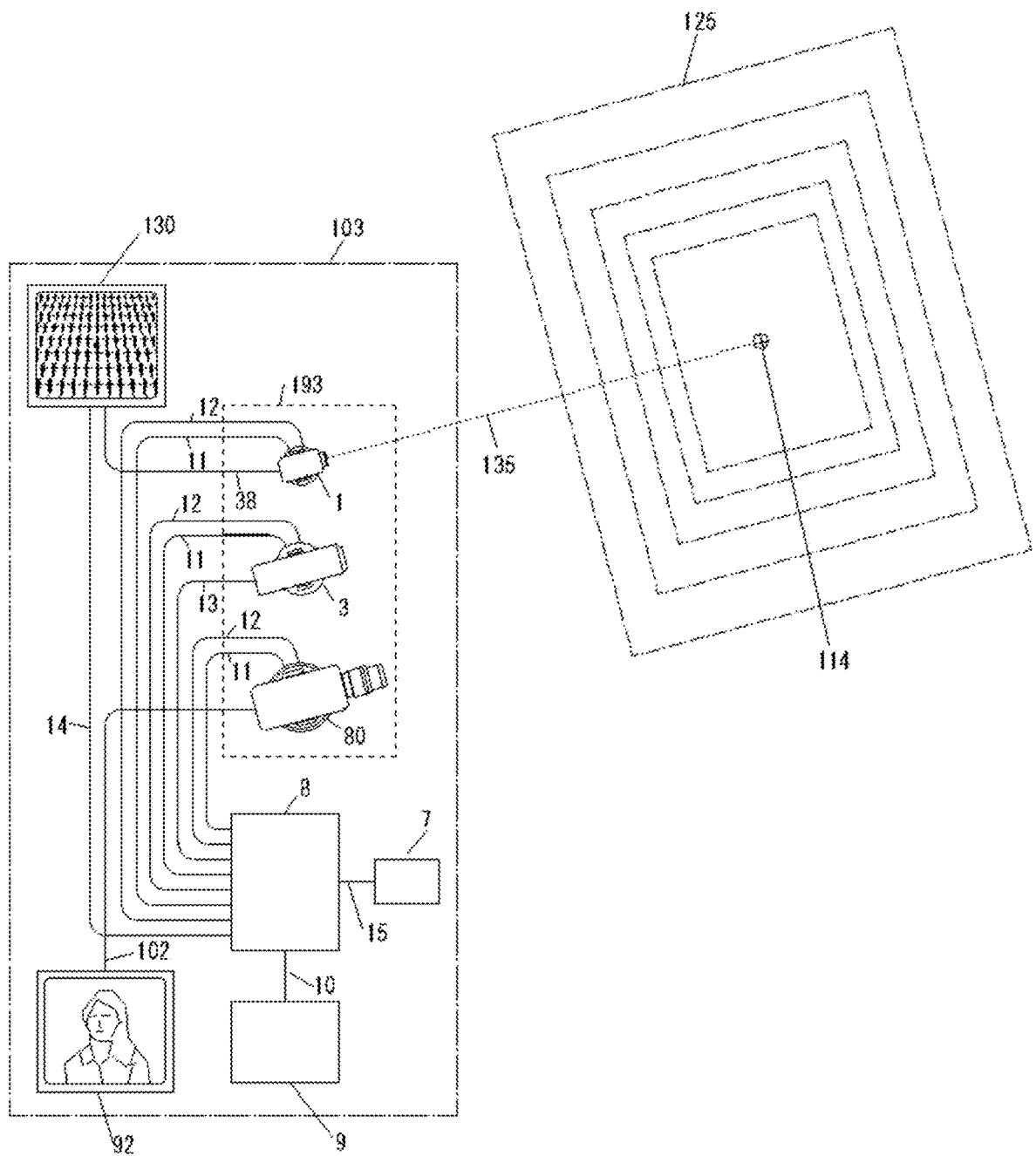
FIG. 48 shows the distance A to E of the object of the fixed television camera from the fixed television camera by changing the imaging direction of the fixed television camera in the horizontal direction B at all the distances of the fixed television camera, and each distance and each drive value thereof are acquired.

In FIG. 48, in the same manner as described above, in the horizontal rotation B of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the horizontal rotation B.

Figure 49:
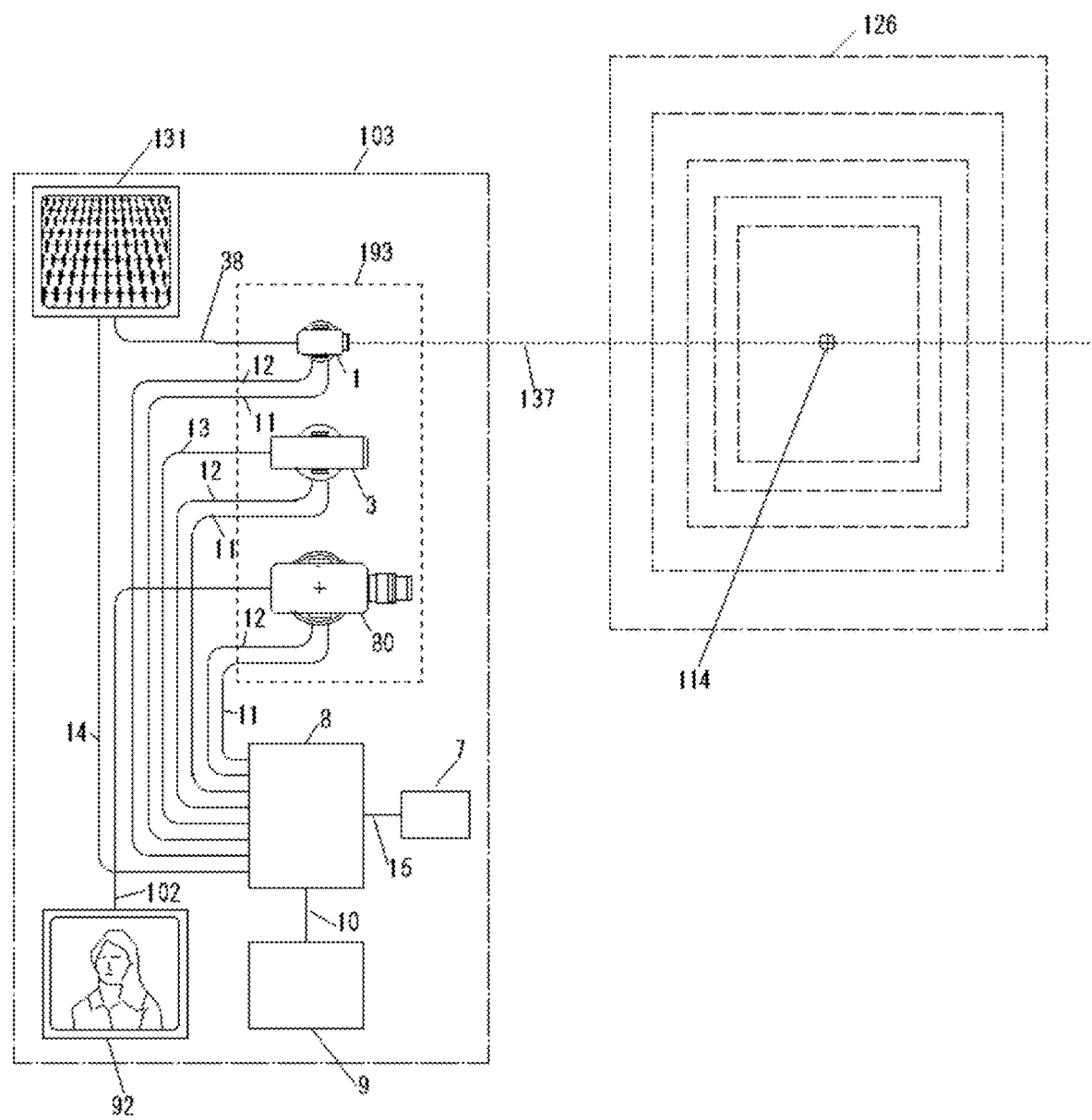
FIG. 49 shows the distance A to E of the object of the fixed television camera from the fixed television camera by changing the imaging direction of the fixed television camera in the horizontal direction C at all the distances of the fixed television camera, and each distance and each drive value thereof are acquired.

In FIG. 49, in the same manner as described above, in the horizontal rotation C of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the horizontal rotation C of the camera.

Figure 50:
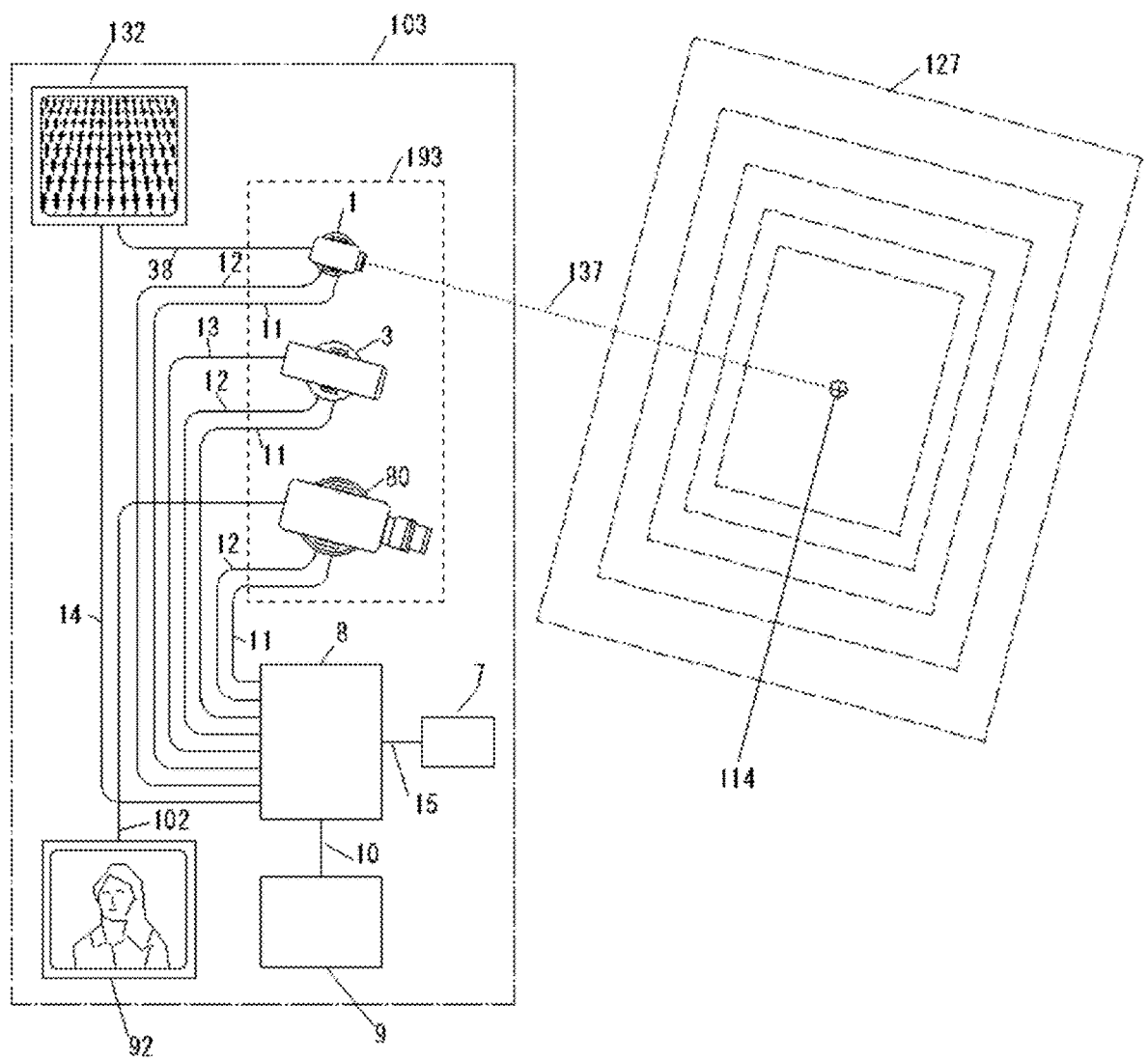
FIG. 50 shows the distances A to E of the objects of the fixed television camera from the fixed television camera by changing the imaging direction of the fixed television camera in the horizontal direction D at all the distances of the fixed television camera, and each distance and each drive value thereof are acquired.

In FIG. 50, in the horizontal rotation D of the numerical control television camera 35, the drive numerical value of the tracking photographing of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the horizontal rotation D of the camera.

Figure 51:
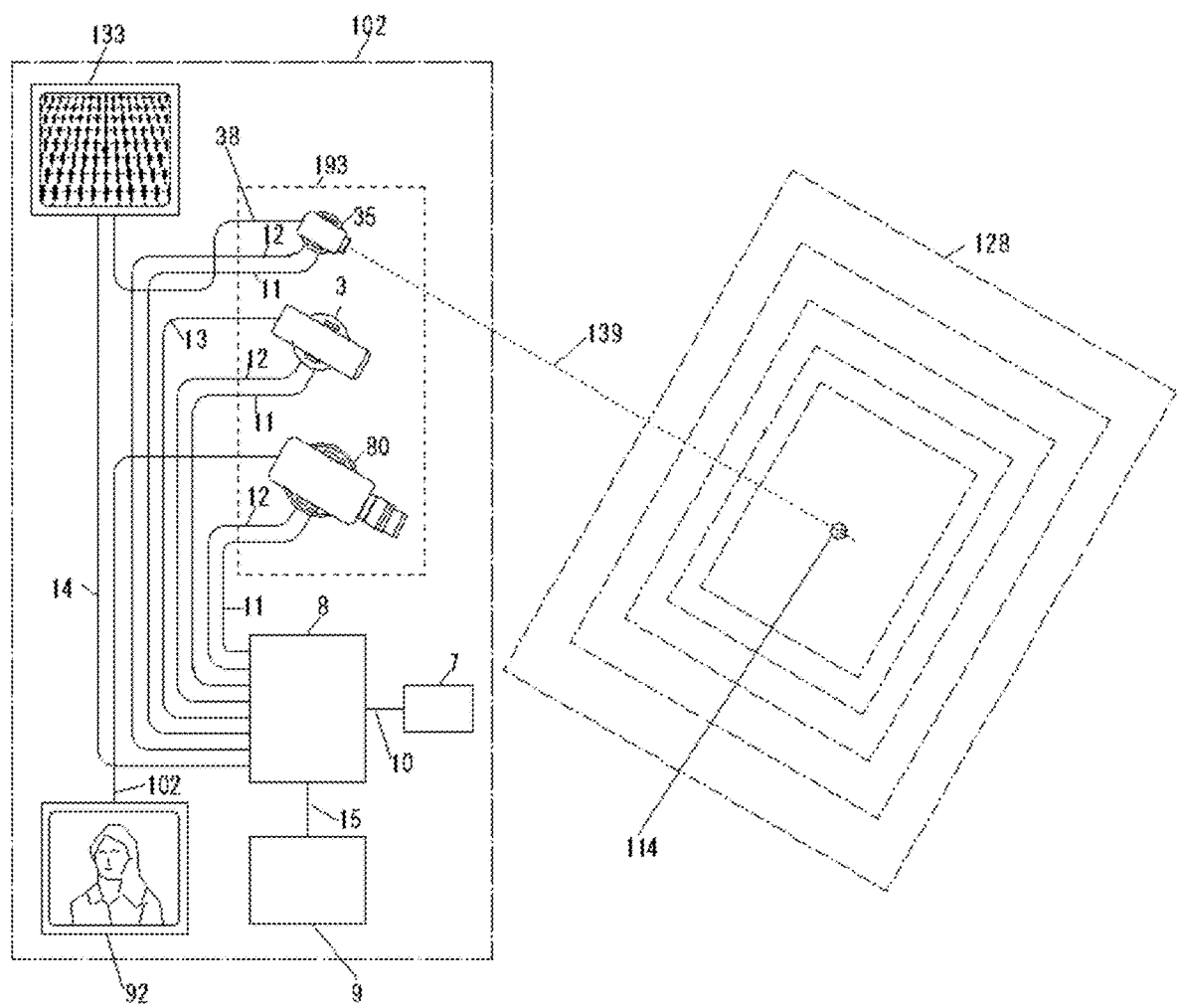
FIG. 51 shows the distances A to E of the objects of the fixed television camera from the fixed television camera by changing the imaging direction of the fixed television camera in the horizontal direction E at all the distances of the fixed television camera, and each distance and each drive value thereof are acquired.

In FIG. 51, in the same manner as described above, in the horizontal rotation E of the numerical control television camera 35, the drive numerical value of the tracking photographing of the tracking television camera 80 is acquired at all positions on the numerical control television camera monitor screen 37.

The numerical control television camera 35 is stored in a computer 9 in association with the rotation drive value of the horizontal rotation E of the numerical control television camera, and each distance and each drive value are interpolated by an operation such as interpolation calculation.

Using the drive values of the tracking imaging of the tracking television camera 80 associated with the rotational drive values of the horizontal rotation A to E of the numerical control television camera 35 stored in the computer, in all horizontal rotation directions of the numerical control television camera 35, the drive value of the tracking shooting of the tracking television camera 80 is interpolated by an operation such as interpolation calculation at the computer 9.

Figure 52:
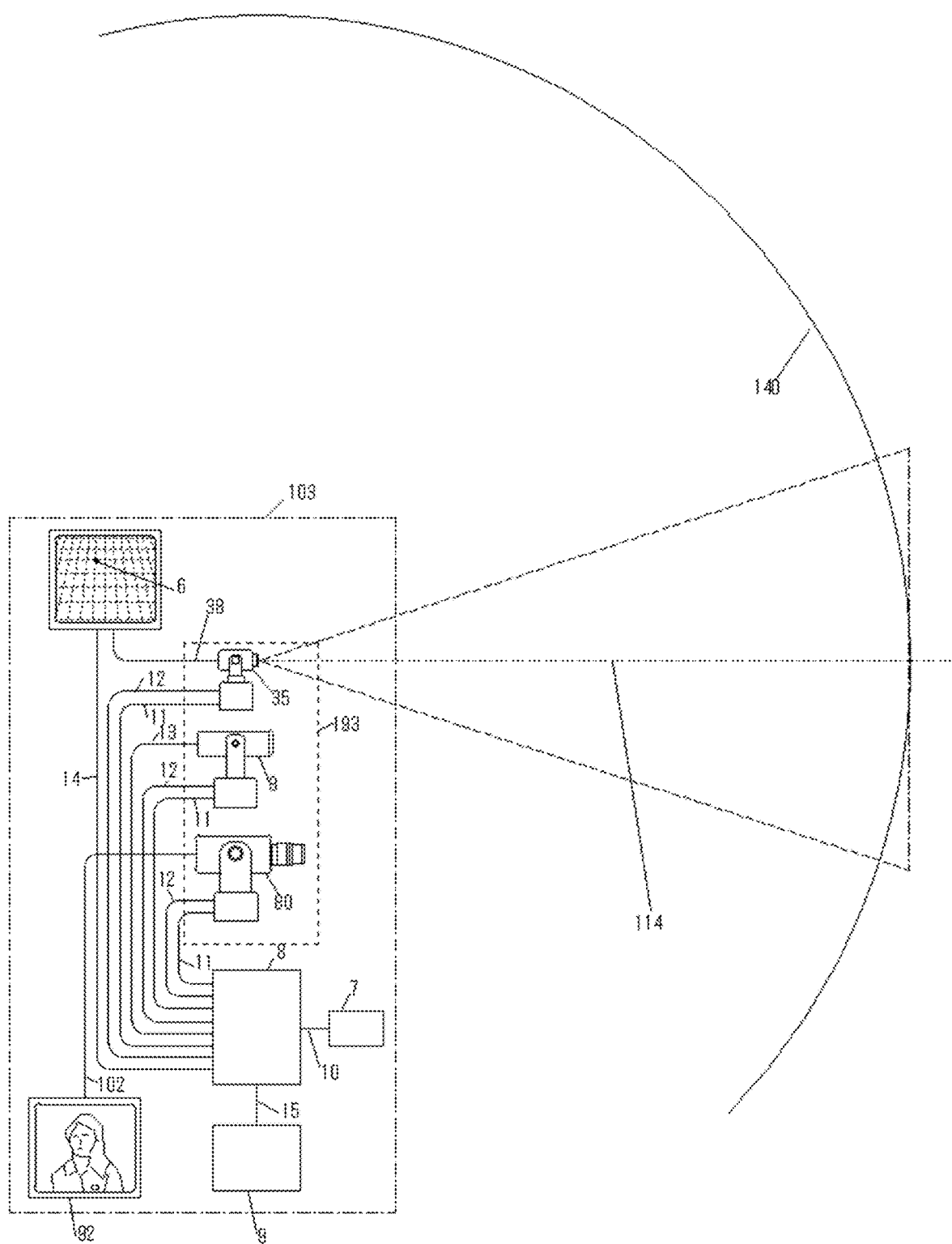
FIG. 52 shows the distances A to E of the objects of the fixed television camera from the fixed television camera and is an explanatory diagram for acquiring each distance and each drive value by changing the vertical direction of the fixed television camera 1 in the shooting direction at all the distances of the fixed television camera.

FIG. 52 is an explanatory diagram of tracking photographing of a tracking television camera by changing a photographing direction of a fixed television camera by changing a photographing direction of a fixed television camera by tracking a tracking laser rangefinder side of the tracking television camera 80.

A vertical rotation function of numerical control is attached to the fixed television camera described above, and the drive numerical value of the tracking photography of the tracking television camera 80 is acquired for each vertical rotation drive value that is vertically rotated.

Figure 53:
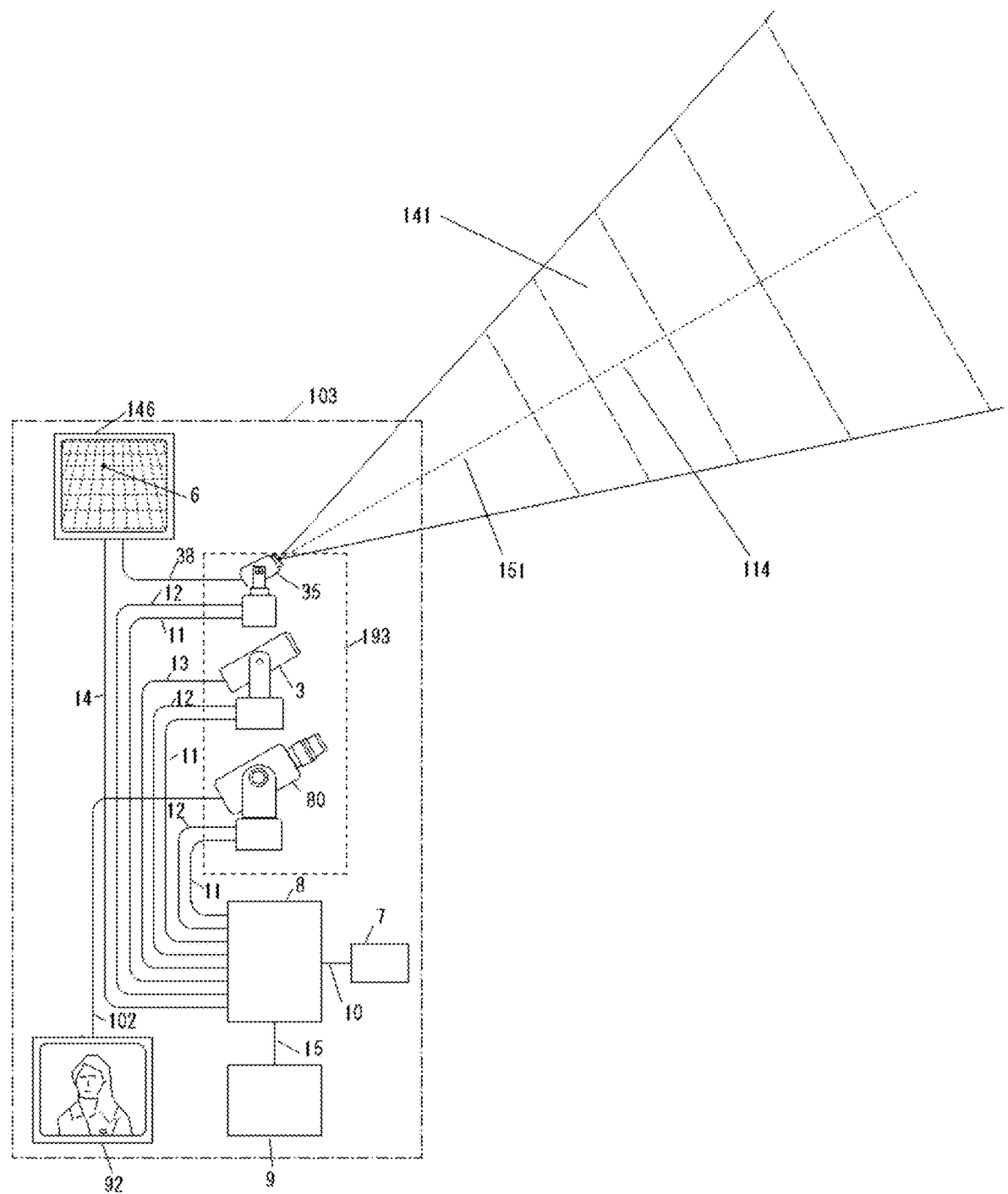
FIG. 53 shows the distances A to E of the objects of the fixed television camera from the fixed television camera by changing the imaging direction of the fixed television camera in the vertical direction A at all the distances of the fixed television camera, and each distance and each drive value thereof are acquired.

In FIG. 53, in the same manner as described above, in the vertical rotation A of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the vertical rotation A.

Figure 54:
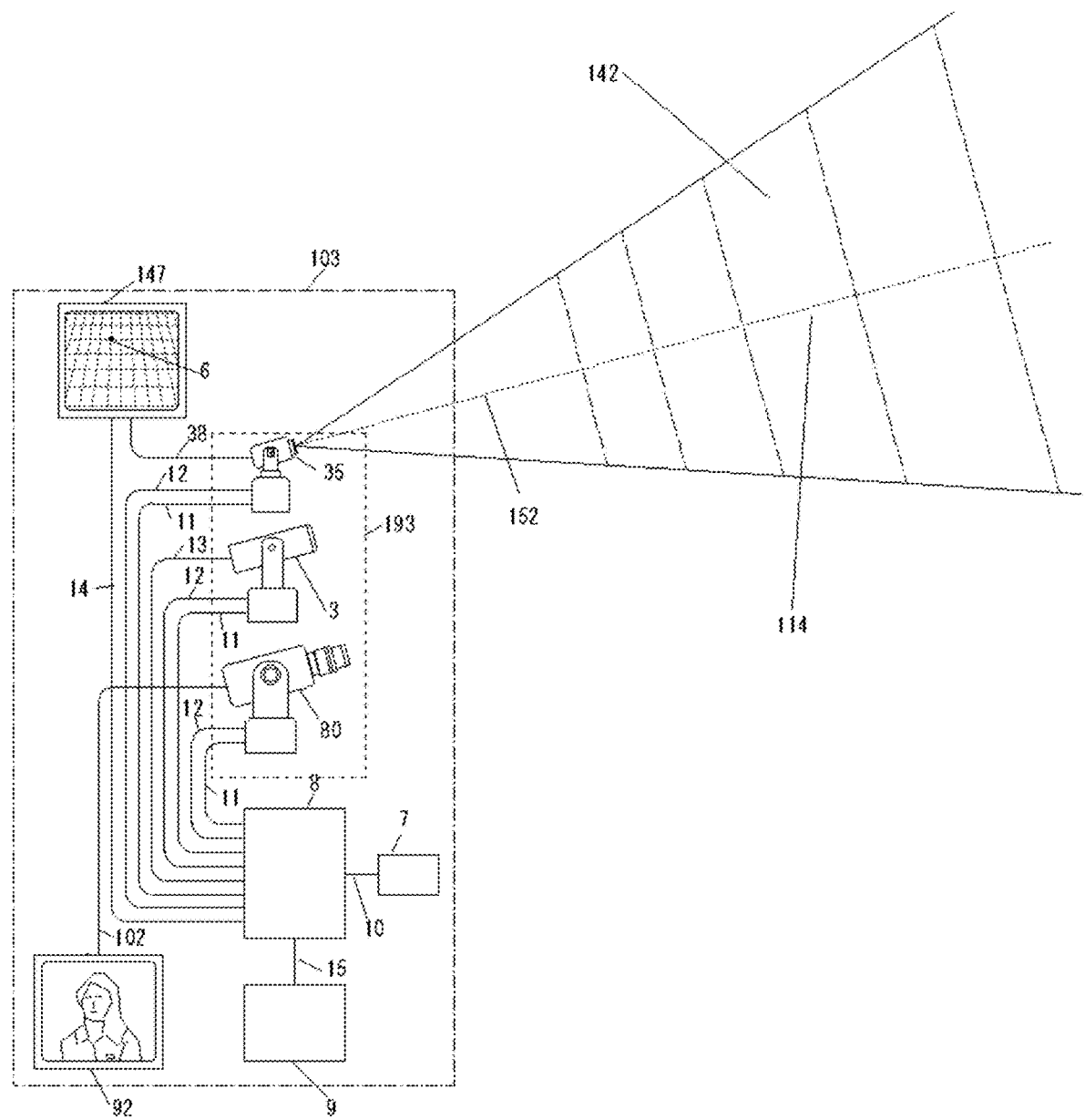
FIG. 54 shows the distance A to E of the object of the fixed television camera from the fixed television camera by changing the imaging direction of the fixed television camera in the vertical direction B at all the distances of the fixed television camera, and each distance and each drive value thereof are acquired.

In FIG. 54, in the same manner as described above, in the vertical rotation B of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the vertical rotation B of the camera.

Figure 55:
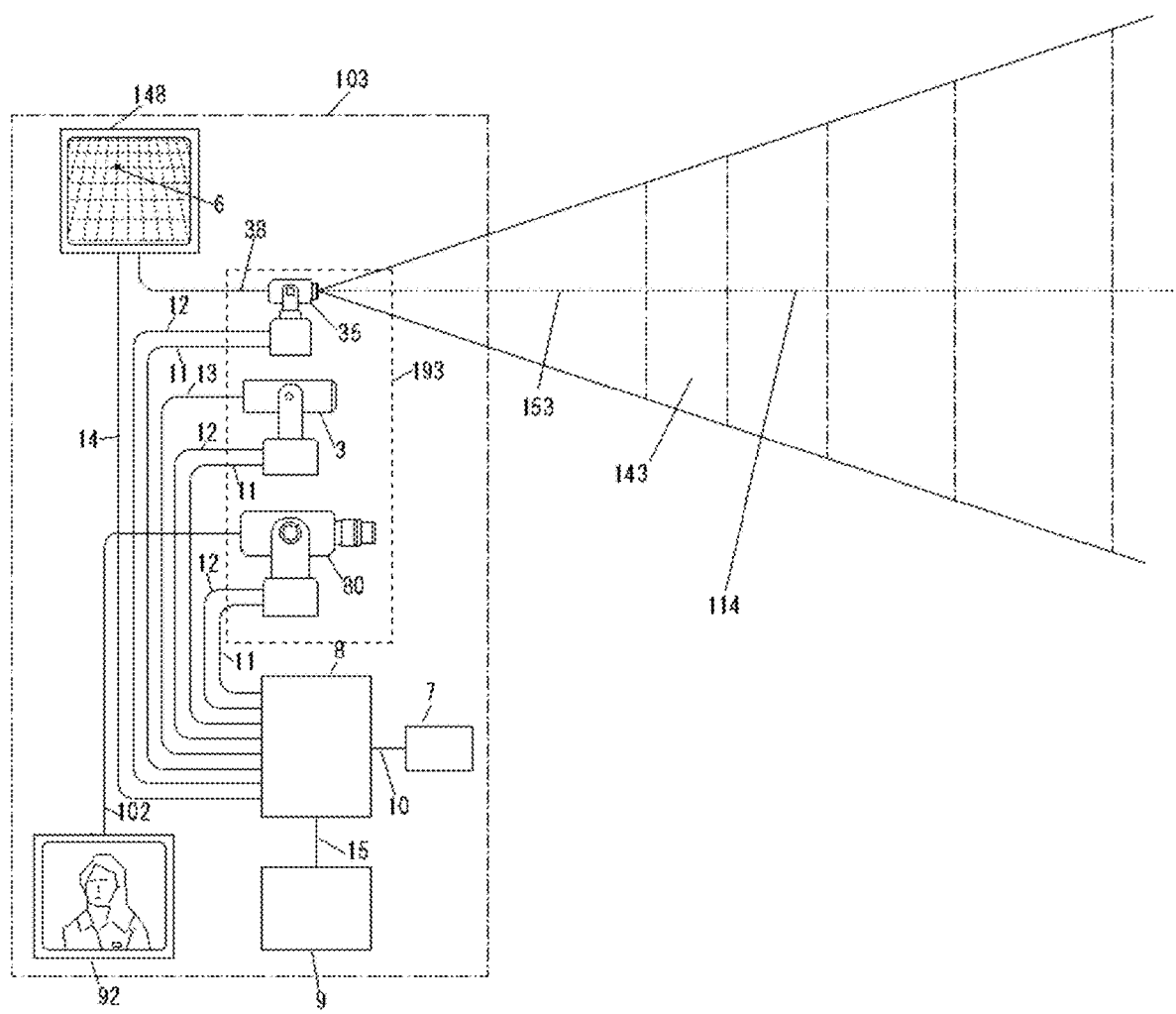
FIG. 55 shows the distances A to E of the objects of the fixed television camera from the fixed television camera by changing the imaging direction of the fixed television camera in the vertical direction C at all the distances of the fixed television camera, and each distance and each drive value thereof are acquired.

In FIG. 55, in the same manner as described above, in the vertical rotation C of the numerical control television camera 35, a drive numerical value of the tracking photographing of the tracking television camera 80 is obtained at all positions on the numerical control television camera monitor screen 37, and each distance and each drive value are interpolated by an operation such as interpolation calculation.

The numerical control television camera 35 is stored in the computer 9 in association with the rotational drive value of the vertical rotation C of the camera.

Figure 56:
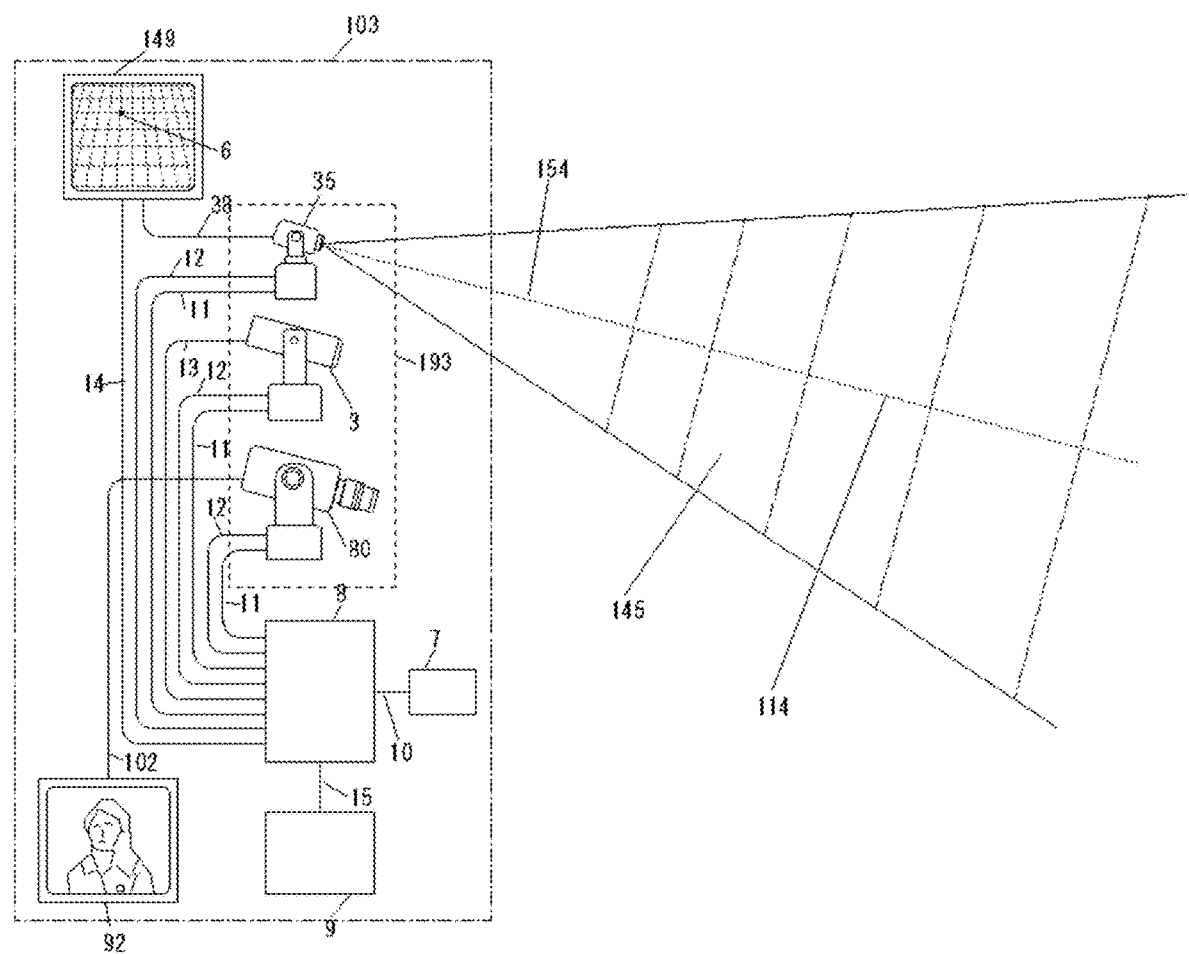
FIG. 56 shows the distance A to E of the object of the fixed television camera from the fixed television camera by changing the imaging direction of the fixed television camera in the vertical direction D at all the distances of the fixed television camera, and each distance and each drive value thereof are acquired.

In FIG. 56, in the same manner as described above, in the vertical rotation D of the numerical control television camera 35, the drive numerical value of the tracking photographing of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the vertical rotation D of the camera.

Figure 57:
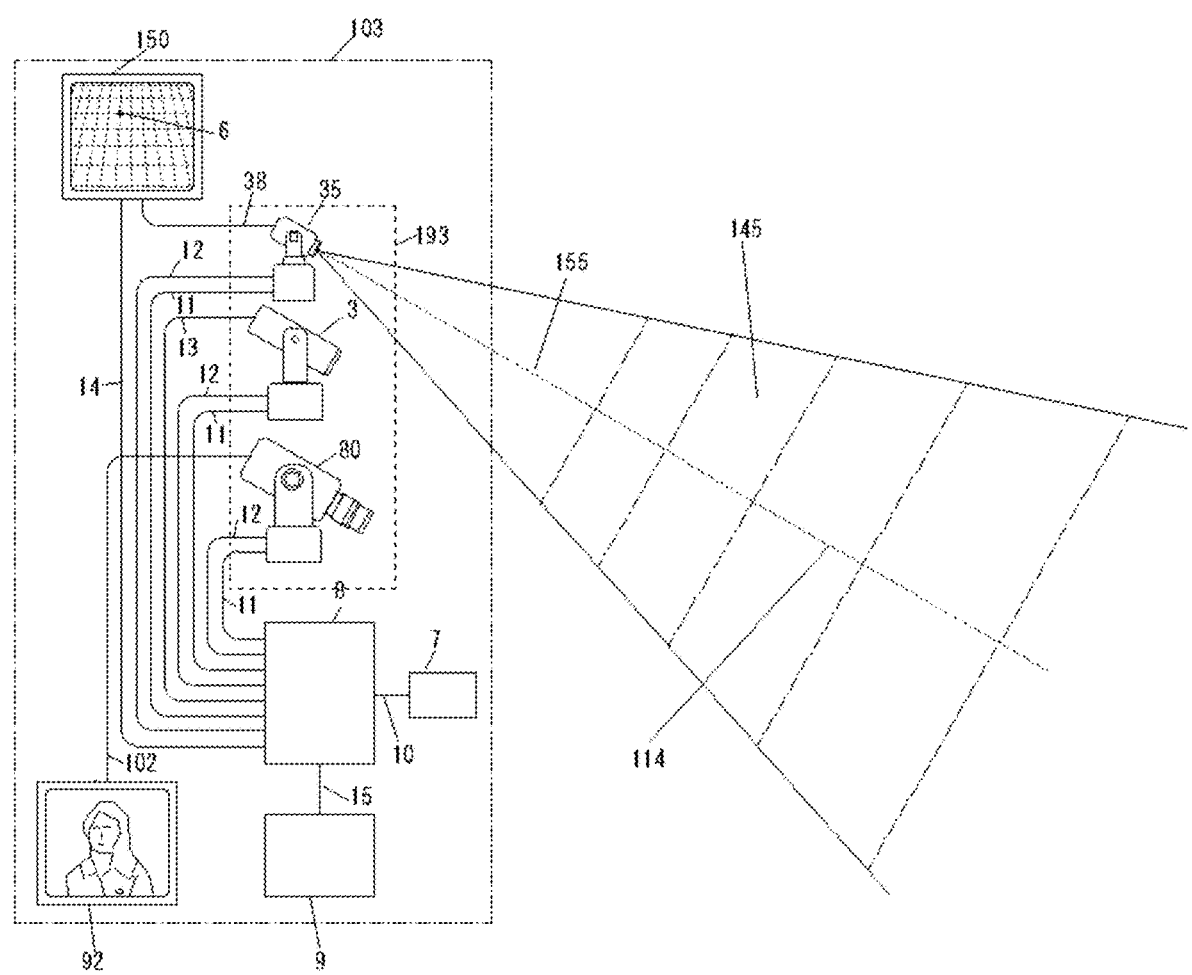
FIG. 57 shows the distances A to E of the objects of the fixed television camera from the fixed television camera by changing the imaging direction of the fixed television camera in the vertical direction E at all the distances of the fixed television camera, and each distance and each drive value thereof are acquired.

In FIG. 57, in the same manner as described above, in the vertical rotation E of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the rotational drive value of the vertical rotation E of the camera.

Using the drive values of the tracking imaging of the tracking television camera 80 associated with the rotational drive values of the vertical rotation A to E of the numerical control television camera 35 stored in the computer, 35 in all the vertical rotation directions of the numerical control television camera, the drive value of the tracking shooting of the tracking television camera 80 is interpolated by an operation such as interpolation calculation at the computer 9.

Figure 58:
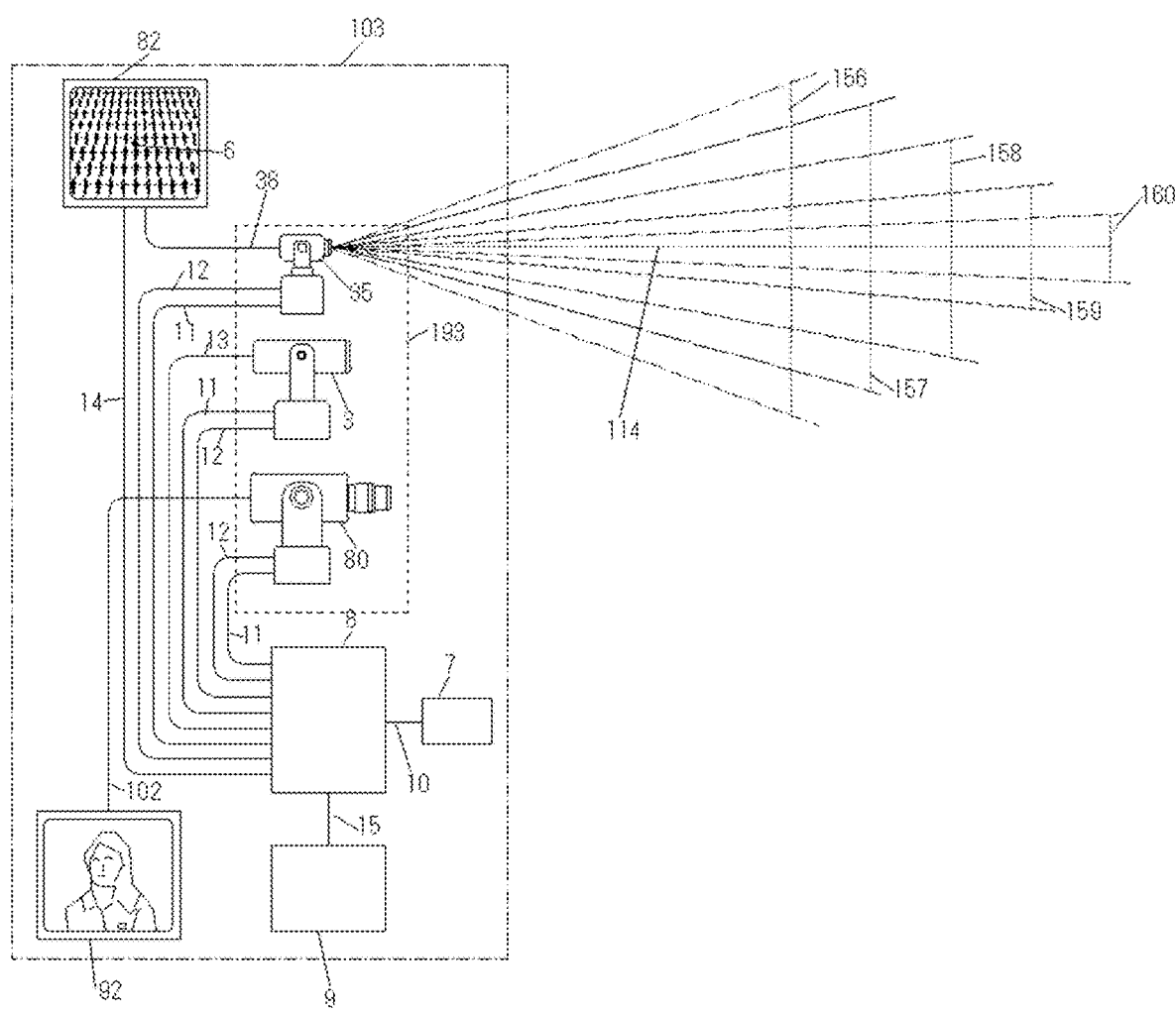
FIG. 58 is a distance A-E of a subject of a fixed television camera from a fixed television camera and is an explanatory diagram for acquiring each distance and each drive value by changing the angle of view of shooting of the fixed television camera at all the distances of the fixed television camera.

FIG. 58 is an explanatory diagram of tracking shooting of the tracking television camera by changing the angle of view of the imaging of the numerical control television camera 35 without changing the direction in which the camera of the fixed television camera is captured by tracking the tracking laser rangefinder side of the tracking television camera 80.

A zoom function of numerical control is attached to the fixed television camera described above, and the drive numerical value of the tracking photography of the tracking television camera 80 is acquired for each view angle drive position in which the angle of view of the numerical control television camera 35 is changed.

Figure 59:
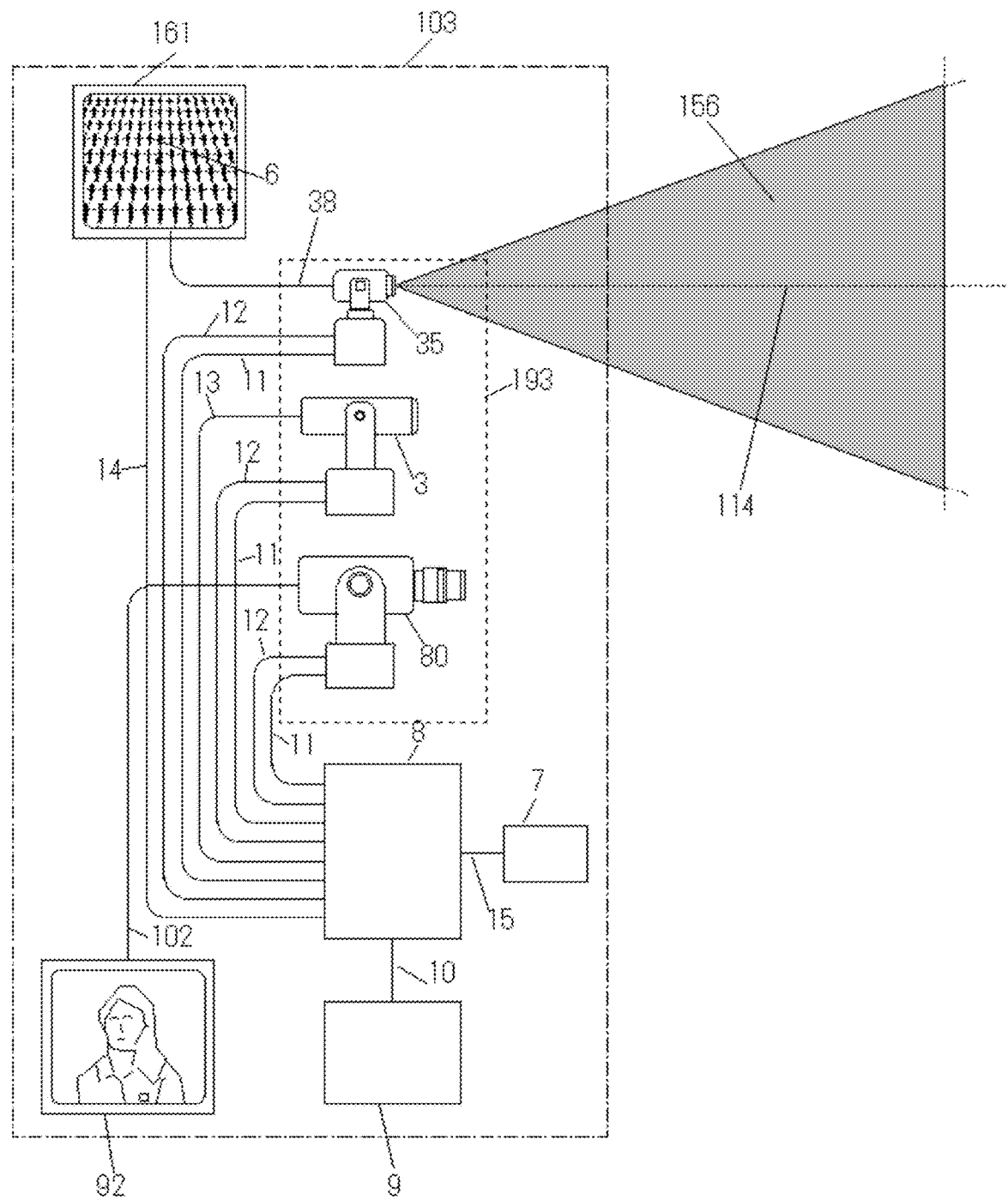
FIG. 59 shows the distance A to E of the object of the fixed television camera from the fixed television camera and is an explanatory diagram for acquiring each distance and each drive value by changing the angle of view A of the photographing of the fixed television camera at all the distances of the fixed television camera.

In FIG. 59, in the same manner as described above, in the view angle A of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the field angle drive value of the angle of view A of the camera.

Figure 60:
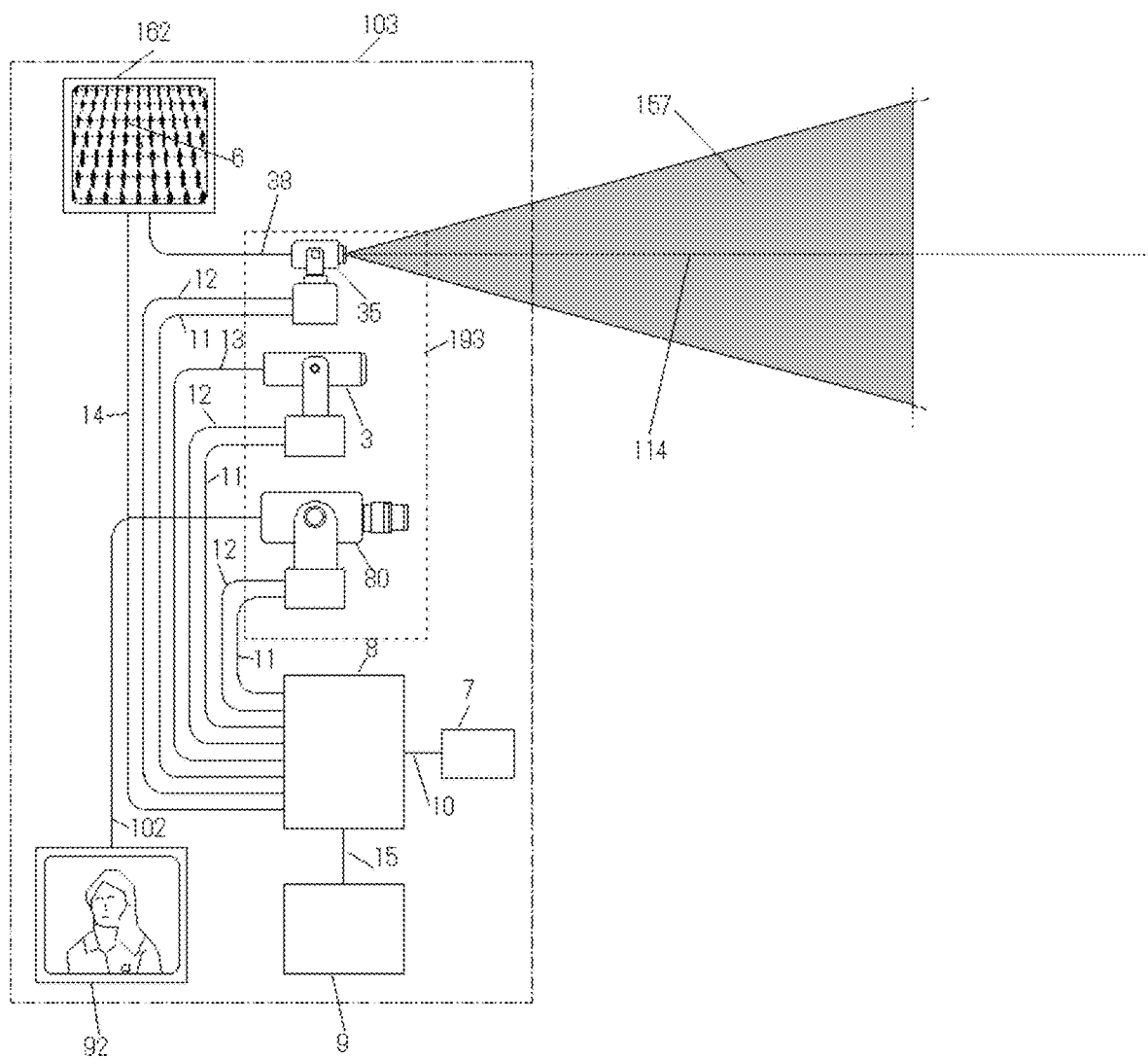
FIG. 60 shows the distance A to E of the object of the fixed television camera from the fixed television camera and the distance and each drive value thereof are acquired by changing the angle of view B of the photographing of the fixed television camera at all the distances of the fixed television camera.

In FIG. 60, in the same manner as described above, in the view angle B of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the field angle drive value of the angle of view B of the camera.

Figure 61:
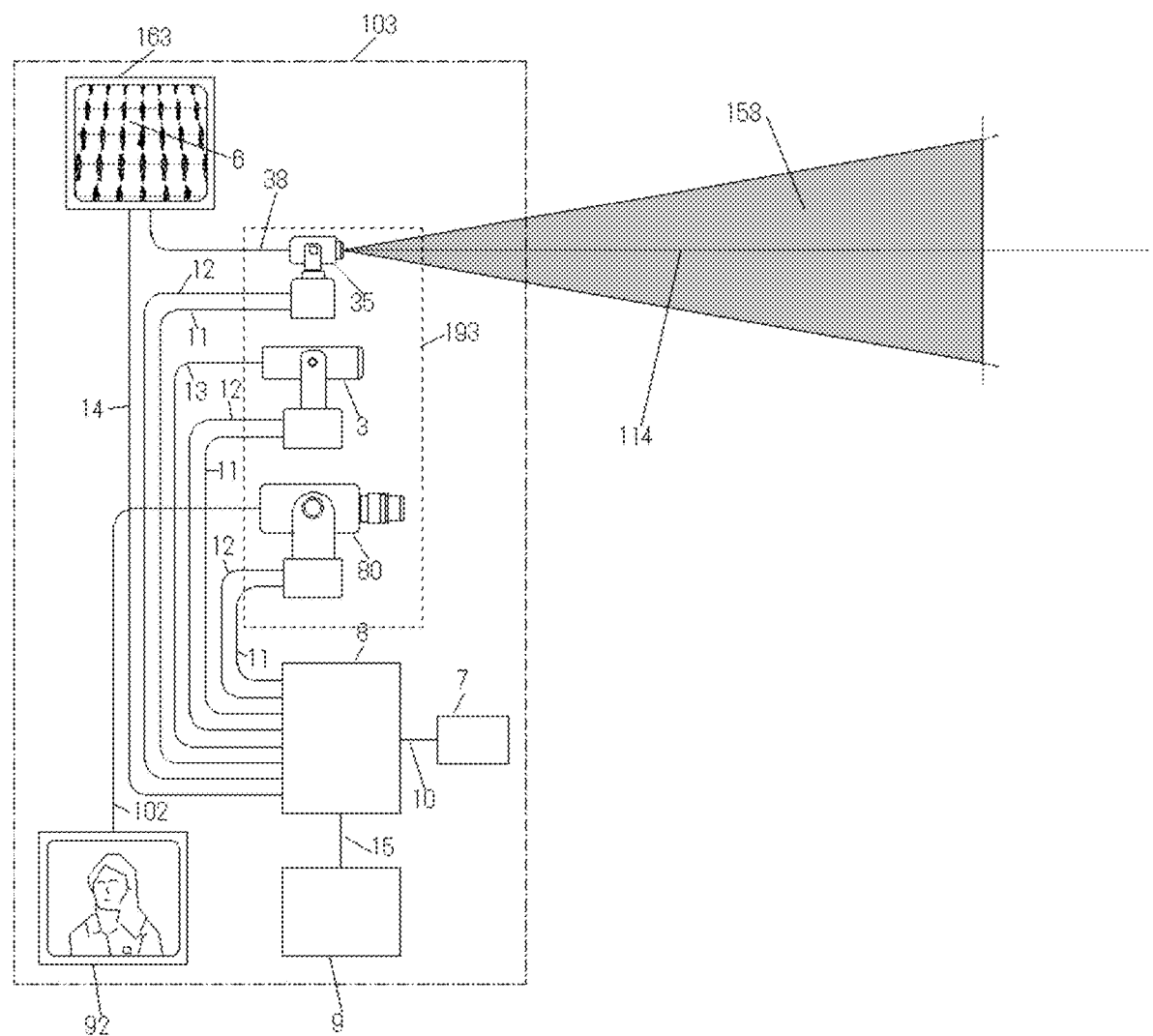
FIG. 61 is a distance A to E of a subject of a fixed television camera from a fixed television camera and the distance and each drive value thereof are acquired by changing the angle of view C of the photographing of the fixed television camera at all the distances of the fixed television camera.

In FIG. 61, in the same manner as described above, in the view angle C of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the angle of view drive value of the angle of view C of the camera.

Figure 62:
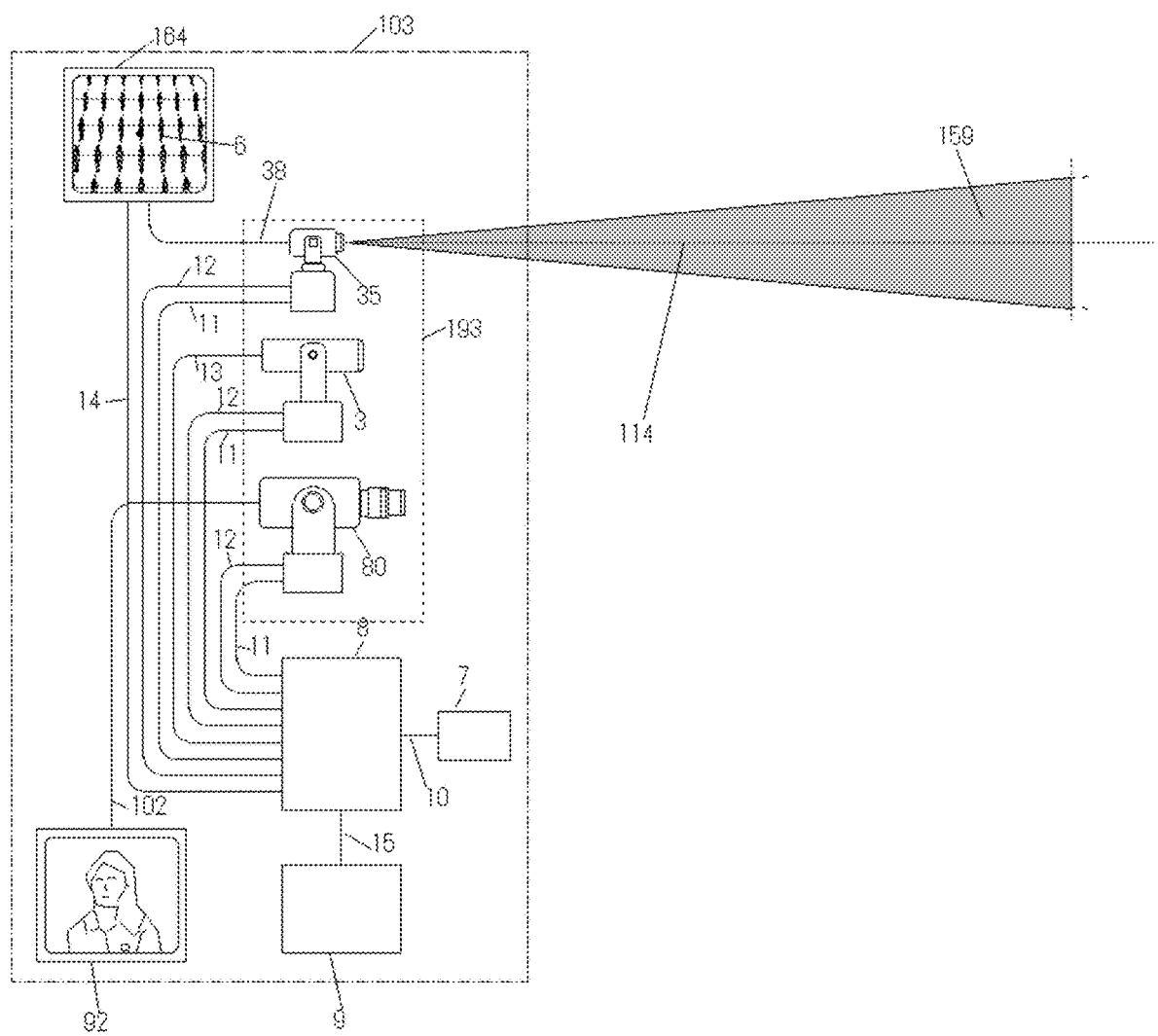
FIG. 62 shows the distance A to E of the object of the fixed television camera from the fixed television camera and the distance and each drive value thereof are acquired by changing the angle of view D of the photographing of the fixed television camera at all the distances of the fixed television camera.

In FIG. 62, in the same manner as described above, in the view angle D of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the field angle drive value of the angle of view D of the camera.

Figure 63:
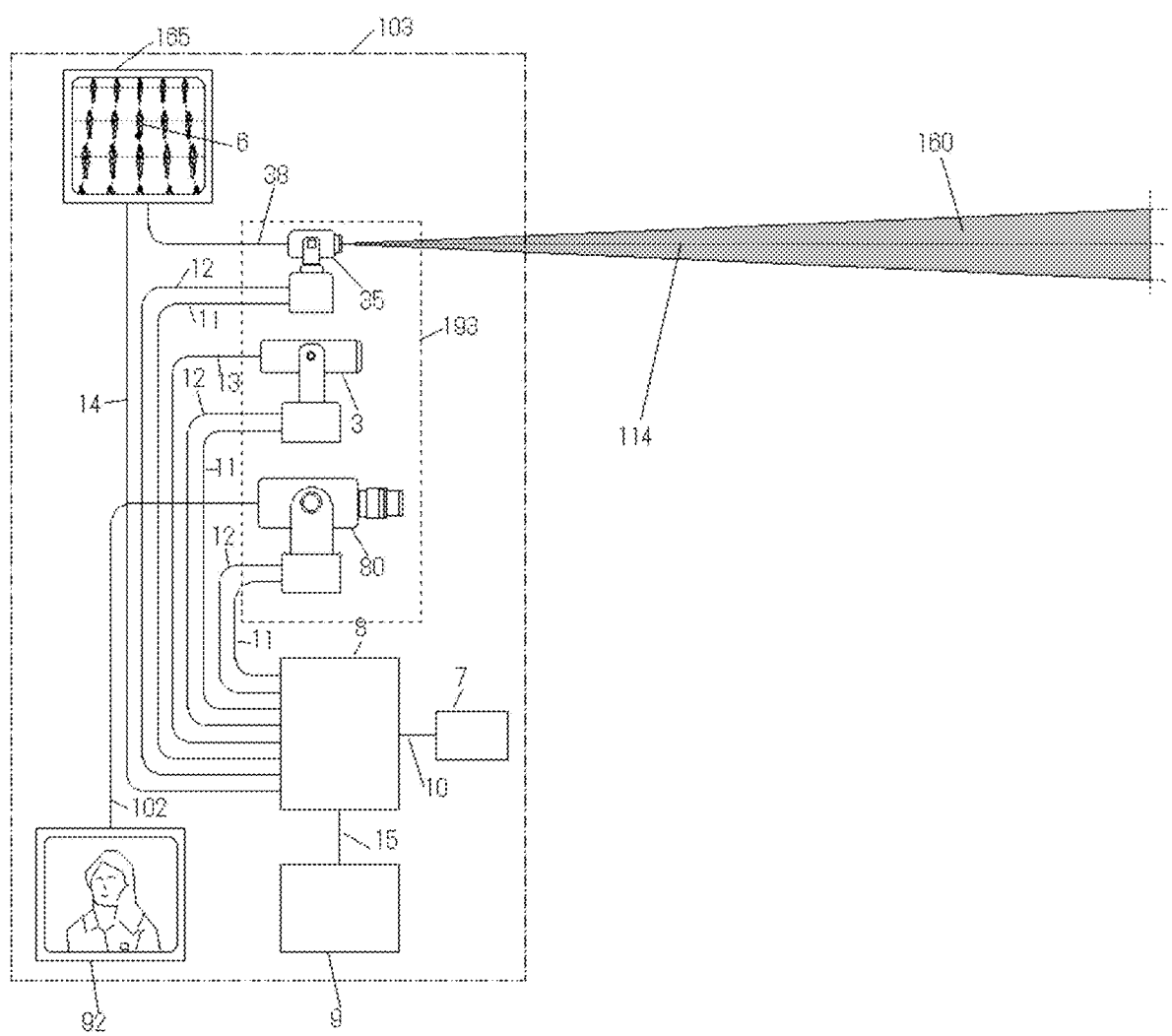
FIG. 63 shows the distance A to E of the object of the fixed television camera from the fixed television camera and the distance and each drive value thereof are acquired by changing the angle of view E of the photographing of the fixed television camera at all the distances of the fixed television camera.

In FIG. 63, in the same manner as described above, in the view angle E of the numerical control television camera 35, the drive numerical value of the tracking shooting of the tracking television camera 80 is acquired at all positions on the numerical control television camera monitor screen 37, and each distance and each drive value are interpolated by an operation such as interpolation calculation.

The numerical control television camera 35 is stored in the computer 9 in association with the field angle drive value of the angle of view E of the camera.

Using the drive value of the tracking shooting of the tracking television camera 80 associated with the angle of view of the angle of view A to E of the numerical control television camera 35 stored in the computer, the drive value of the tracking shooting of the tracking television camera 80 at all the angle of view of the numerical control television camera 35 is interpolated by an arithmetic operation such as interpolation calculation at the computer 9.

The distance to the subject shown in the numerical control television camera 35 is measured by the tracking laser distance measuring machine 3, and the measured distance is set in advance to the drive value of the angle of view of the numerical control television camera 35

The angle of view of the numerical control television camera 35 is driven, and at all positions on the numerical control television camera monitor screen 82 shot at the angle of view of the drive numerical value, an tracking television camera 80 can capture an image like a tracking television camera monitor screen 92.

Figure 64:
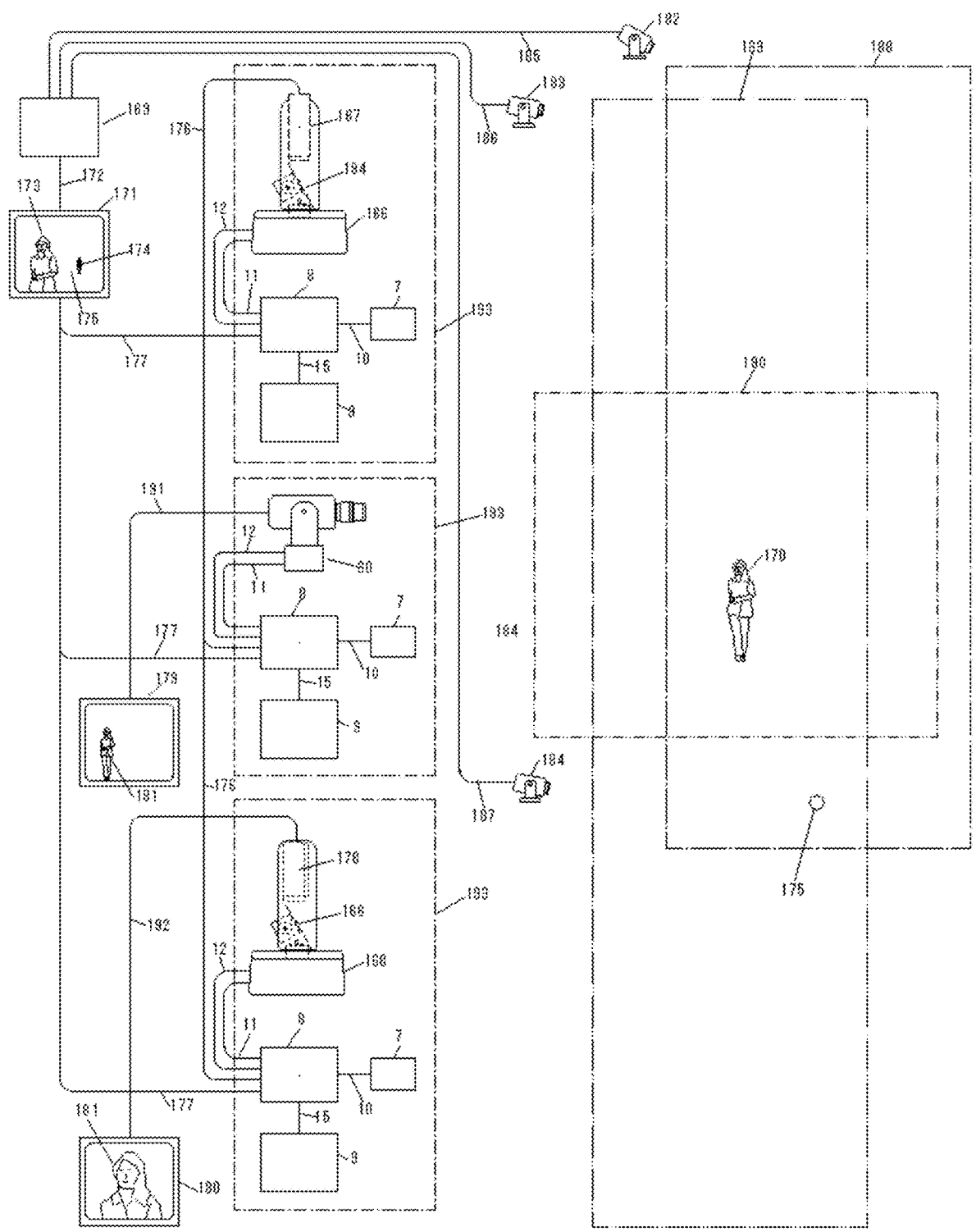
FIG. 64 is an explanatory diagram in which drive ranges of different numerical control devices are captured by a plurality of fixed television cameras, and different image signals are image-combined by a screen combiner, and drive times of different numerical control devices are shared by a time taken by a television camera at a position on a television camera monitor screen displaying the combined screen.

FIG. 64 shows the working location of a mirror tracking laser range finder 165, an tracking television camera 80, and a mirror tracking television camera 168, each driven by numerical control, 182, 183, 184 fixed television cameras 188, 189, 190 fixed television camera 1, respectively, 2, Three imaging ranges are taken.

The image signals of the fixed television cameras 182,183 and 184 are combined on a screen by a television camera screen combiner 169 and combined into one screen and subjected to screen synthesis like a composite television monitor screen 171.

The position of the subject 171 captured by the 173 fixed television camera 1, the position of the subject imaged by the 174 fixed television camera 2, and the irradiation position of the laser light captured by the fixed television camera 3 are numerical control devices driven by numerical control at different places.

The operation of each drive mechanism is performed by the respective 182, 183, and 184 fixed television cameras on the composite television monitor screen 171, and the display of the synthesized television monitor screen is the same time on the television monitor screen by the operation of the numerical control mechanism.

With the recognition of the respective image positions on the composite television monitor screen 171, the work of the numerical control mechanism can be driven and operated in association with each other.

The tracking mirror 194 accelerates the tracking speed and is a numerical controller which is driven by numerical control of a mirror that changes the irradiation direction of laser light for distance measurement.

The tracking mirror 194 accelerates the tracking speed and is a numerical controller which is driven by numerical control of a mirror that changes the imaging direction of the tracking television camera.

The present invention described above can specify the position of the subject in the three-dimensional space by measuring the position of the subject in the three-dimensional space and the distance to the subject by measuring the position of the subject in the three-dimensional space and the distance to the subject, or can be specified by a numerical value, so that each of the driving devices can be set from the outside.

The high-speed tracking of the tracking mirror and the high image quality of the tracking television camera captured image enable a plurality of detailed image recognition and enable tracking image recognition of a three-dimensional space close to human status determination.

This is industrially applicable to television satellite station, internet video site, and the like; image recognition and security; robot simplified operation and robot diversity; and accident avoidance in automotive automated driving vehicles.

The invention claimed is:

1. A laser distance measuring machine that drives in a distance measurement direction by numerical control, the machine comprising:
   a camera configured to capture irradiation positions of a laser light for showing on a screen;

a computer processor configured to,
associate a position indicating each of the irradiation positions on the screen with a driving position value of the laser distance measuring machine;
associate the driving position values with all positions on the screen using an interpolation calculation using the driving position values associated with the irradiation positions on the screen; and
measure a distance of an object displayed on the screen by irradiating the laser light to the object using the associated driving position values at all positions on the screen.

2. The machine of claim 1, further comprising:
a drive driven by a numerical control, wherein the computer processor is further configured to associate a work position of the drive with the irradiation positions so as to associating the work position with the distance.

3. The machine of claim 2, wherein a numerical value of the work position and a numerical value of the positions on the screen are operated by an external signal.

4. The machine of claim 2, wherein the drive shares a time taken by the camera to drive for numerical control of consecutive drive values.

5. The machine of claim 1, further comprising;
a nontransitory computer readable medium configured to store all positions on the screen, the driving position value, and the distance.

6. The machine of claim 1, wherein the work position is driven by changing a direction of a numerical control of the camera, and wherein the numerical value is associated with one of the irradiation positions indicating an irradiation place on the screen.

7. The machine of claim 1, wherein the work position is driven by changing a shooting view angle of a numerical control of the camera, and wherein the numerical value is associated with an irradiation position on the screen.

8. The machine of claim 1 wherein, at all positions on the screen, a position of the machine is measured by a distance.

9. The machine of claim 1, wherein a location driven by the drive position value is captured by the camera configured to numerically control the location.

10. The machine of claim 1, wherein the camera is configured to numerically control and image, and wherein the computer processor is further configured to measure a distance of a position that is imaged by the camera.

11. The machine of claim 1, wherein a drive value of a camera configured to capture images by numerical control is previously associated with the numerical value.

12. The machine of claim 1, wherein a drive value of the camera that captures images by numerical control is previously associated with a distance to be measured of a position indicating the irradiation place on the screen.

13. The machine of claim 1, wherein the computer processor is further configured to add a three-dimensional distance of a measured position shown on the screen is captured by the camera.

14. The machine of claim 1, wherein the camera is configured to capture an image by changing a shooting direction of the camera.

15. The machine of claim 1, wherein the camera is configured to capture an image by changing a view angle of shooting of the camera.

16. The machine of claim 1, further comprising:
a mirror for measuring the distance.

17. The machine of claim 16, wherein the mirror is configured to capture an image.

18. A method of measuring irradiation position distances with a laser distance measuring machine, the method comprising:
capturing a three-dimensional space with a camera including irradiation positions of a laser light within the space;
displaying the irradiation positions in the space on a screen;
associating, with a computer processor, a position indicating each of the irradiation positions on the screen with a driving position value of the laser distance measuring machine;
associating, with the computer processor, the driving position values with all positions on the screen using an interpolation calculation using the driving position values associated with the irradiation positions on the screen; and
measuring a distance of an object displayed on the screen by irradiating the laser light to the object using the associated numerical value at all positions on the screen.

* * * * *